(12) United States Patent
North et al.

(10) Patent No.: US 7,974,996 B1
(45) Date of Patent: *Jul. 5, 2011

(54) MATH COPROCESSOR

(75) Inventors: Gregory Allen North, Austin, TX (US); Murli Ganeshan, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1403 days.

This patent is subject to a terminal disclaimer.

(21) Appl. No.: 11/474,545

(22) Filed: Jun. 26, 2006

Related U.S. Application Data

(60) Continuation of application No. 10/920,879, filed on Aug. 18, 2004, now abandoned, which is a division of application No. 09/591,659, filed on Jun. 9, 2000, now Pat. No. 6,912,557.

(51) Int. Cl.
*G06F 7/38* (2006.01)

(52) U.S. Cl. .................................. 708/495; 708/524

(58) Field of Classification Search .................. 708/501, 708/503, 505, 495, 524
See application file for complete search history.

(56) References Cited

U.S. PATENT DOCUMENTS

| | | | | |
|---|---|---|---|---|
| 4,594,679 | A * | 6/1986 | George et al. | 708/503 |
| 5,301,137 | A * | 4/1994 | Matsuo et al. | 708/501 |
| 6,480,872 | B1 * | 11/2002 | Choquette | 708/501 |
| 6,529,928 | B1 * | 3/2003 | Resnick et al. | 708/505 |

* cited by examiner

*Primary Examiner* — Chuong D Ngo
(74) *Attorney, Agent, or Firm* — Thompson & Knight LLP; James J. Murphy

(57) ABSTRACT

A math coprocessor 1300 includes a multiply-accumulate unit 1600. Multiplier-accumulate unit 1600 includes a multiplier array 1603 for selectively multiplying first and second operands, the first and second operands having a data type selected from the group including floating point and integer data types. An adder 1604 selectively performs addition and subtraction operations on third and fourth operands, the third and fourth operands selected by multiplexer circuitry from the contents of a set of associated source registers, data output from multiplier array 1603 and data output from adder 1604.

14 Claims, 58 Drawing Sheets

HASHED TRUE = PASSED FILTER
HASHED FALSE = FAILED FILTER

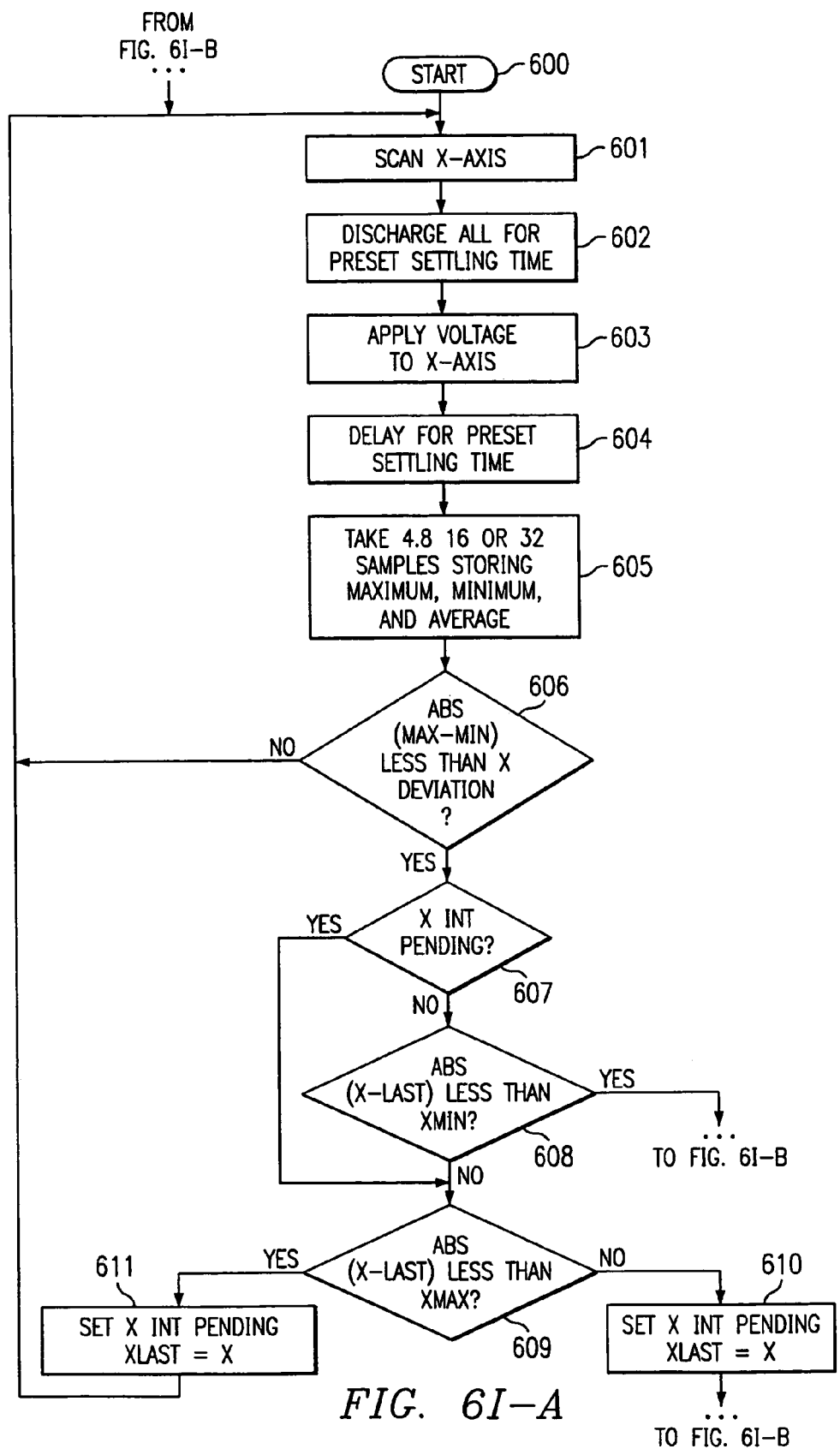
FIG. 61-A

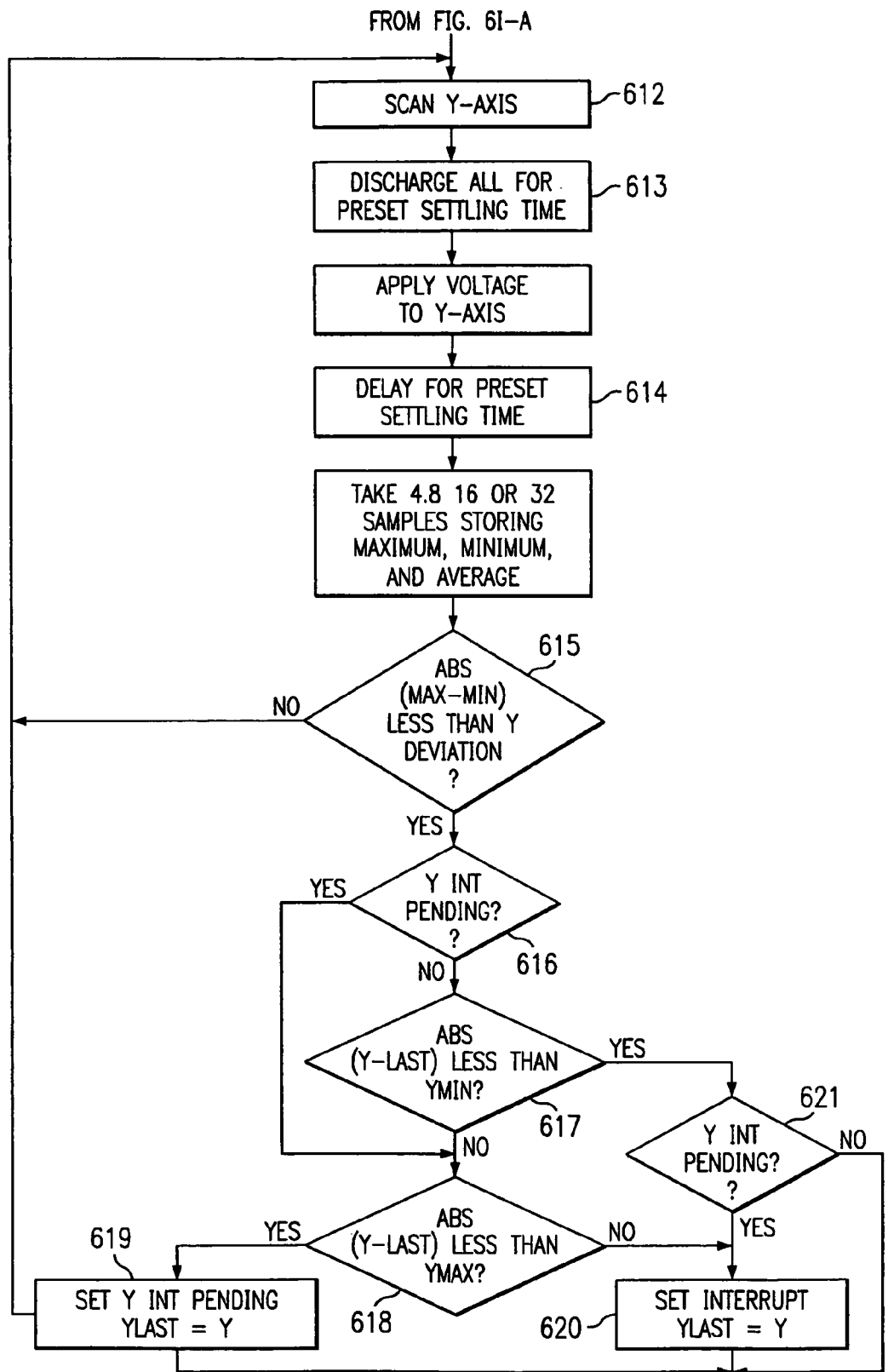
FIG. 6I-B

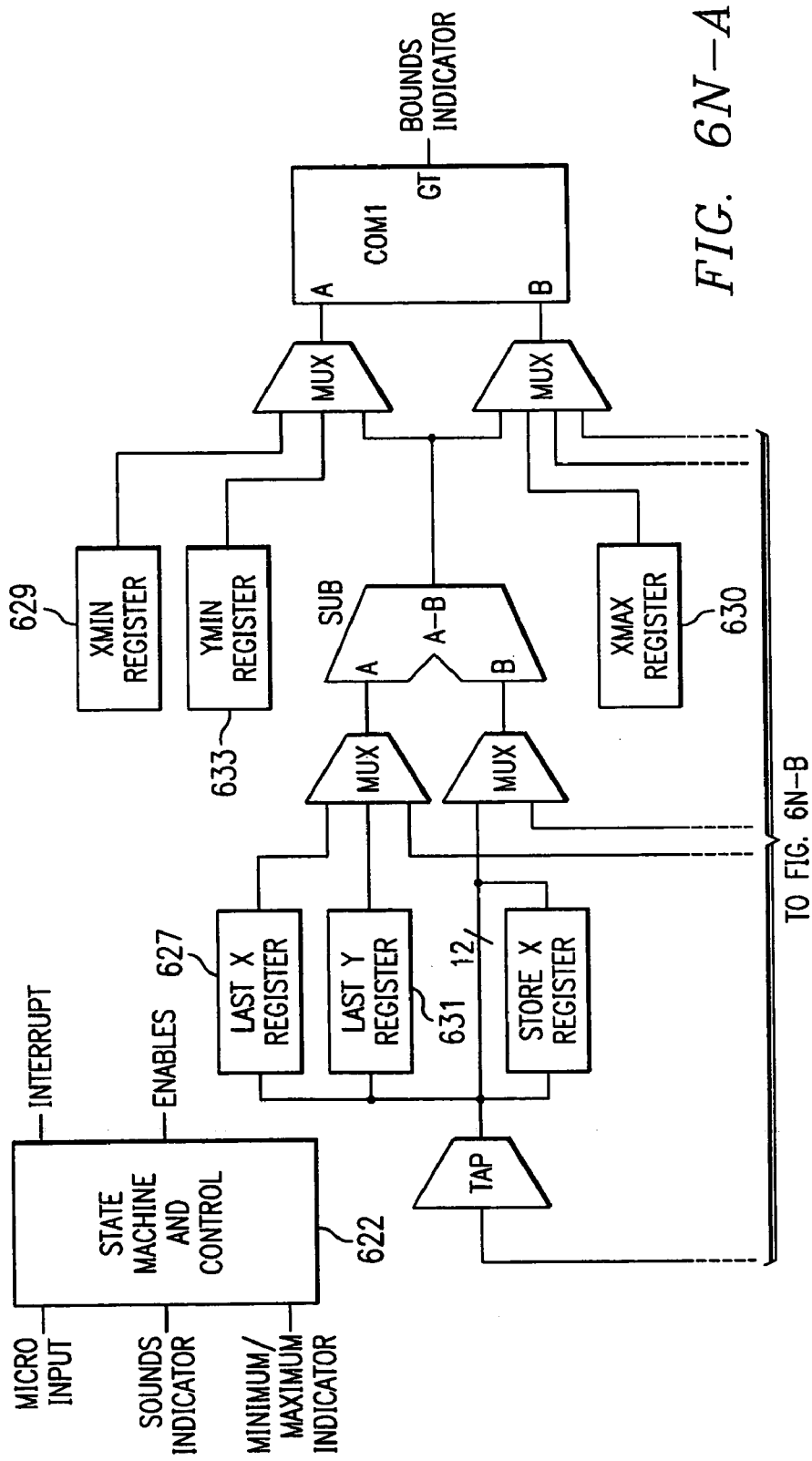
FIG. 6N-A

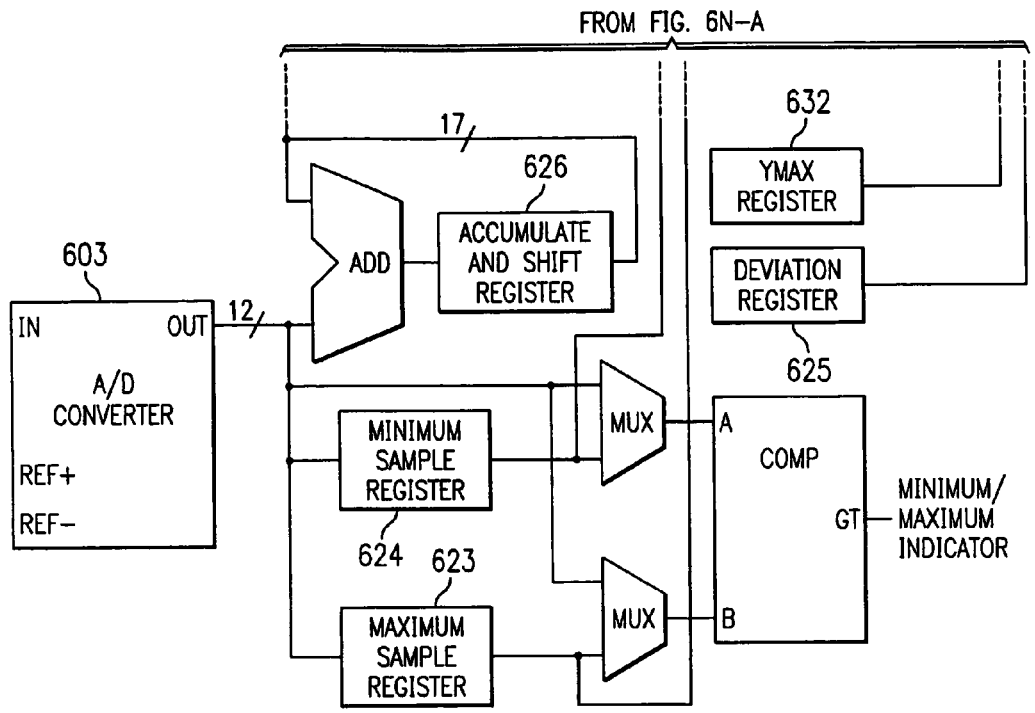
FIG. 6N-B
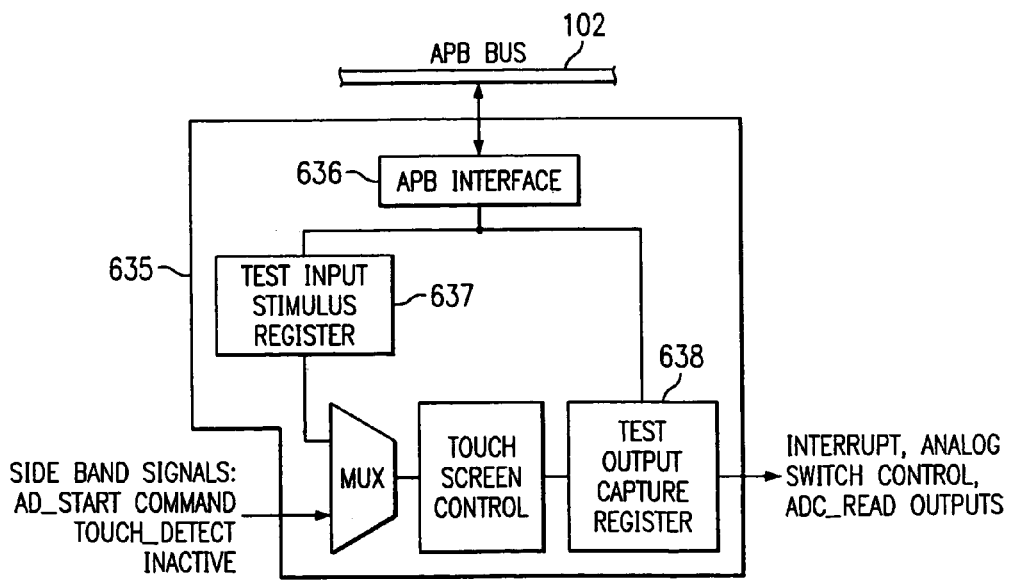
FIG. 6Q

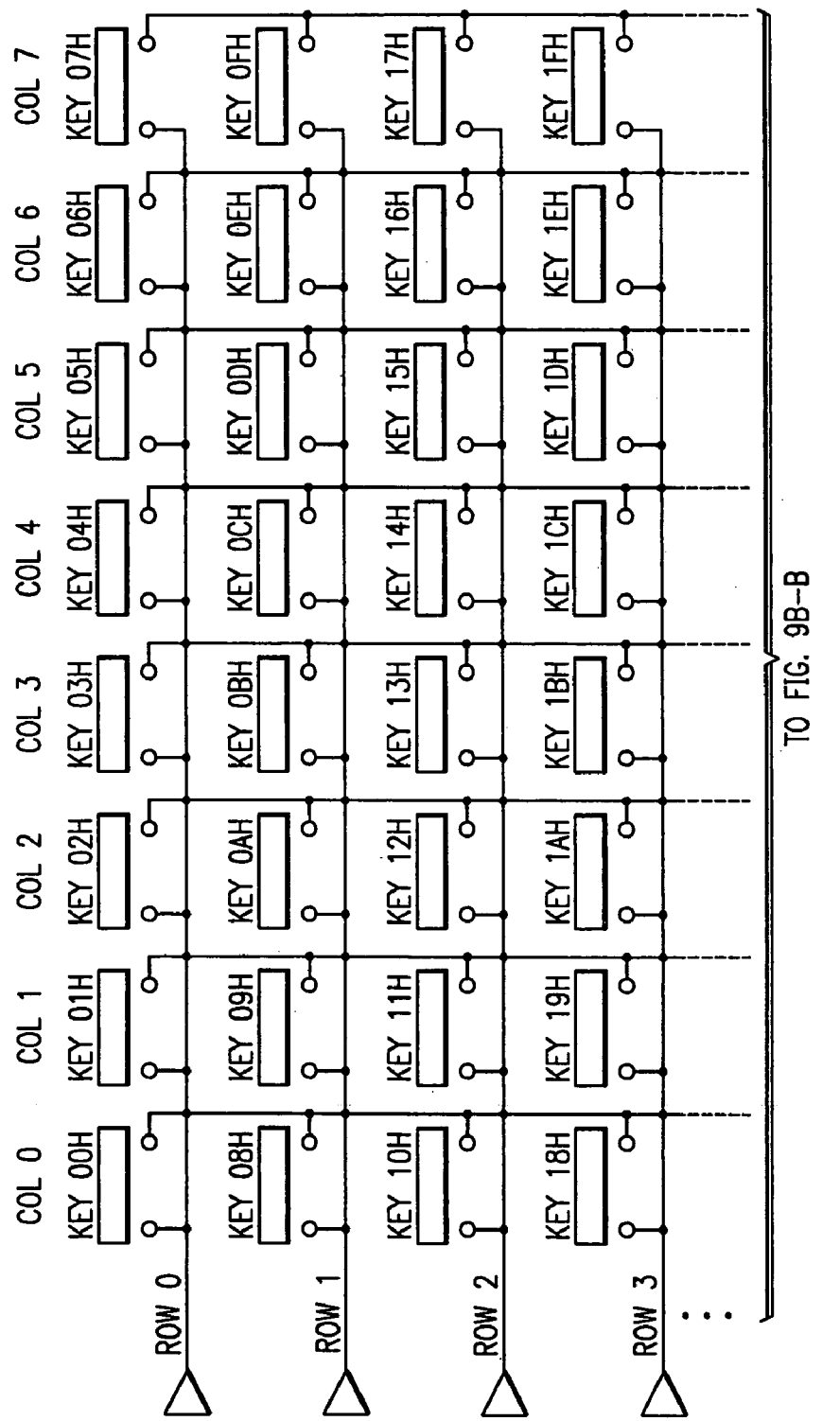
FIG. 9B-A

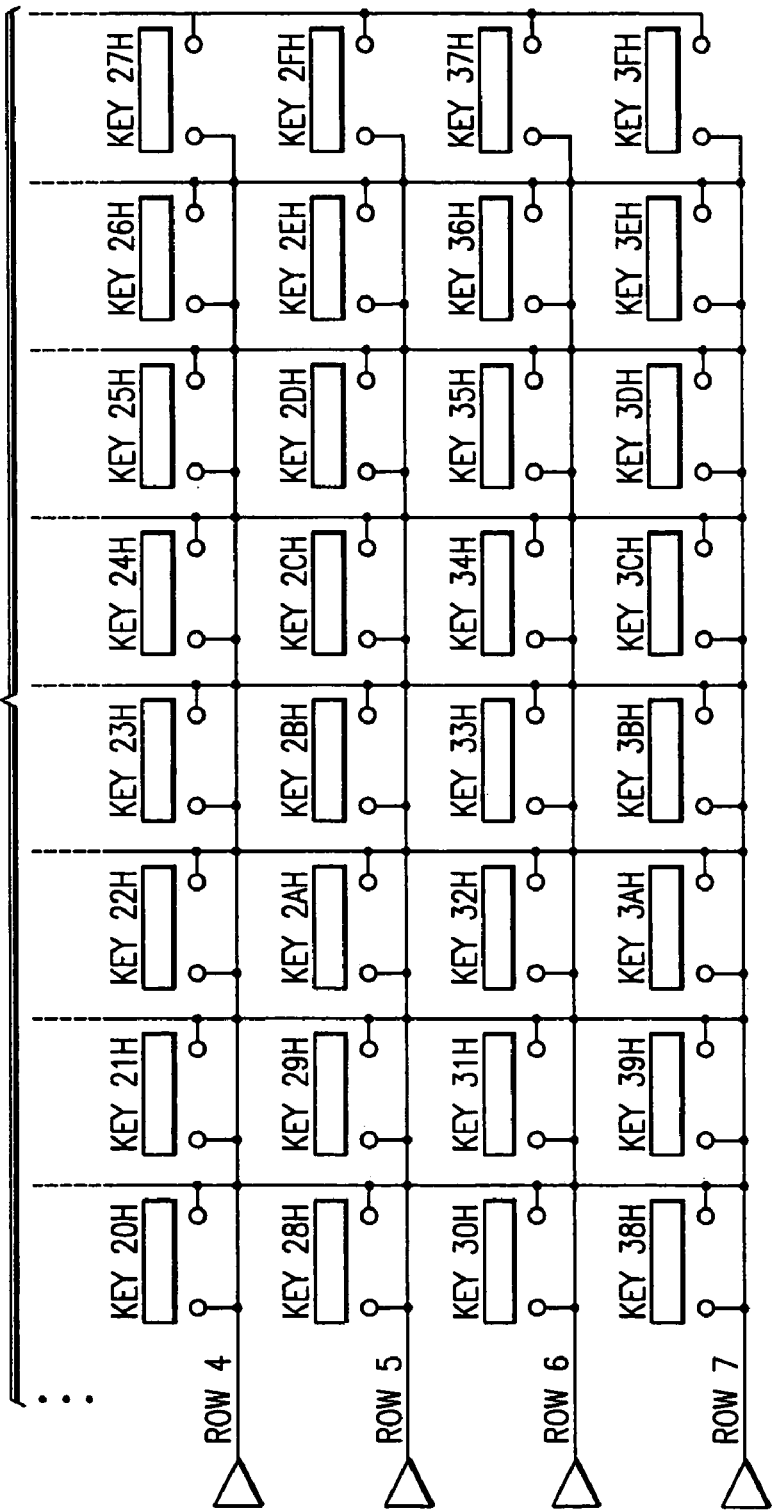
FIG. 9B-B
8 x 8 KEY ARRAY

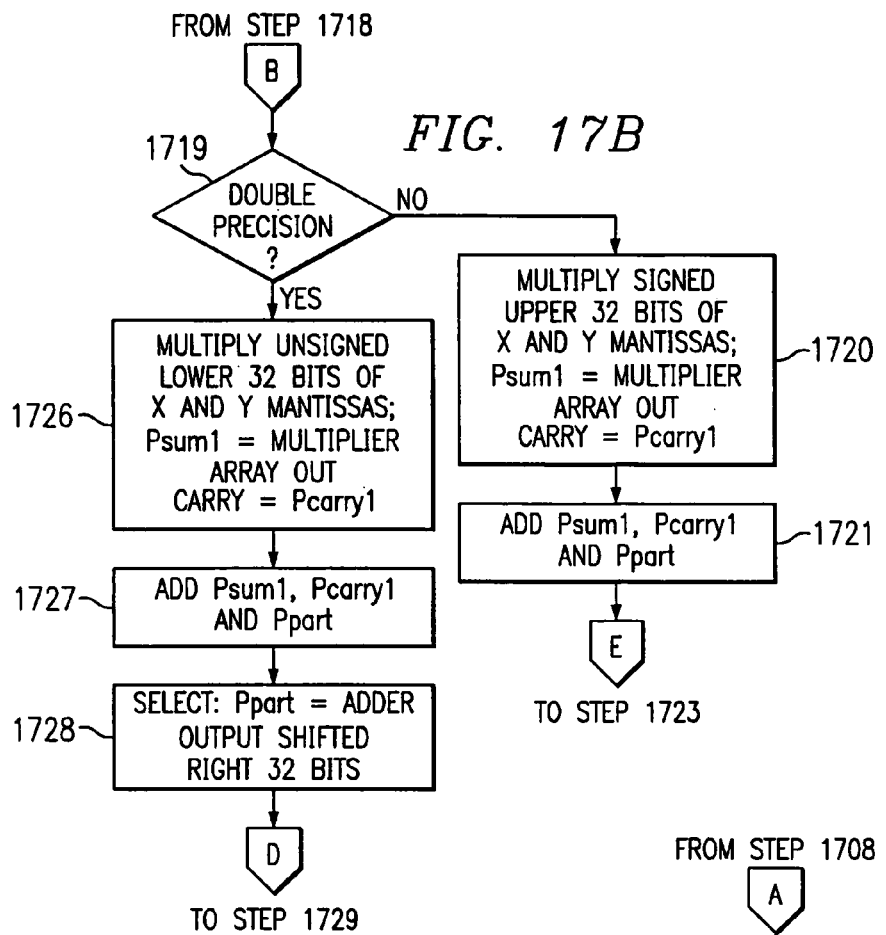
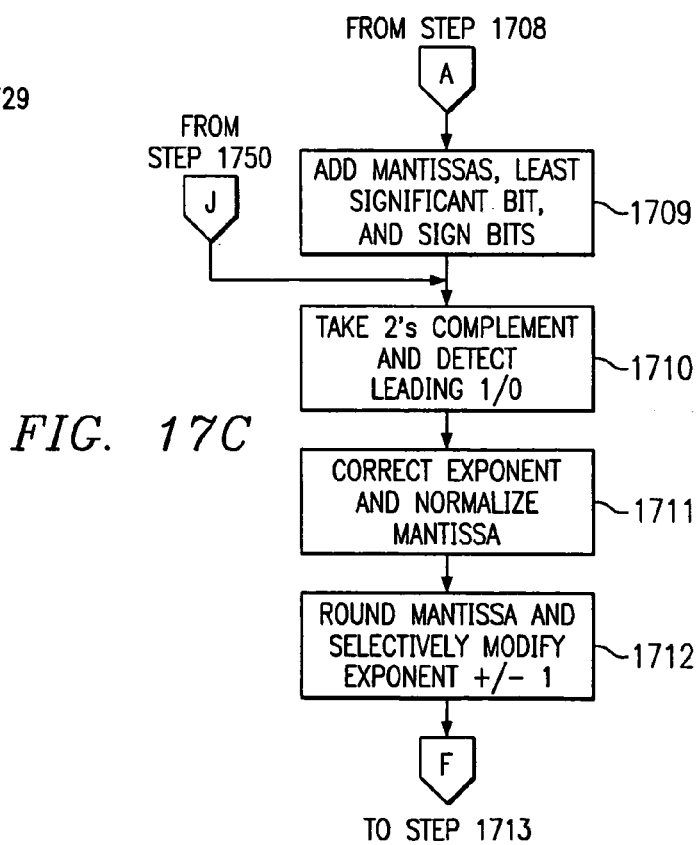
FIG. 17B
FIG. 17C

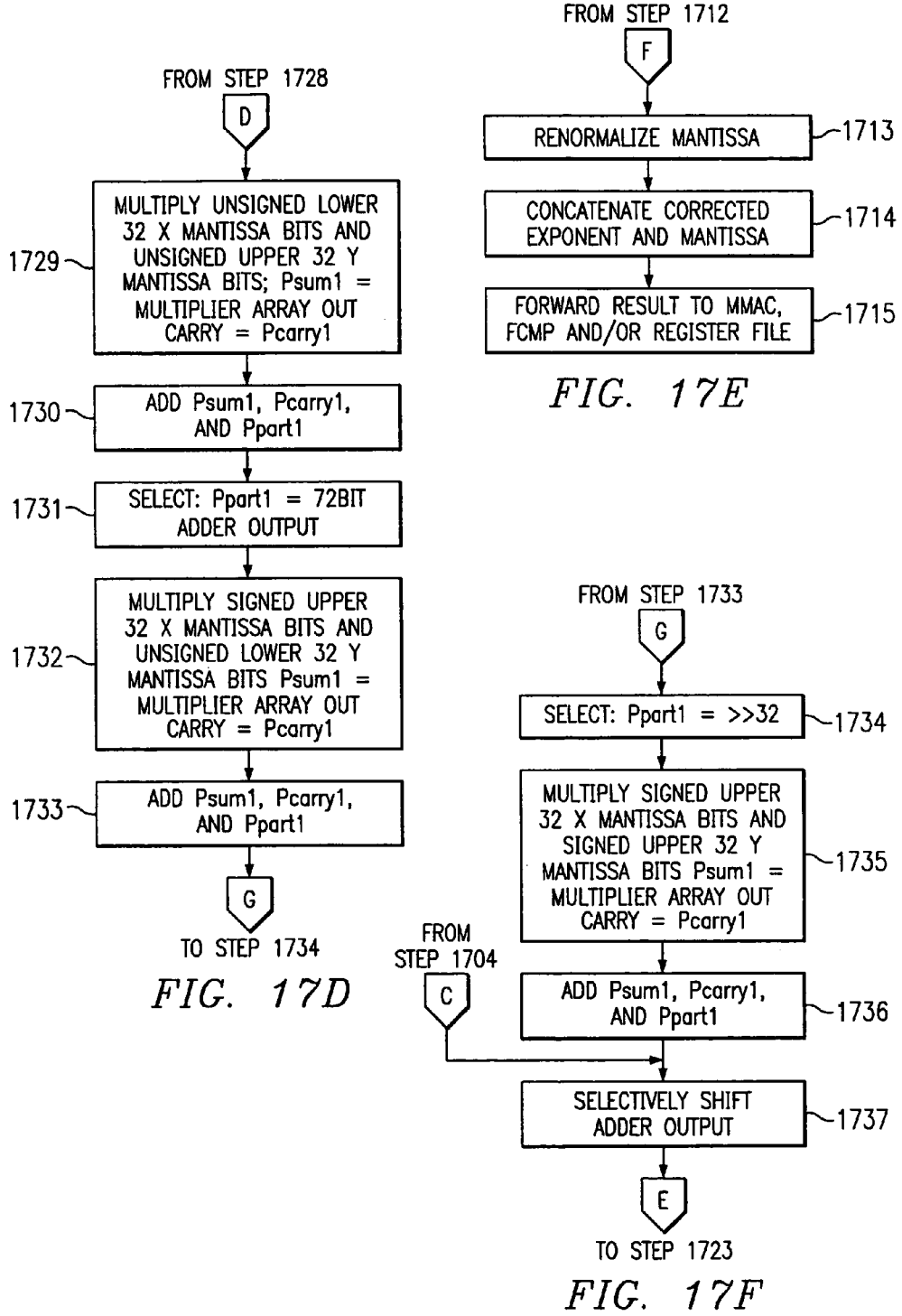

MATH COPROCESSOR

CROSS-REFERENCE TO RELATED APPLICATION

This application for patent is a continuation of U.S. patent application Ser. No. 10/920,879, filed Aug. 18, 2004, now abandoned, which is a divisional of application Ser. No. 09/591,659 filed Jun. 9, 2000, now U.S. Pat. No. 6,912,557.

The following co-pending and co-assigned application contains related information and is hereby incorporated by reference:

Ser. No. 09/590,506, entitled "SYSTEM ON A CHIP", filed Jun. 9, 2000;

Ser. No. 09/590,596, entitled "CLOCK GENERATOR", filed Jun. 9, 2000; and

Ser. No. 09/591,124, entitled "VOLTAGE LEVEL SHIFTER", filed Jun. 9, 2000.

BACKGROUND OF THE INVENTION

1. Field of the Invention

The present invention relates in general to electronic circuitry and in particular to math coprocessors.

2. Description of the Related Art

Sophisticated design and fabrication techniques are rapidly making practical systems-on-a-chip a reality. In turn, a broad range of personal and commercial hand-held appliances can be constructed which embody a high degree of functionality. These appliances include personal digital assistants, personal digital music players, compact computers, point of sale devices, and Internet access devices, to name only a few of the possibilities.

A number of factors must be addressed when designing a system-on-a-chip. Among other things, the device must be capable of interfacing with a broad range of input/output devices which may be required to support various potential user-defined applications. Moreover, the device must be power efficient while operating at high clock speeds. Additionally, this device should have a large address space to flexibly support a range of possible memory configurations and sizes.

SUMMARY OF THE INVENTION

According to one embodiment of the principles of the present invention, a mathematics coprocessor is disclosed which includes a multiplier accumulator unit have a multiplier array for selectively multiplying first and second operands, the first and second operands having a data type selected from the group including floating point and integer data types. An adder is included for selectively performing addition and subtraction operations on third and fourth operations. The third and fourth operands are selectively presented to the inputs of the adder by multiplexer circuitry which selects from the contents of a set of associated source registers, data output from the multiplier array, and data output from adder.

Among the many advantageous features of this math coprocessor, is the multiplier-accumulator unit which will perform both floating point and integer arithmetic operations. Moreover, the mathematics coprocessor can perform both single and double precision arithmetic operations on either floating point numbers or integers. In addition, a mathematics coprocessor instruction set supports such arithmetic operations as integer-to-floating-point conversion, single-precision-to-double-precision conversion, left- and right-shifts, absolute value, and negate.

BRIEF DESCRIPTION OF THE DRAWINGS

For a more complete understanding of the present invention, and the advantages thereof, reference is now made to the following descriptions taken in conjunction with the accompanying drawings, in which:

FIG. 5I illustrates an exemplary state of the receive queues following the reception of four frames;

FIG. 5O illustrates the hardware-software interaction during the EtherNet receive process;

FIG. 6I illustrates operational flow chart describing a preferred method of decoding a touchscreen entry;

FIG. 6N illustrates a preferred procedure for scanning the touchscreen and determining touch location in reference to the resistive scanning block diagram of FIG. 6N;

FIG. 6O illustrates a typical system configuration during low power operation using the 5-wire device as an example.

FIG. 6Q depicts the touch controller TIC harness connections for the preferred embodiment;

FIG. 9B shows an exemplary 8 row and 8 column keyboard for purposes of describing the keyboard scan circuitry;

DESCRIPTION OF THE PREFERRED EMBODIMENTS

Figure 1:
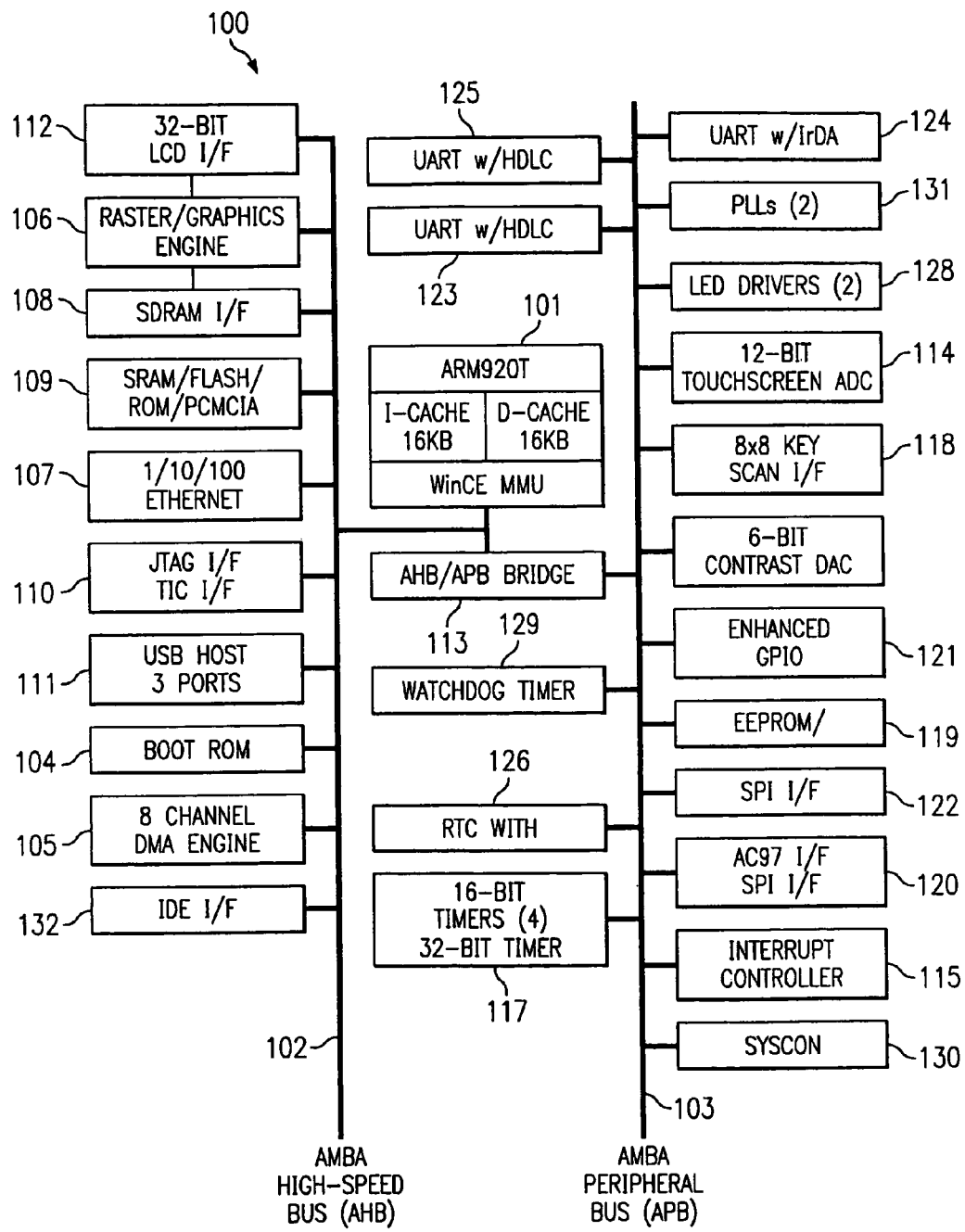
FIG. 1 is a diagram of a microprocessor-based system-on-a-chip embodying the principles of the present invention.

The principles of the present invention and their advantages are best understood by referring to the illustrated embodiment depicted in FIGS. 1-18 of the drawings, in which like numbers designate like parts.

FIG. 1A is a diagram of a microprocessor-based system-on-a-chip 100 embodying the principles of the present invention. System 100 is a general purpose processing device suitable for use in a number of high performance personal and commercial information processing systems requiring small device size and low power consumption. Among other things, system 100 may be embodied in personal portable appliances, such as handheld music players, portable Internet appliances and personal digital assistants, commercial portable appliances such as portable point-of-sale terminals, as well as intelligent peripherals, telecommunications appliances and compact computers.

In the preferred embodiment, system 100 is based on ARM 920T microprocessor core 101 operating in conjunction with a set of on-chip peripheral devices via an AMBA High Speed Bus (AHB or peripheral bus high speed bus) 102 and an AMBA Advanced Peripheral Bus (APB) 103. The peripheral set will be discussed further below. A block diagram of microprocessor core 101 is shown generally in FIG. 2; specific details are set out in the ARM920T data sheet available from ARM, Ltd., Cambridge, United Kingdom, incorporated herein by reference. Additionally, detailed specifications for AHB 102 and APB 103 are also available from ARM, Ltd., such specifications also incorporated herein by reference.

The functional blocks 104-130 described in detail below, as well as microprocessor core 101, are preferably coupled to buses 102 and 103 using tri-state buffering. A conceptual drawing of a preferred tri-state implementation is shown in FIG. 1B. Here, each output (data, address, or control signal) 131 from a given source block (101, 104-130) is coupled to the input of one or more corresponding destination blocks (101, 104-130) by a single conductor 132 through a tri-state buffer 133. One source block is allowed to drive the given bus 102/103 while the outputs of the remaining source blocks are held in a tri-state or high impedance state. Thus, the timing of the activation and deactivations of the source block outputs is critical to avoid collisions.

In the preferred embodiment, the current bus master grants the privilege to a selected source block to drive the bus for a given number of cycles. An idle cycle is inserted at the start of each burst of information to allow for the return of responsive information from the destination (slave) devices from the previous cycle. An idle cycle is also inserted before a new bus master takes control of the bus. During this idle period, addresses and control signals are preferably not driven on the bus, with the exception of the requisite transfer control signals.

The tri-state buffer approach has substantial advantages over other bus interface techniques such as multiplexing and logical gating. Among other things, the tri-state approach requires less logic to implement. Additionally, die area is saved which helps reduce the overall cost of the device.

Figure 2:
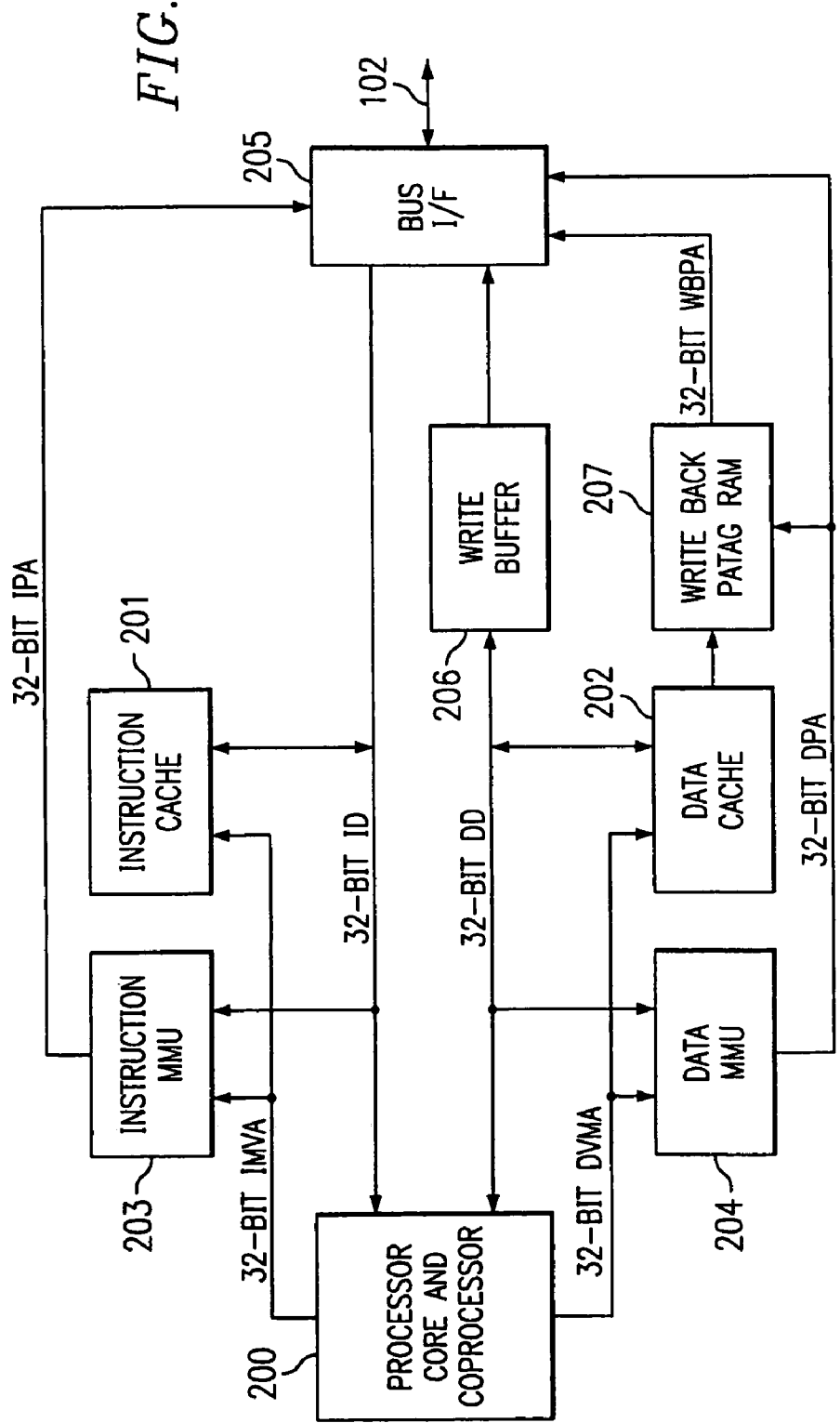
FIG. 2 illustrates a block diagram of a preferred microprocessor core.

As shown in FIG. 2, microprocessor core 101 includes a reduced instruction set computing (RISC) processor and one or more coprocessors shown collectively at block 200. In this embodiment, the available cache comprises both an instruction cache 201 and a data cache 202. Similarly, separate instruction and data MMUs 203 and 204 are used. The instruction modified virtual address (IMVA), instruction physical address (IPA) and instruction data (ID) buses are each 32 bits wide. Similarly, the data modified virtual address (DMVA), data physical address (DPA) and data data (DD) buses are 32 bits wide. Physical addresses and data are exchanged to AHB bus 102 through AMBA bus interface 205. A write buffer 206 allows for the parallel exchange of data through interface 205 during processor core operations. Data from data cache 202 can be output through write-back physical address (PTAG) RAM 207.

System boot ROM 104 operates from high speed bus 101 and controls the selection of the external source of program code from which system 100 operates. In the preferred embodiment, boot ROM 101 comprises 16 KBytes of mask-programmed memory. The external source could be for example flash memory. Program code under one boot option is directly executed from external flash memory. Alternatively, a loader program is downloaded through UART1 or the PCMCIA (both discussed below) into SDRAM. This loader program in turn downloads a complete operating image through either the UART1, PCMCIA, USB, or IrDA ports or the EtherNet interface and typically stores that image in flash memory. Additionally, in the preferred embodiment, the boot ROM code does not enable the microprocessor memory management unit (MMU). The loader program therefore operates from physical addresses and handles the tasks of initializing the page tables and starting the MMU and caches.

Figure 3A:
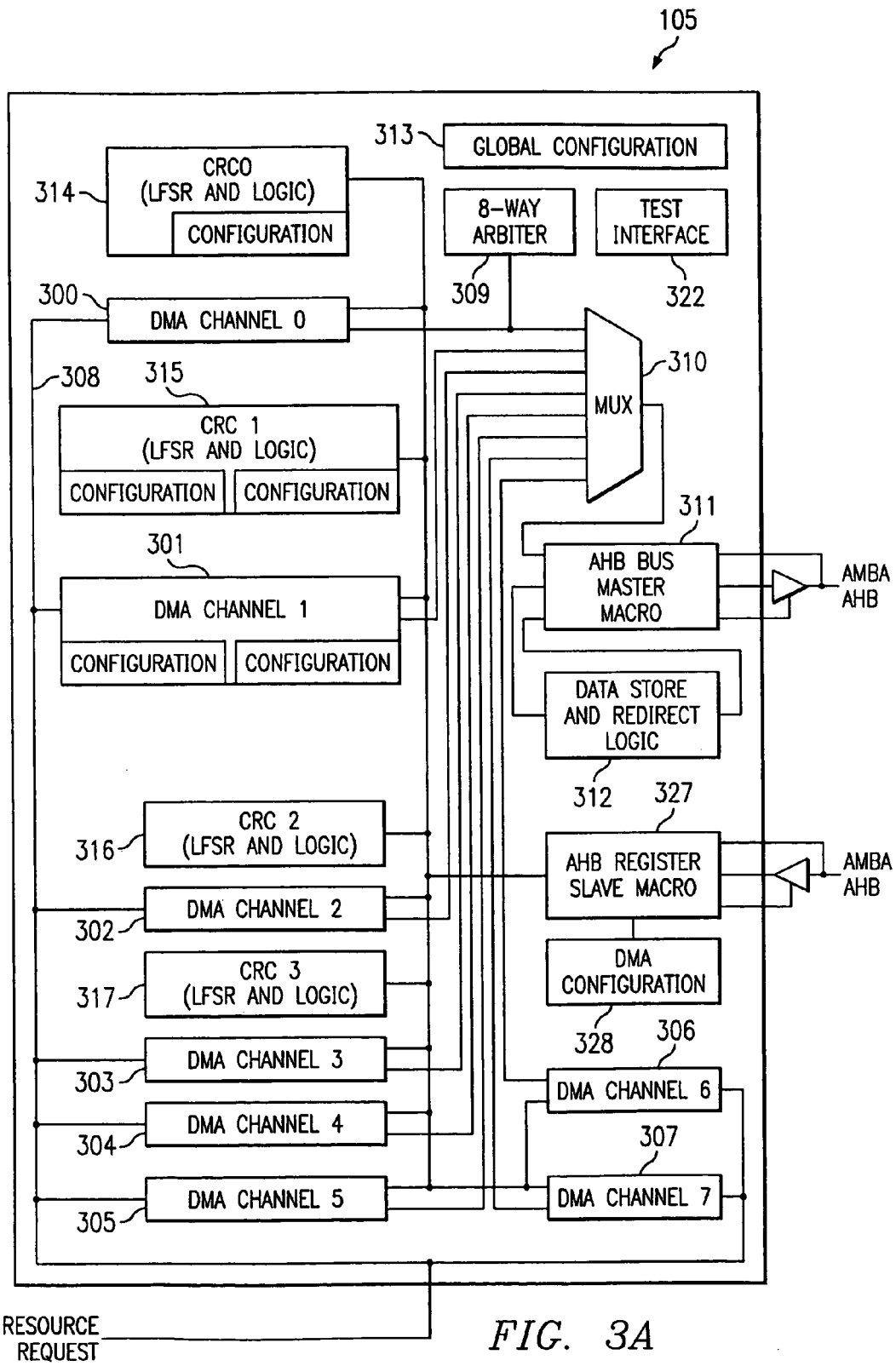
FIG. 3A illustrates a more detailed functional block diagram of the DMA engine.

A multiple-channel Direct Memory Access (DMA) engine 105 also operates off high speed bus 102. A more detailed functional block diagram of DMA engine is shown in FIG. 3A. In the illustrated embodiment, DMA engine 105 comprises 8 processing paths 300-307 corresponding to 8 channels 0-7. Each DMA path way is independently programmable with respect to source and destination addressing. Resource requests are received from the requesting devices, such as the UARTs discussed below via a 16-bit wide Request bus 301. The various resources connected to resource bus 308 are then associated with a given channel by setting bits in corresponding DMA control registers 313. Simultaneous memory access requests are resolved by an 8-way arbiter 309 and multiplexer 310. Additionally, DMA engine 105 includes 4 Linear Feedback Shift registers (LSFRs) 314-317, for performing CRC error correction.

Generally, a DMA operation proceeds as follows In considering any DMA operation in the preferred embodiment, it must be recognized that the AHB has a pipe-lined architecture for both addresses and data and that any DMA channel can generate a internal request to AHB bus master 311 for access to AHB bus 102. When access to the bus is granted, arbiter 309 selects the channel to be serviced by the bus.

The selected channel begins its access at the source location address driven on the bus during the previous bus cycle. If DMA engine 105 was not the bus master for the previous cycle, a bus idle cycle is inserted to avoid address bus contention problems. All channels share the same data storage and redirect logic 312; therefore, during the read cycle, arbiter 309 locks multiplexer 310 to the current channel such that during the next bus cycle that same channel can complete its access with a write cycle. The sequence generally proceeds as follows: When the previous bus cycle is finished, DMA engine 105 is in a ready state. The data read cycle then executes, and data retrieved from memory are stored internally in a temporary storage register (block 312). Depending on the width of the incoming data, the data register stores either a received single 32-bit word, a received 16-bit half word which has been duplicated to create a 32-bit word, or an incoming byte which has been copied four times to create a 32-bit word.

At the same time, a write address is driven onto the bus. Bus master 311 inserts a bus idle cycle when necessary to avoid data contention. Once the write address is being driven on the bus, the arbiter lock on the active channel is released. During the write cycle, a single 32-bit word, two 16-bit half words, or four bytes are written on the bus as a 32-bit word. Address alignment in the case of half words and bytes is performed by the slave device. While the write cycle is being performed the next read address is driven on the bus.

DMA channels 300-307 are configured in register. For each channel, a 32-bit source address pointer and a 32-bit destination address pointer are defined to configure a transfer. The source and base addresses are incremented or decremented based on the state of a set of increment and decrement control bits assigned to each channel (If the increment and decrement bits are set to the same value for a channel, the address remains the same.) The address pointers increment or decrement by a different amount based on the width of the transfer. The configuration registers also control transfer word width in terms of 32-bit words, 16-bit half words, or bytes, as well of the length definition of the given transfer.

DMA transfers can be either synchronized or unsynchronized. Unsynchronized transfers are initiated by software whenever a DMA channel is granted access to AHB 102 by setting an enable bit. Clearing the enable bit halts the unsynchronized transfer. Synchronized transfers are initiated by a DMA request from resource bus 308, such as the serial channel transmit or receive buffers. During a synchronized transfer, when the enable bit is set, a DMA channel will transfers data when the request line is active and it has control of the bus.

DMA engine further includes four 16/32 bit programmable LSFRs 314-317 for calculating CRCs based on common CRC algorithms including CRC-16, Reverse CRC-16, CRC-CCITT (SDLC, X25, XMODEM), and reverse CRC-CCITT. In the illustrated embodiment, LFSRs 314-317 are coupled to DMA channels 0-3. and are correspondingly labeled CRC0-CRC3. The LFSRs 314-317 can be dedicated to their respective DMA channel or used independently by any bus master through the AHB register interface 327 and configuration registers 328. Each CRC calculator may be hardware connected to its respective DMA channels to allow DMA "through" the CRC generator.

Figure 3B:
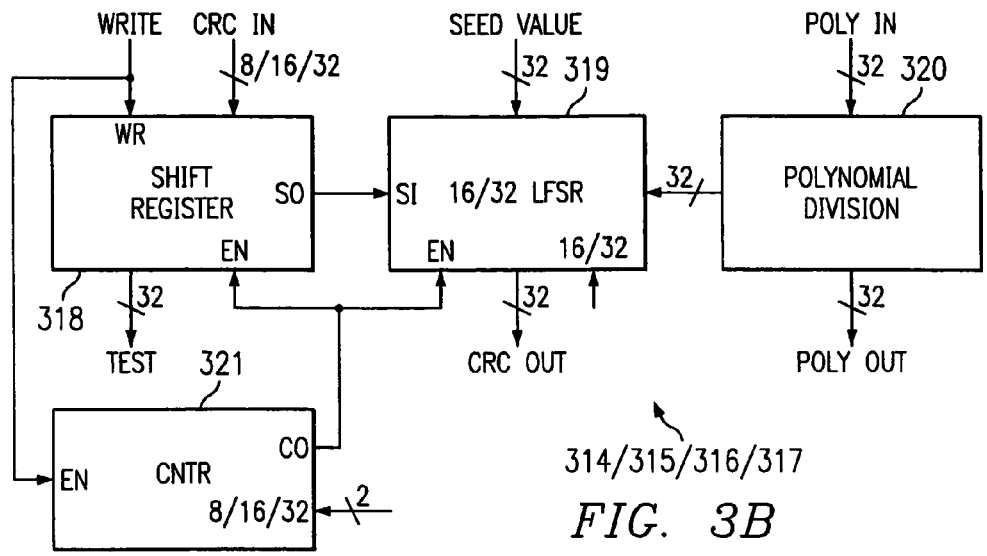
FIG. 3B is a more detailed functional block diagram of a selected LSFR.
Figure 4A:
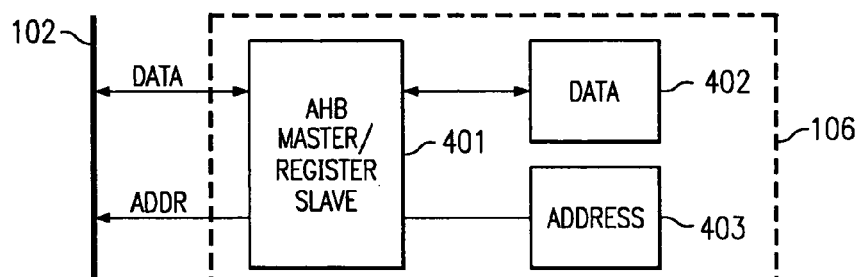
FIG. 4A is a functional block diagram of the graphics portion of the raster/graphics engine.
Figure 4C:
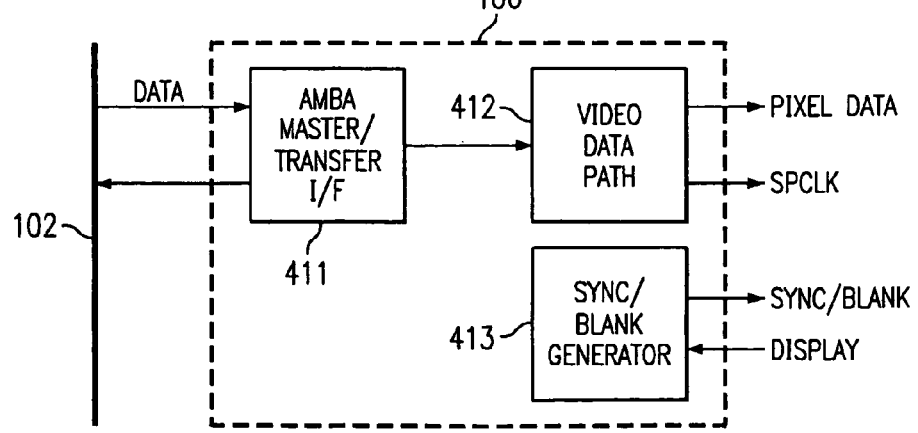
FIG. 4C illustrates in further detail a block diagram depicting the raster engine portion of raster/graphics engine.

FIG. 3B is a more detailed functional block diagram of a selected LSFR 314-317. The LSFR includes an input shift register 318, 16/32 bit LFSR 319, polynomial divisor 320 and counter 321. During programming, the shifting mode for shift register 318 is selected between 8-, 16-, and 32-bit modes and the LSFR size is selected to be either 16 or 32 bits wide. The polynomial used by divisor 320 is selected in accordance with the CRC algorithm being used. The process is initialized by writing a seed value of LSRF 319.

Data in either an 8, 16, or 32-bit format is then input through shift register 318 input CRC IN. In the 32- and 16-bit shift modes, the data stream is normally in a word or half word multiple of bytes. If not, the 32 or 16 bit shift mode is initially used and then the shifting switched to the 8 bit mode for the remaining byte(s). Once the data is written into shift register 318, there is a delay of either 9, 17, or 33 bus clocks before the resulting data are available at the CRC OUT port and/or new data can be written in, for the 8, 16, or 32 bit modes respectively. The CRC process will be discussed in further detail below in conjunction with the description of EtherNet MAC 107.

Under the default priority scheme, channel 0 has highest priority, channel 1 the next highest, and so on until channel 7, which has the lowest priority, assuming that the DMA channels correspond to requests REQ 0-7. This priority scheme may be reprogrammed in register, in which case, more than one channel can have the same priority, with reversion to the default scheme when that level has the current highest priority.

Round robin shifting by arbiter 309 supports rotation of priority level precedence as well as the shifting of precedence within a given priority level when two or more channels have the same priority level. In the case of overall rotation, the priority associated with each priority value changes in a round robin fashion in response to the HCLK, so long as no channels have been granted the bus or if the bus has been granted to a channel but the arbiter has not been locked. Between channels set to the same level, priority changes periodically with the HCLK if no channels have been granted the bus or if the bus has been granted to a channel but the arbiter has not been locked. A combination of the two schemes can be used to optimize performance. Notwithstanding, lowest priority values are still assigned to the most critical channels.

Figure 3C:
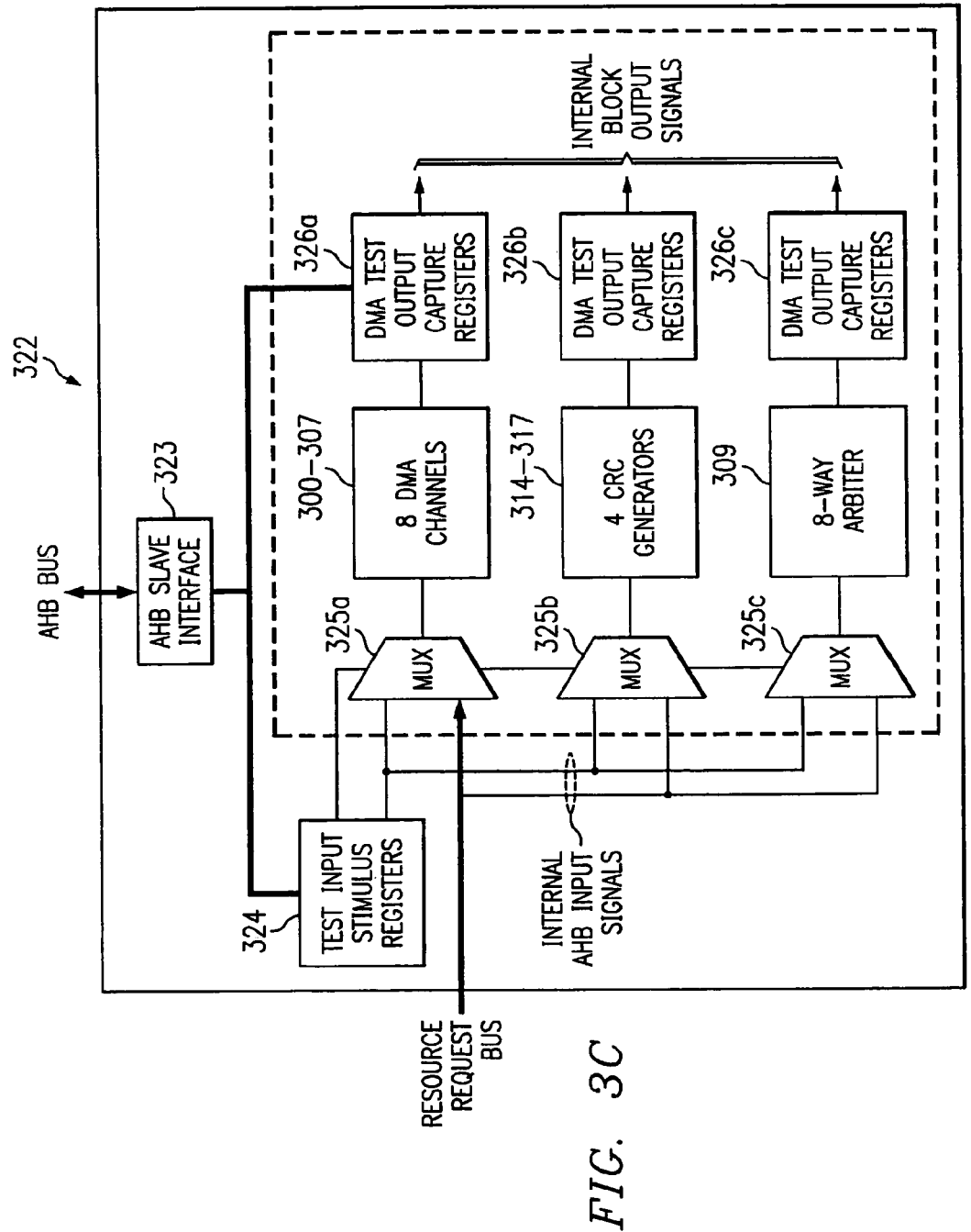
FIG. 3C is a detailed block diagram of the Test Interface Controller (TIC) harness emphasizing the connections to the DMA engine.

FIG. 3C is a detailed block diagram of the Test Interface Controller (TIC) harness as it relates to testing DMA engine. The test interface is generally shown in block 322 in FIG. 3A. Testing is effectuated through AHB interface registers 323 and a corresponding set of multiplexers. The various sub-blocks, such as DMA channels 300-307, CRC generators 314-317 and arbiter 309 can be tested individually or in parallel. Input signals are written to the text input stimulus registers 324 or fed-back from the output captive registers 326 and passed to the blocks under test through multiplexers 325. The corresponding test outputs are read from the DMA test output capture registers 326.

The graphics engine of raster/graphics engine block 106 generally offloads graphics processing tasks from processor core 101, operating off high speed bus 102 as either the bus master or as a register slave. Among other things, graphics engine performs rectangular block fills, Bressingham line drawing and pixel step line drawing. Data transfers are made by graphics engine 106 through bit-block transfers (BitBLTs similar to the DMA transfers discussed above.) A functional block diagram of graphics engine 106 is provided as FIG. 4A.

As briefly indicated, AHB interface 401 interfaces graphics engine 106 with high speed bus 102 in either the bus master or register slave modes. As the bus master, the graphics engine can access all user accessible areas of the system 100 memory map, including, but not limited to, the available graphics and video memory. This advantageously allows for block storage, such as for fonts or bit-mapped display data, anywhere in the system memory. Pixels are organized according to the Device Independent Bitmap standard format and can be stored as either 1, 4,8, 16, or 24 bits per pixel.

Data path 402 performs masking operations such as pixel bit plane inversion, pixel bit plane addition, and pixel bit plane subtraction. Transparency logic is provided at the back-end of the graphics data path for background preservation. In the preferred embodiment, mask logic operations are performed first, followed by destination logical combination, and then replacement of destination pixels based on source transparency description. Line pattern circuitry supports both Bressingham and pixel step line draws.

The graphics engine address path 403 includes both X and Y bidirectional incrementation circuitry for effectuating these line draws. For block operations, a set of registers are programmed to define the width of the source block and the destination block width and height. The destination block width is the same as the source block width when unpacked source pixels are being transferred to a destination block of the same size and having the same starting pixel. Additional registers define the memory organization for the source and destination blocks in terms of line length, indicate whether the source data is packed, define the pixel depth in bits per pixel, and the count direction of incrementation.

Figure 4B:
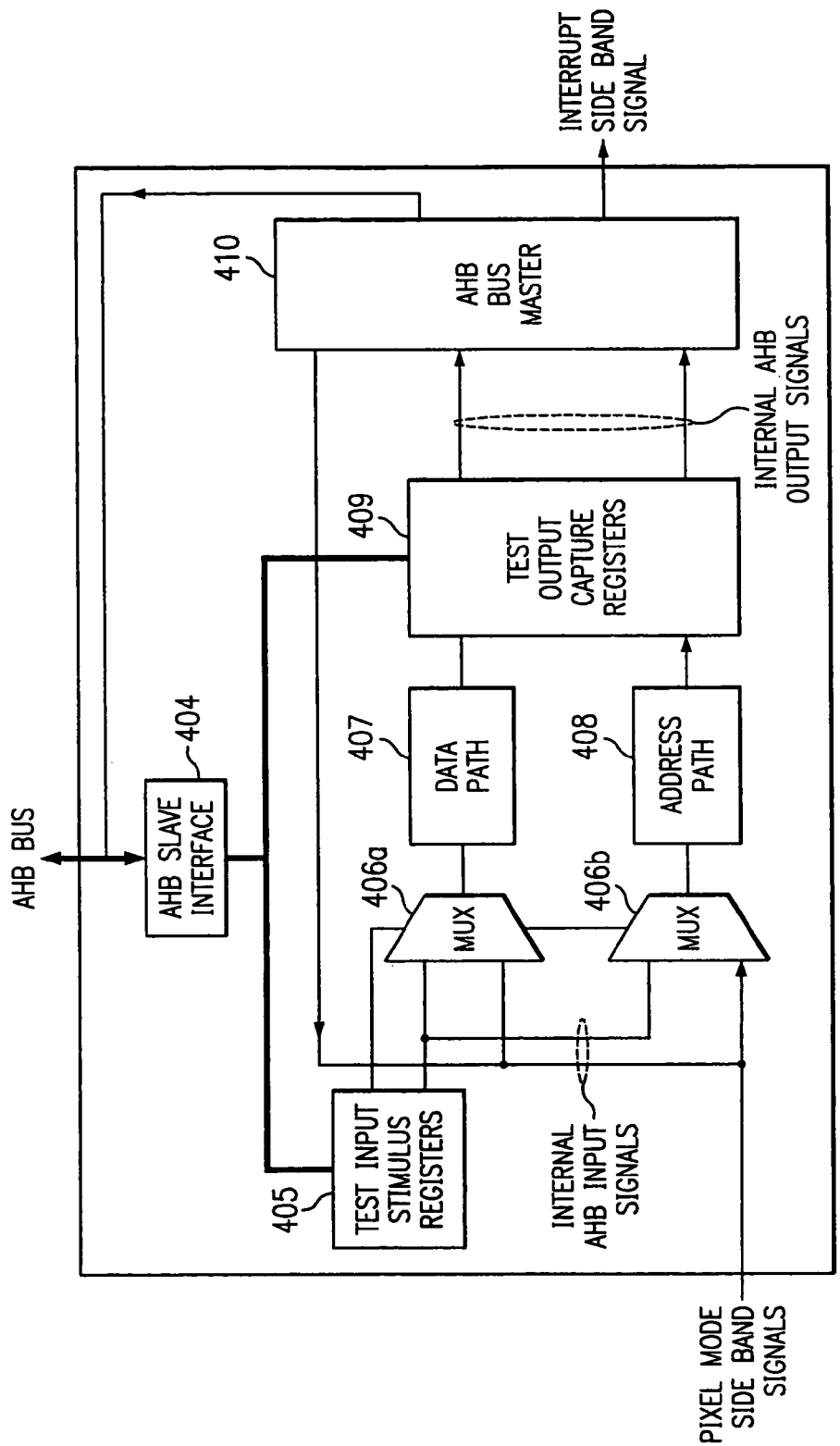
FIG. 4B illustrates the circuitry implicated in the preferred graphics engine test configuration.

The graphics engine can also be tested using the Test Interface Controller (TIC). The circuitry implicated in the preferred graphics test configuration is shown in FIG. 4B. Similar to the DMA test harness, the graphics engine test harness is controlled via an AHB slave interface registers 404. Test vectors are written into test input stimulus registers 405 and then switched by multiplexers 406 to either the graphics engine data path, shown generally by block 407, and/or the graphics engine address path, shown generally by block 408. Multiplexers 406 may also be used to pass pixel mode sideband signals through the graphics path during test. The resulting output data is then held in test output capture registers 409 where then can be fed back through multiplexers 406 or transmitted on high speed bus 102 via bus mastering circuitry 410.

The raster engine portion of raster/graphics engine 106 drives analog CRTs or digital LCDs, including non-interlaced flat panel and dual scanning devices. It can also support an optional interface to an NTSC encoder. The raster engine also preferably processes pixels in the DIB format, although those data do not necessarily have to be in a packed line architecture. Pixels can be in any one of a number of standard 4, 8, 16 or 24 bpp formats.

The raster engine also includes dedicated AMBA video bus master/transfer interface 411 which interfaces the raster engine and high speed bus 102. Moreover, the raster engine connects to the DRAM controller through a dedicated DMA port allowing video images are read directly from memory and loaded into a video FIFO within video data path 412.

The video FIFO generally maintains the video data stream from image memory (video frame buffer) to the video output circuitry without stalling. The video frame buffer can be either in main memory or a dedicated video memory area (which can be designated anywhere in the memory map). Generally, when the FIFO is less than half full, data are read from the video frame buffer until the FIFO is full, at which time the video data fetch halts. Once the FIFO again goes below half full, the process repeats itself, with more data retrieved from the frame buffer.

Video data path 412 additionally includes blink control logic, a grayscale generator, cursor generation logic and a pair of color look-up tables. One look-up table is inserted into the video pipeline while the other is accessible for update via bus 102. Multiplexers select between pixel data from the color look-up tables, the grayscale generator, cursor logic, and the blinking control logic. The output section of video data path 412 preferably includes an YCrCb encoder for interfacing with an NTSC encoder and output shift logic which allows multiple pixels to be shifted out each clock.

The raster engine also embodies hardware cursor generation circuitry which is based on a dedicated cursor AMBA bus master and independent cursor address counters. As a result, the cursor can be stored anywhere in the available memory space associated with high speed bus 102. Cursor size, location and color are register programmable.

The raster engine includes circuitry 413 which generates the vertical and horizontal synchronization and blanking signals, necessary to drive the display, as well as the pixel clock SPCLK. A pulse width modulated brightness control signal is also generated which, when used with an external resistor and capacitor, is used to generate a DC brightness control voltage level.

Figure 4D:
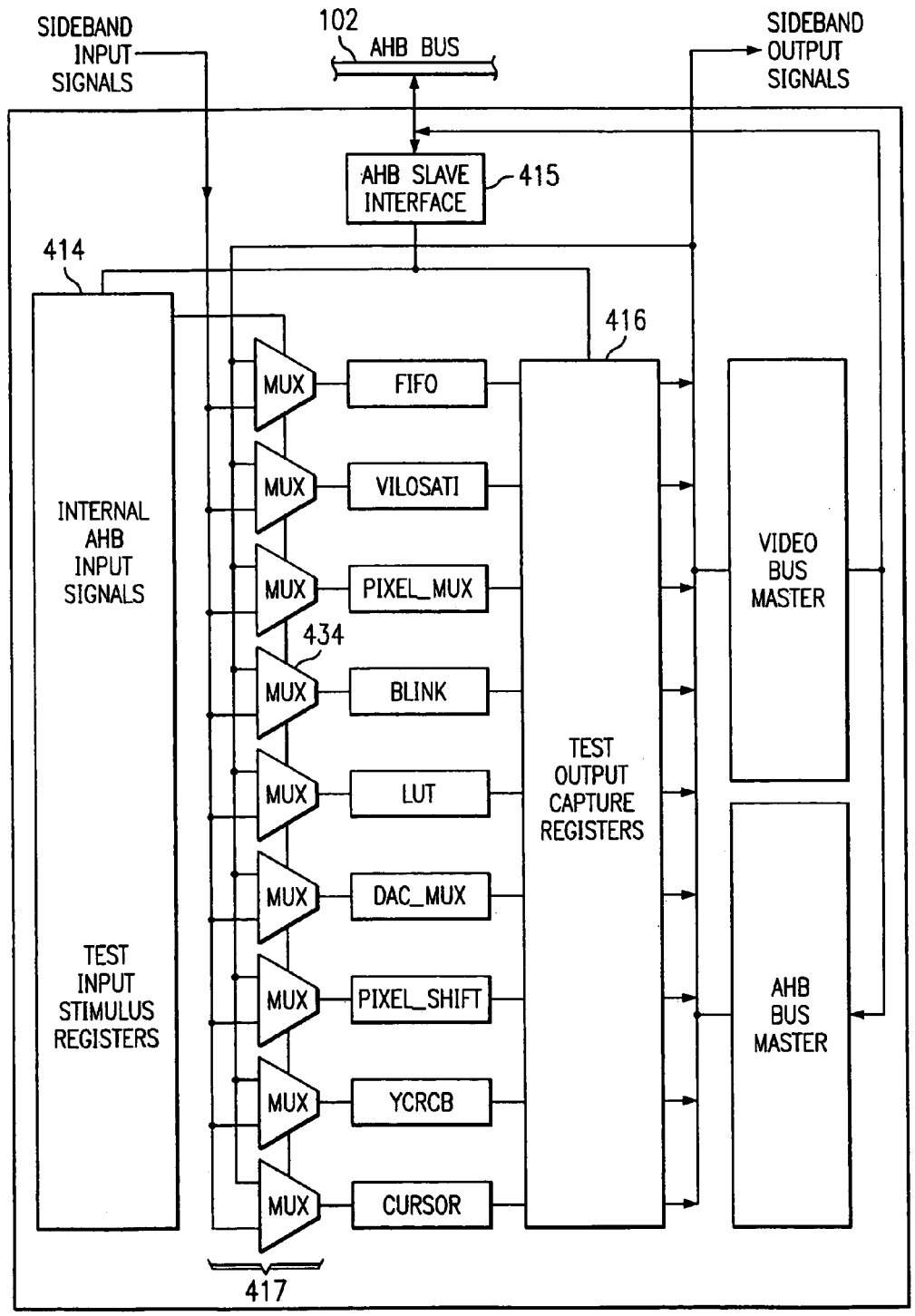
FIG. 4D illustrates a configuration for testing the various primary blocks of the raster engine using the TIC harness.

The various primary blocks of the raster engine can be tested using the TIC harness shown in FIG. 4D. Test input stimulus registers 414 are loaded from AMBA bus 102 via slave register interface 415. Under control of the register contents, multiplexers 417 selectively couple either side band input signals or feedback from the test output capture registers 416 to the selected block or blocks under test.

An EtherNet MAC 107 is also provided on AMBA bus 102 in the preferred embodiment. EtherNet MAC 107 supports communications with external devices in accordance with the EtherNet/ISO/IEC 8802-3 protocol. Under this protocol, a "listen before talk" mechanism is employed since only one device on a single shared medium can transmit at a time. This access method is generally known as Carrier Sense Multiple Access with Collision Detection (CSMA/CD). Each station monitors its receiver for carrier activity. When activity is detected, the medium is busy, hence that station requiring the medium waits until the carrier is no longer detected.

Figure 5A:
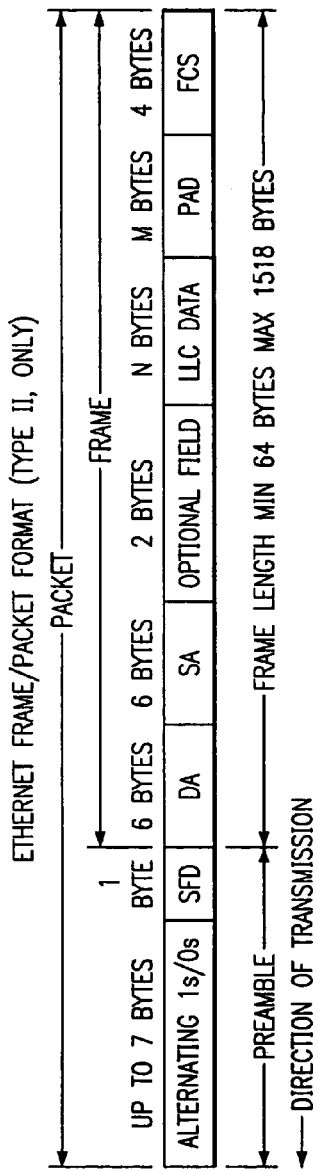
FIG. 5A sets out an exemplary Type II EtherNet frame/packet format for purposes of discussing the EtherNet MAC.

FIG. 5A sets out an exemplary Type II EtherNet frame/packet format upon which the following discussion will be based.

Figure 5C:
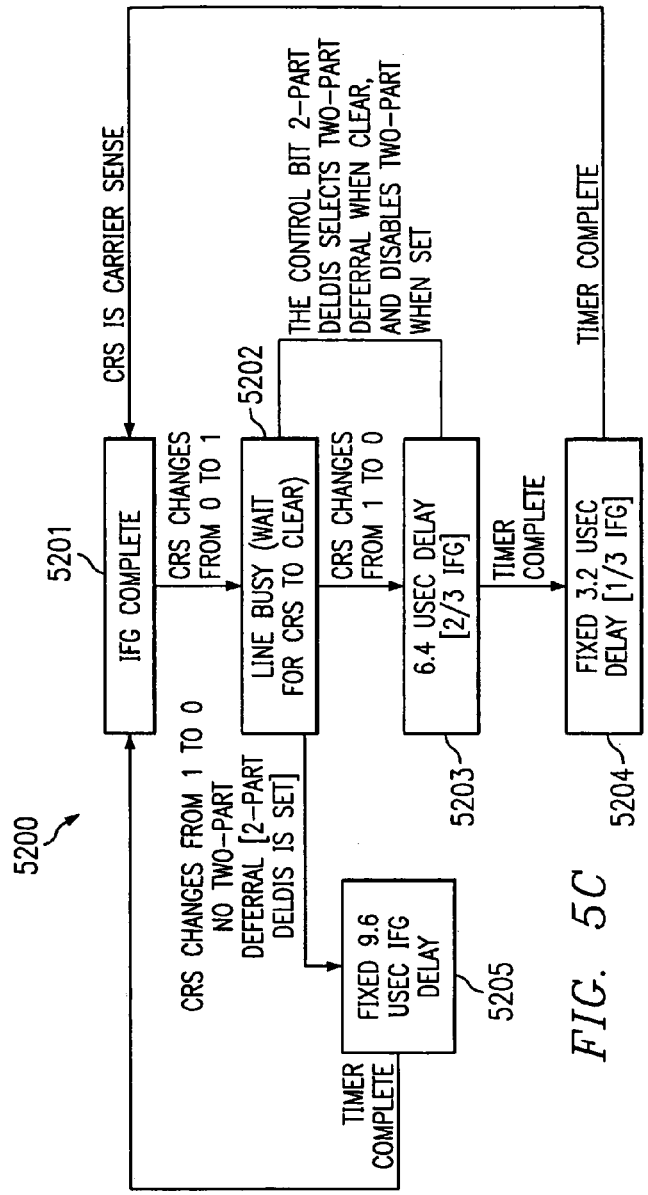
FIG. 5C is a state diagram illustrating a preferred Carrier Deference procedure used in the operation of the EtherNet MAC.
Figure 5B:
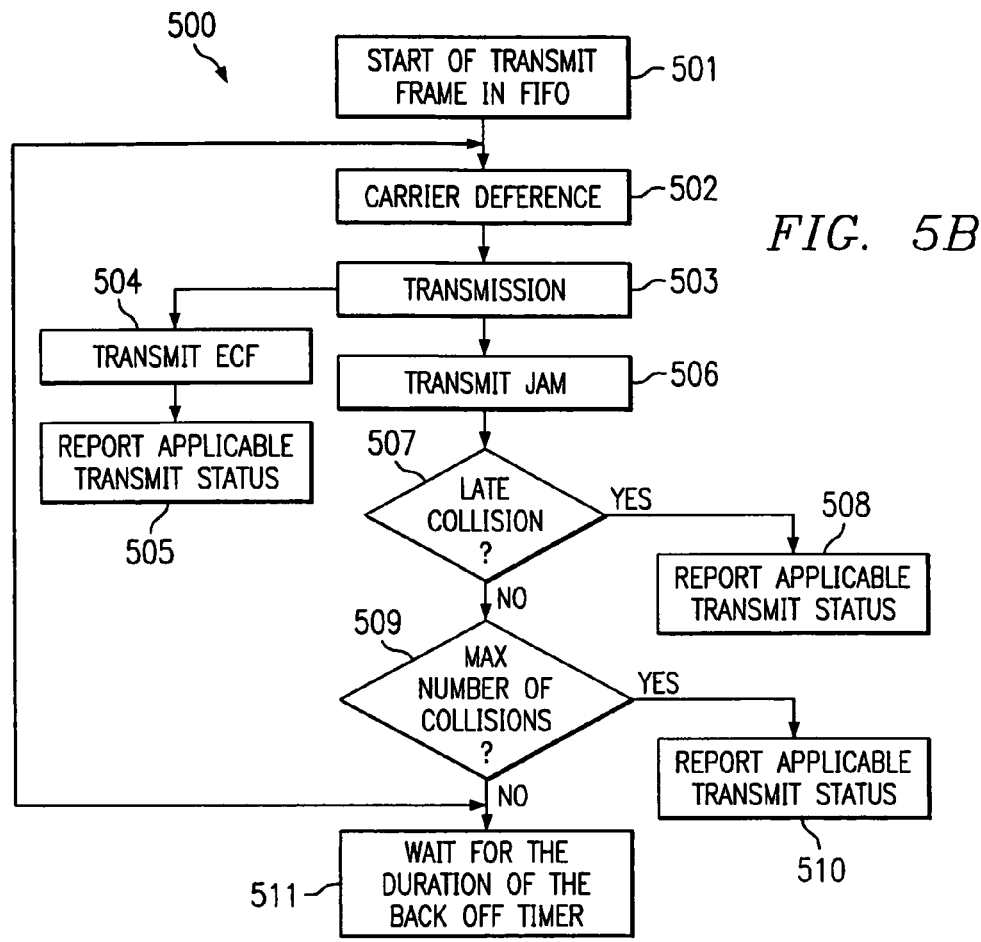
FIG. 5B generally depicts the transmission process through the EtherNet MAC.

The transmission process 500 is shown generally in FIG. 5B, the primary procedures being carrier deference, back-off, packet transmission, transmission of EOF and SQE test.

The transmission of the next frame in the first-in-first-out memory of the transmitting device is initiated Step 501. At Step 502, the carrier deference procedure is run.

A preferred Carrier Deference procedure 5200 is illustrated by the state diagram of FIG. 5C. It should be noted that the carrier deference procedure can be entered from any one of the depicted states, although this procedure can only be exited from the Interframe Gap (IFG) Complete state 5201. In this diagram, "CRS" is the sense of the carrier state, where a logic 0 represents no carrier sensed and a logic 1 represents a carrier present (sensed) state.

Assume for discussion purposes that the procedure is currently in the IFG Complete state at Step 5201. When the line is sensed as busy, the CRS value changes from 0 to 1 and the procedure waits at Step 5202 for the CRS value to clear. Once the line is free and the CRS value clears to zero, either a one part or two part deferral is initiated, as selected by setting a corresponding bit in register.

When a two part deferral is selected, a 6.4 μsec delay corresponding to ⅔ of one full IFG period is initiated at Step 5203. If CRS returns to a logic 1 during this 6.4 μsec delay, (i.e. the line becomes busy) the process returns to the line busy status (Step 5202); otherwise the procedure proceeds to Step 5204 where a second fixed 3.2 μsec delay, corresponding to ⅓ of one IFG period, is inserted. When the 3.2 μsec timer completes at Step 5204, the process loops back to the IFG Complete state 5201.

When a one part deferral is selected, a fixed 9.6 μsec delay corresponding to a full IFG period is inserted at Step 5205. When this delay times out, the procedure returns to Step 5201.

The 2-part deferral has an advantage for AUI connections to either 10BASE-2 or 10BASE-5. If the deferral process simply allows the IFG timer to complete, then it is possible for a short IFG to be generated. The 2-part deferral prevents short IFGs. The disadvantage of the 2-part deferral is that the 2-part deferrals are generally longer.

After exiting the Carrier Deference procedure at Step 502, the actual transmission of data on to the medium begins at Step 503 (FIG. 5B). The transmission ends with either the transmission of the end of complete frame (ECF) indicator at Step 504, and the consequent transmission of a status report at Step 505, or a collision. There are two kinds of collisions: normal collisions (ones that occur within the first 512 bits of the packet) and late collisions (ones that occur after the first 512 bits). In either collision type, the MAC engine preferably sends a 32-bit jam sequence at Step 506, and stops transmission.

A decision is made at Step 507 as to whether the collision was late. In the event of a late collision, the applicable transmit status is reported at Step 508, and the transmission halted without a re-attempt. In the case of a normal collision, a determination is made at Step 509 as to whether a maximum number of normal collisions have occurred and if so, the transmission is aborted, and applicable transmit status is reported at Step 510. The number of allowable collisions is determined from bits set in register, and typically is either 16 or 1. If the maximum number of collisions has not occurred, the back-off timer is triggered at Step 511, after which the process subsequently looped back to the Carrier Deference procedure (Step 502).

The back off timer value is calculated using either of the ISO/IEC standard or a modified back-off algorithms, as selected by the host. The standard or "truncated binary exponential back off" algorithm is generally in accordance with the formula: $0 \leq r \leq 2k$, where r is a random integer representing the number of slot times of wait before another transmission is attempted, wherein a slot time is equivalent to 512 bits (51.2 msec), k=minimum (n,10), and n is the nth retransmission attempt. The modified back-off algorithm increases the delay after each of the first three transmit collisions: $0 \leq r \leq 2k$, where k=minimum (n,10), but not less than 3, and n is the nth retransmission attempt. The advantage of the modified algorithm over the standard algorithm is a reduction in the possibility of multiple collisions on any transmission attempt, although the modified algorithm does extend the maximum time needed to acquire access to the transmission medium.

The host may also disable the back off step by setting a bit in register. In this case, the transmitter waits for the IFG before starting transmission. It should again be noted that for a late collision, the transmission is aborted and no back off is implemented.

During transmission, EtherNet MAC appends the Frame Check Sequence (FCS) to the packet, as shown in FIG. 5A. When enabled, a standard 32-bit FCS is used and a standard CRC computation is performed to generate error flags and associated interrupts, as required. For reference, the standard polynomial for the CRC is:

$$G(x)=X^{32}+X^{26}+X^{26}+X^{22}+X^{16}+X^{12}+X^{11}+X^{10}+X^{8}+X^{7}+X^{5}+x^{4}+x^{2}+x+1.$$

EtherNet MAC 107 performs two forms of destination address filtering, namely, perfect filtering where the address is checked for an exact match and hashing where the address is checked for inclusion in a group. In addition, in the Promiscuous mode when enabled in register, all destination addresses are accepted.

In the preferred embodiment, four programmable perfect address filters are provided, as well as an "all ones filter" for broadcast frames. A register is used to control whether a particular filter is used, with the four filters sharing the same address space. Preferably, the first filter is used to filter normal EtherNet addresses, as well as for detecting remote wake up frames and, optionally, pause (flow control) frames. In turn, the second filter is typically used for the recognition of pause frames, and may also be programmed to correspond to the multicast addresses of MAC control frames. The third and fourth filters preferably provide extra optional address match capabilities, for example, as extra individual address or multicast address filters.

Figure 5D:
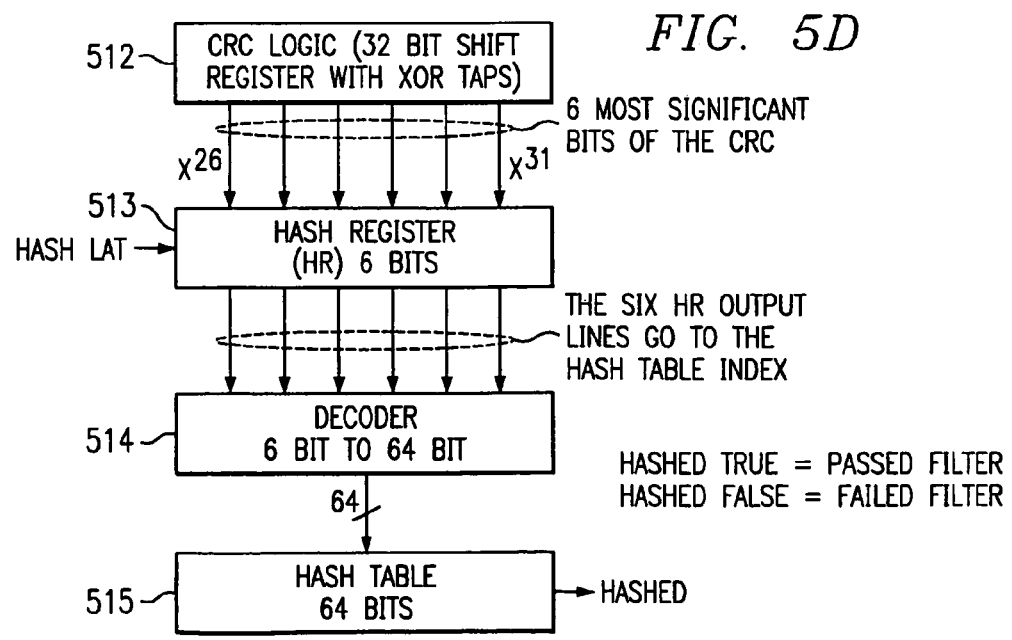
FIG. 5D depicts a schematic block diagram of the hash filter used in the EtherNet MAC.

A schematic block diagram of the hash filter is depicted in FIG. 5D. Generally, the hash filter is a 64-bit Logical (Multicast) Address Filter which performs Destination Address (DA) filtering hashed by CRC logic. CRC logic 512 initiates a CRC computation starting at the first bit of the current frame (i.e., the first bit of the DA, where the DA is a packet, such as shown in FIG. 5A, without the preamble). CRC Logic 512 includes a 32-bit shift register with specific Exclusive-OR feedback taps. After the entire DA has been shifted into CRC logic 512, the 6 most significant bits of the contents of CRC logic 512 are latched into 6-bit hash register (HR) 513. The contents of hash register 513 are passed through a 6-bit to 64-bit decoder 514. Each of the 64 bits from the decoder are presented to a hash table 515 one at a time. The output of the hash table determines whether the DA has passed the hash filter; when true, the DA has passed hash filtering and when false, the DA has failed the hash filter.

Whenever the hashed filter is passed on received good frames, the output of the hash register 513 is presented as the Hash Table Index. A received good frame is determined to be one without CRC error, and which is correct in length (64<length<1518). By setting a register bit, any received multicast frame passing the hash filter is accepted. A multicast frame is one which has IA[0]=1. If a second register bit is set, then a frame with any individual address frame AND passing the hash filter is accepted. An individual address frame is one which has IA[0]=0. For a frame to pass IAHashA it must have IA[0]=0 and pass the hash.

EtherNet MAC 107 provides special support for flow control by the transmission and reception of pause frames. A pause frame is a control frame that defines an amount of time for a transmitter to stop sending frames. Sending pause frames thereby reduces the amount of data sent by a remote station. The MAC can detect receive pause frames, and automatically stop its transmitter, for the appropriate period of time. To be interpreted as a pause frame: (1) the Destination Address must be accepted by one of the first two perfect address filters; (2) a Type field must match that programmed in a Flow Control Format register; (3) the next two bytes of the frame (MAC Control Opcode) must equal zero; and (4) the frame is of legal length with a good CRC. If accepted as a pause frame, the pause time field will be transferred to a Flow Control Timer register. The pause frame may be optionally passed on to the Host CPU or discarded.

When receive congestion is detected, an EtherNet MAC 107 driver may transmit a pause frame to the remote station, to create time for the local receiver to free resources. As there may be many frames queued in the transmitter, and there is a chance that the local transmitter is itself being paused, an alternative method is provided to allow a pause frame to be transmitted. In particular, by setting the Send Pause bit in a Transmit Control register, a pause frame will be transmitted at the earliest opportunity. This will occur either immediately following the completion of the current transmit frame. If the local transmitter is paused, the pause frame will still be sent, and a pause timer will still be decremented during the frame transmission. To comply with the standard, pause frames should be sent on full duplex links. The MAC does not enforce this, it is left to the driver. If a pause frame is sent on a half duplex link, it will be subject to the normal half duplex collisions rule and retry attempts.

EtherNet MAC 107 includes a receive descriptor processor which manages receive data frames. In particular, the host passes descriptors to the receive descriptor processor through a circular receive descriptor queue in a contiguous space in host memory. EtherNet MAC 107 returns status information through a circular receive status queue in host memory. The two independent queues support burst transfers, which reduce bus usage and latency. The location and characteristics (e.g. length) of these queues are set up in register.

Figure 5E:
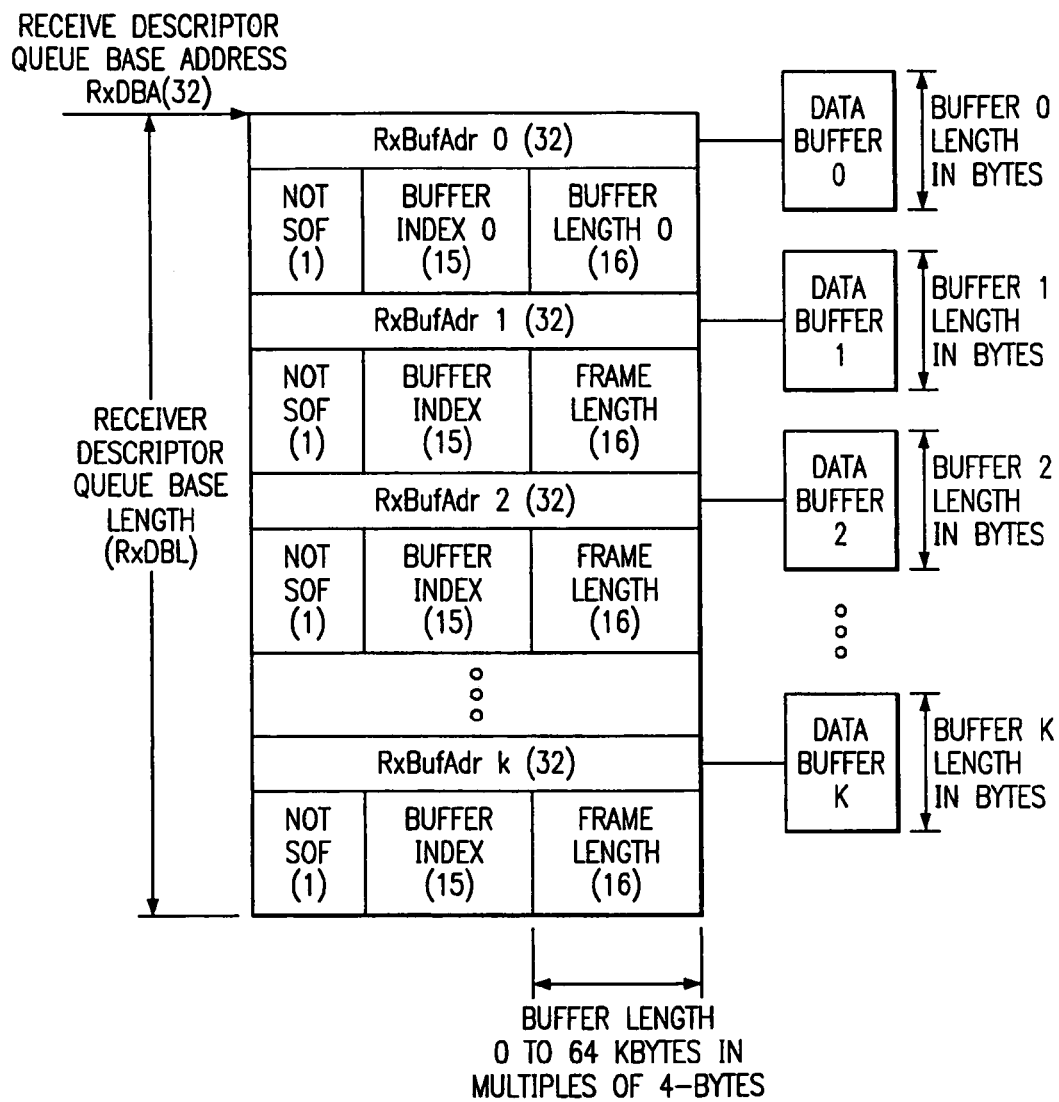
FIG. 5E depicts preferred receive descriptor format and frame fragment chaining.

Each receive descriptor is composed of two double words defining one data buffer entry. The first double word contains the data buffer address and fields defining the buffer length, the buffer index and a Not Start of Frame bit (set by the host when a new frame is not being started, for example, when frame fragments are being chained). Control of the use of the descriptors is handled using the Receive Descriptor Enqueue register (RxDEQ), where "enqueue" refers to the action of adding descriptors to the end of an existing queue. To enqueue receive descriptors, the CPU writes a number of available descriptors to the RxDEQ register, and that number is automatically added to the existing number of available queue entries. When the MAC reads descriptors into its on local storage (internal buffer), the number read is subtracted from the total. The CPU can read the total number of unread valid descriptors left in the queue from the RxDEQ. A preferred receive descriptor format and frame fragment chaining are illustrated in FIG. 5E.

EtherNet MAC 107 uses the Receive Status Queue to send status messages to the host. Typically, receive status entries are written to the queue by EtherNet MAC 107 at the end of a header, end of a buffer or the end of a frame. More generally, the status messages are preferably written after the completion of the given data transfer. Receive status messages are also formed from two double words. The first double word includes fields indicating receive error status, end of buffer and/or end of frame indicators, address matching, and a hash table index, among other things. The second double word includes fields for a receive frame process bit, a buffer index corresponding to the status entry, and a frame length identifier.

The Receive Status Enqueue register is used by the CPU to pass free status locations to the EtherNet MAC. To simplify this process the CPU writes the number of additional free status locations available to this enqueue register. The MAC adds the additional count to the count of previously available entries to determine the total number of available receive status entries. When the MAC writes status messages to the queue it subtracts the number written from this total.

Figure 5F:
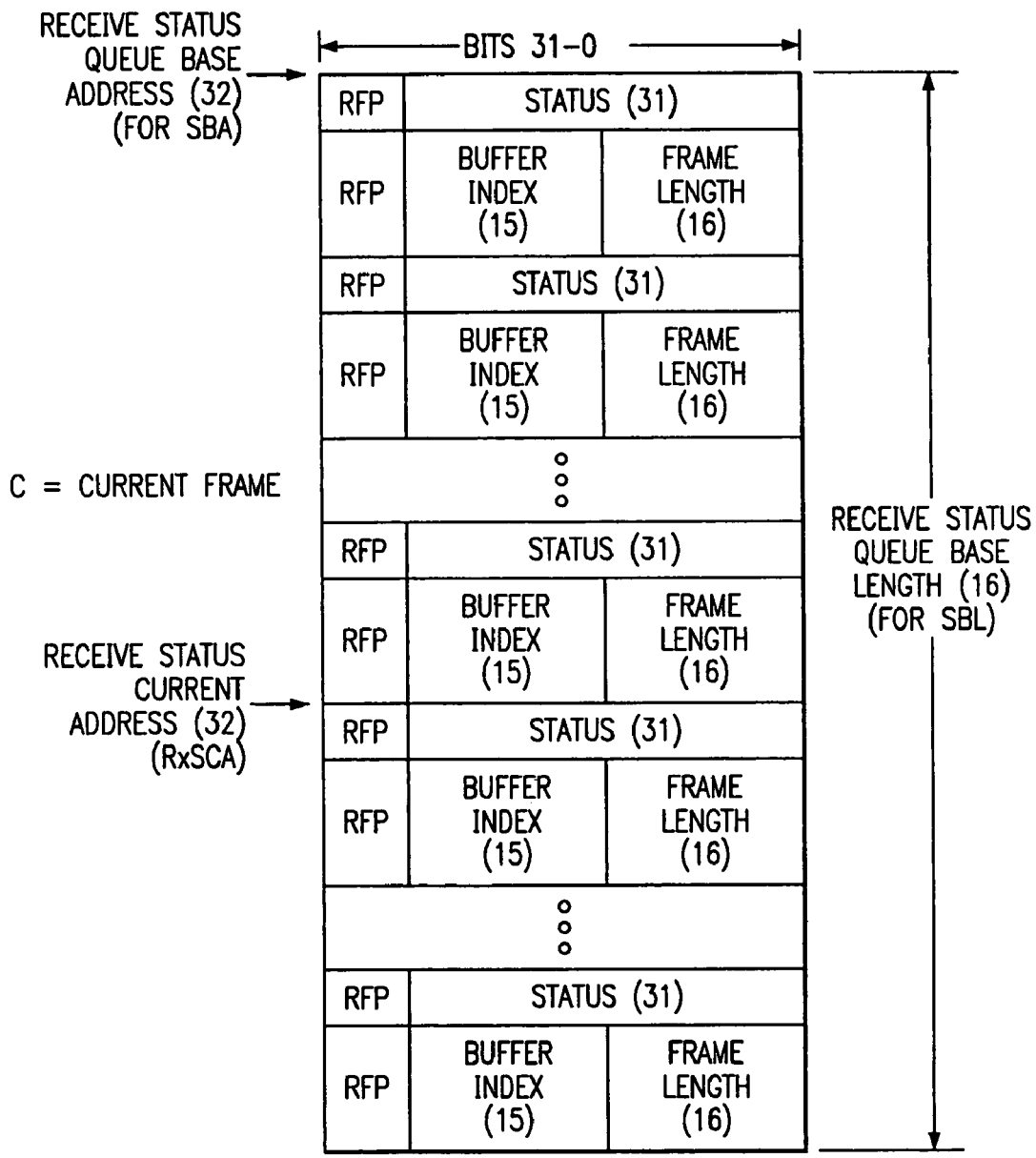
FIG. 5F depicts a preferred formatting for the receive status queue.

A preferred formatting for the receive status queue is shown in FIG. 5F.

Figure 5G:
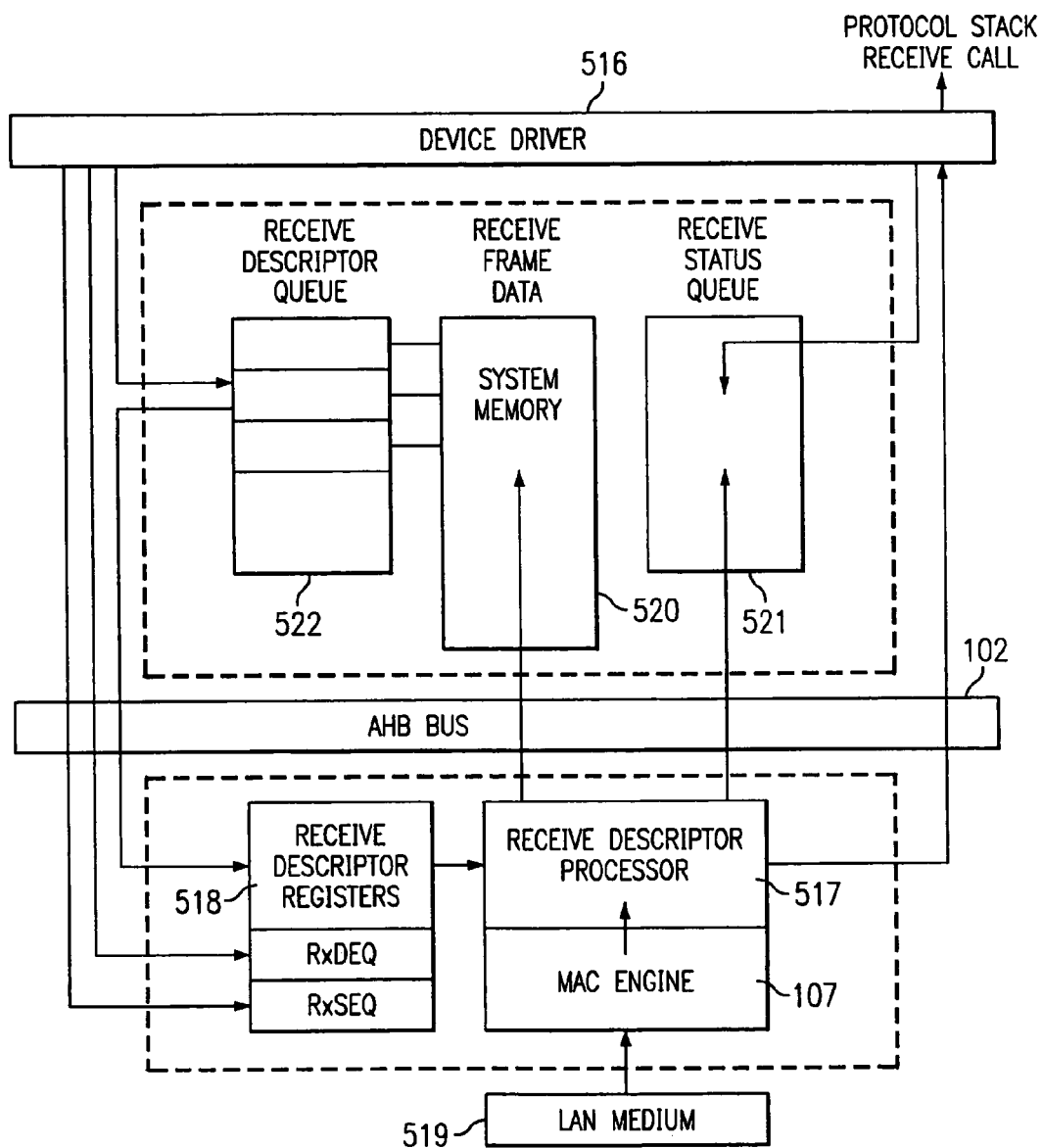
FIG. 5G illustrates the receive data flow through the EtherNet.

The receive data flow through EtherNet MAC 107 is illustrated with reference to FIG. 5G, and the following table:

TABLE 1

| | |
|---|---|
| 1. | Host Driver 516 initializes a given number of receive descriptors in receive descriptor queue 522 |
| 2. | Driver 516 sets the register field RxDeq with the additional number of receive descriptors. |
| 3. | On-chip Descriptor Processor 517 fetches descriptors into internal FIFO. |
| 4. | The address of the next receive data buffer is loaded into the Receive Buffer Current Address register of Receive Descriptor Processor 517 from Receive Descriptor Registers 518. |
| 5. | A frame is received from the LAN medium 519. |
| 6. | MAC Engine 107 passes the frame data to the Receive Data FIFO of processor 517. |
| 7. | The Receive Descriptor Processor stores the frame data into system memory 520 (Steps 5, 6, and 7 can overlap). |
| 8. | End of frame status is written to the Receive Status Queue 521; RxSeq decremented. |
| 9. | Driver 516 interrupted if interrupt conditions met. |
| 10. | Received frame passed to the protocol stack. |
| 11. | Driver 516 clears the Receive Frame Processed . bit in Status Queue 521 |
| 12. | Driver 516 writes number of entries processed in the status queue, freeing them for future use by the MAC 10. |
| 13. | After the driver 516 gets the used receive buffers back from the stack, the drive rmay repeat step 2. |

Receive errors are categorized as hard errors and soft errors. A soft error indicates that a frame was not successfully received; this type of error must be addressed by the host driver. Soft errors include: CRC errors, receiver over-run, frames too long, or frames too short. Hard errors are reliability induced errors and include AHB bus access errors, parity errors (when enabled), system errors, and master or target aborts. Hard errors stop receive DMA activity, and require host intervention for recovery.

Figure 5H:
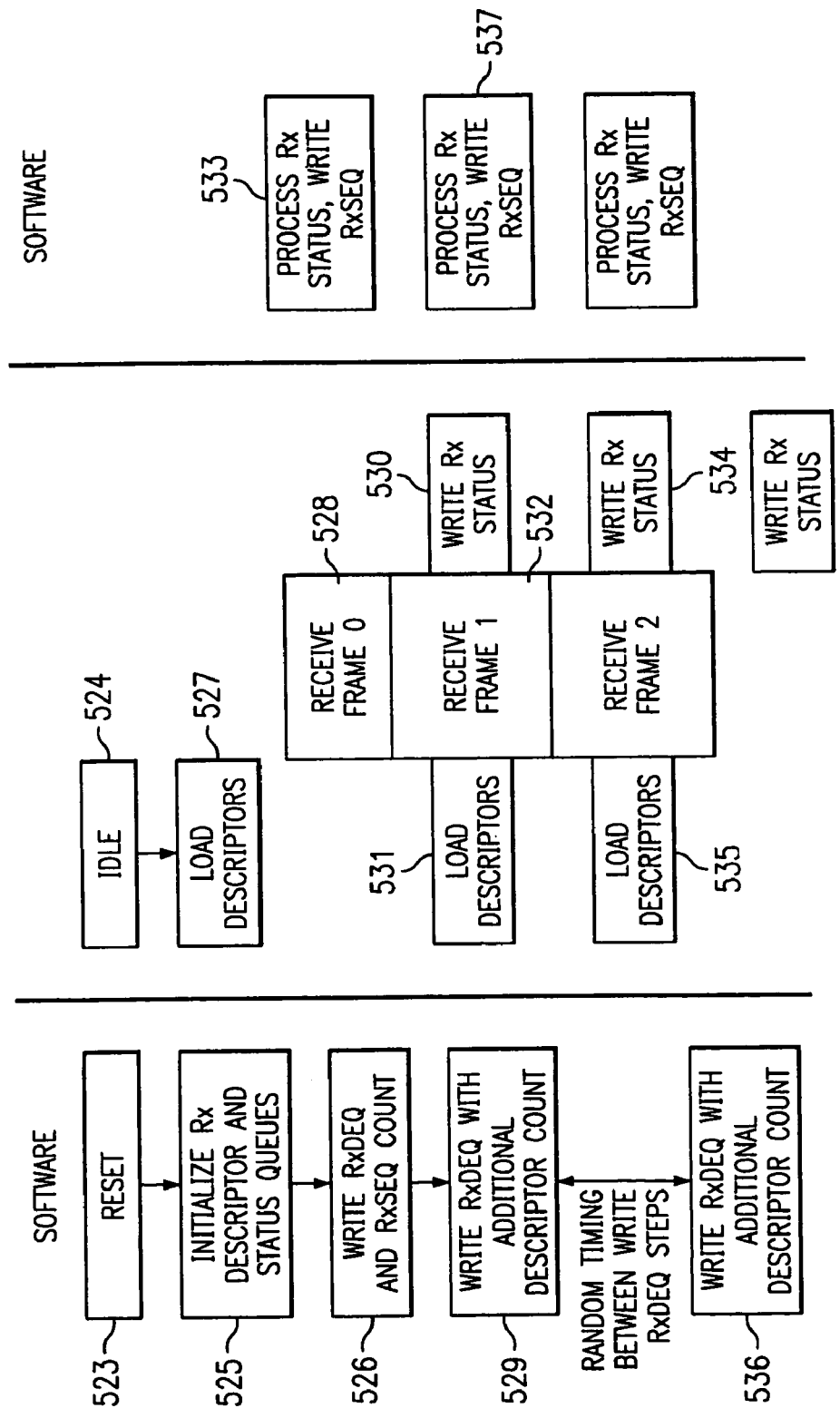
FIG. 5H illustrates the hardware-software interaction during the EtherNet receive process.
Figure 51:
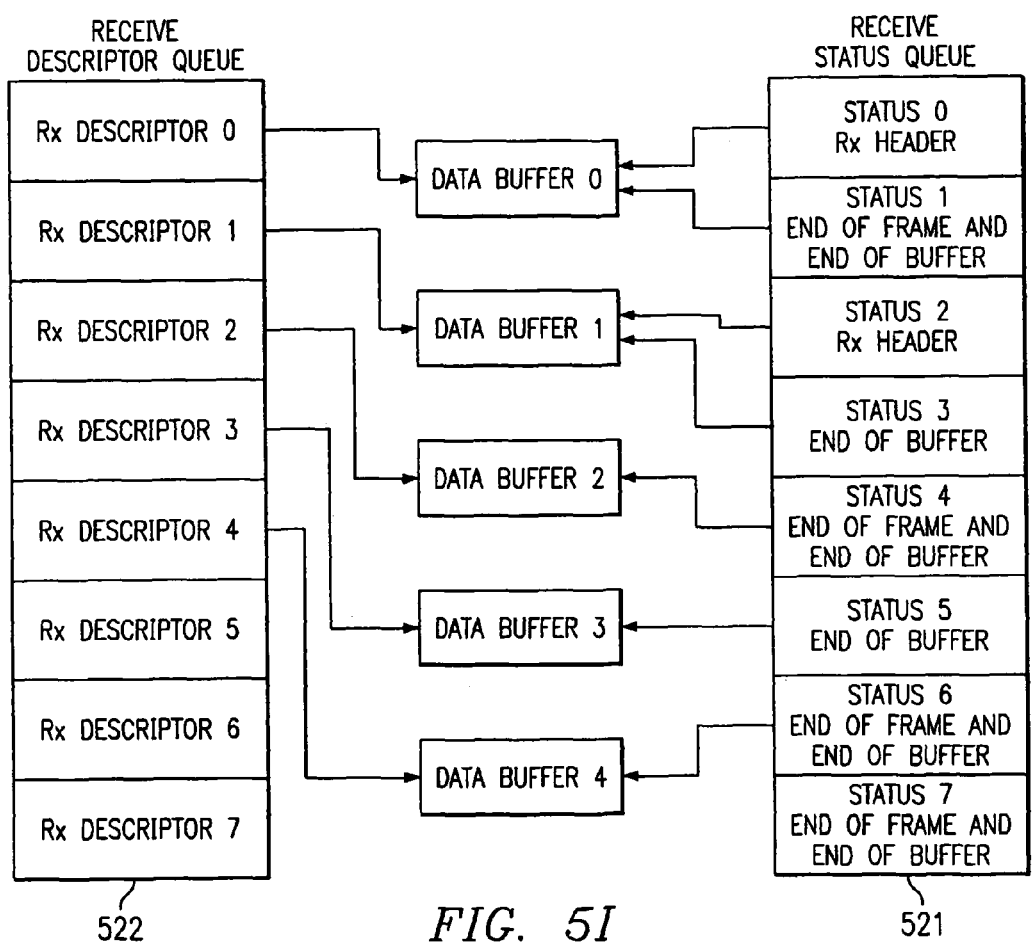

FIG. 5H illustrates the hardware-software interaction during the receive process. Initially the software resets at Step 523 and the hardware is in an idle mode at Step 524. The receive descriptor and status queues are initialized by software at Step 525 and additional descriptors and status entries are added to the corresponding queues at Step 526. At Step 527, the descriptors are loaded by the hardware and the first frame is received at Step 528.

Additional descriptors are written into the queue at Step 529. At the end of the first frame, a corresponding entry in the transmit status queue is written to (Step 530). At Step 531, additional descriptors are loaded by the hardware while another frame of data is received at Step 532. At Step 533, the next status entry in the receive status queue is processed by the host and additionally entries made available by the host.

This process generally continues in a similar manner, with the hardware updating the status queue at Step 534 and loading new descriptors at Step 535. The software adds additional descriptors to the descriptor queue at Step 536, processes status entries from the status queue and then frees entries at Step 537.

An exemplary state of the receive queues following the reception of four frames is shown in FIG. 5I. The first frame uses Data buffer 0 only and has two status entries associated with it. The first status entry (status 0) is for the reception of a receive header and the second (status 1) for the end of frame/buffer, with both status entries pointing to the beginning of data buffer 0. The second frame occupies two buffers (data buffers 1 and 2), and is associated with three status entries (2, 3, and 4). Status 2 entry is for the receive header, status 3 entry for the end of buffer 1 indicator (e.g. frame size larger than buffer size), and status 4 entry for the end of frame/buffer indicator. The next two frames both occupy one data buffer each and require one status entry each. (This could be the case for short frames which do not exceed the header size or the buffer size.) The result is that the status queue may be used at a different rate than the descriptor queue, based on the type of traffic and the options selected.

Figure 5J:
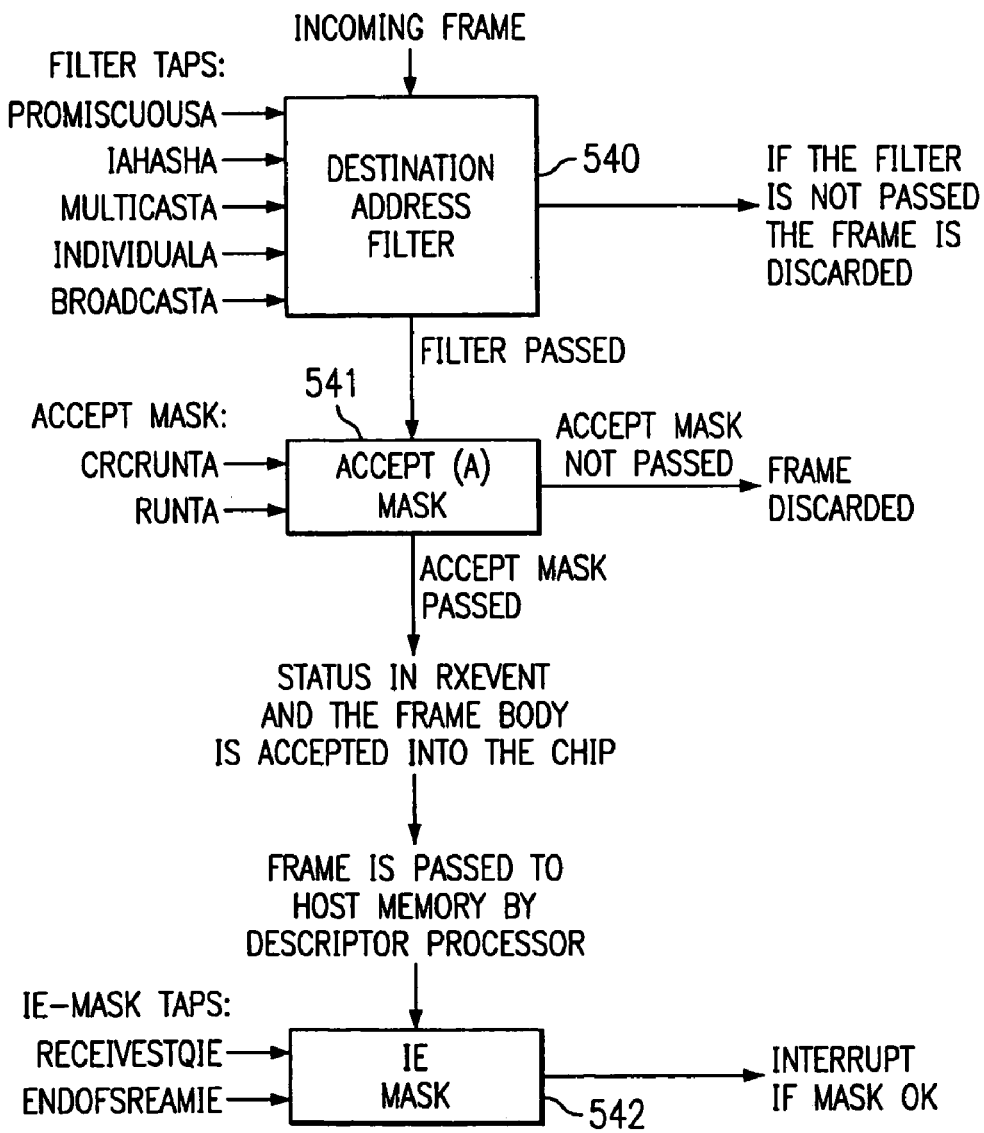
FIG. 5J depicts a preferred receive frame pre-processing procedure.

A receive frame pre-processing procedure is shown generally in FIG. 5J. First the frame is either passed on to the next level or discarded according to the destination address (DA) filter 540. An accept mask 541 is then applied. A frame is accepted when the frame data are brought into and through the chip. Frames not passing the accept mask are discarded. An interrupt (IE) mask 542 makes the decision on causing an interrupt.

Transmit descriptors are passed from the CPU to the MAC via a circular transmit descriptor queue. The location and size of the queue are set at initialization by the host by writing to register. Enqueueing descriptors is the process of adding descriptors to an existing queue and is achieved by writing an additional number of descriptors to the Transmit Descriptor Enqueue register. The written value will be added to the previous value to keep a running total, as descriptors are read by the MAC the running total is decremented. The running total is available by reading the enqueue register. It should be noted that one frame may be described by more than one descriptor, with the final descriptor containing the EOF bit, and that not all the descriptors for a frame need to be supplied at once.

Figure 5K:
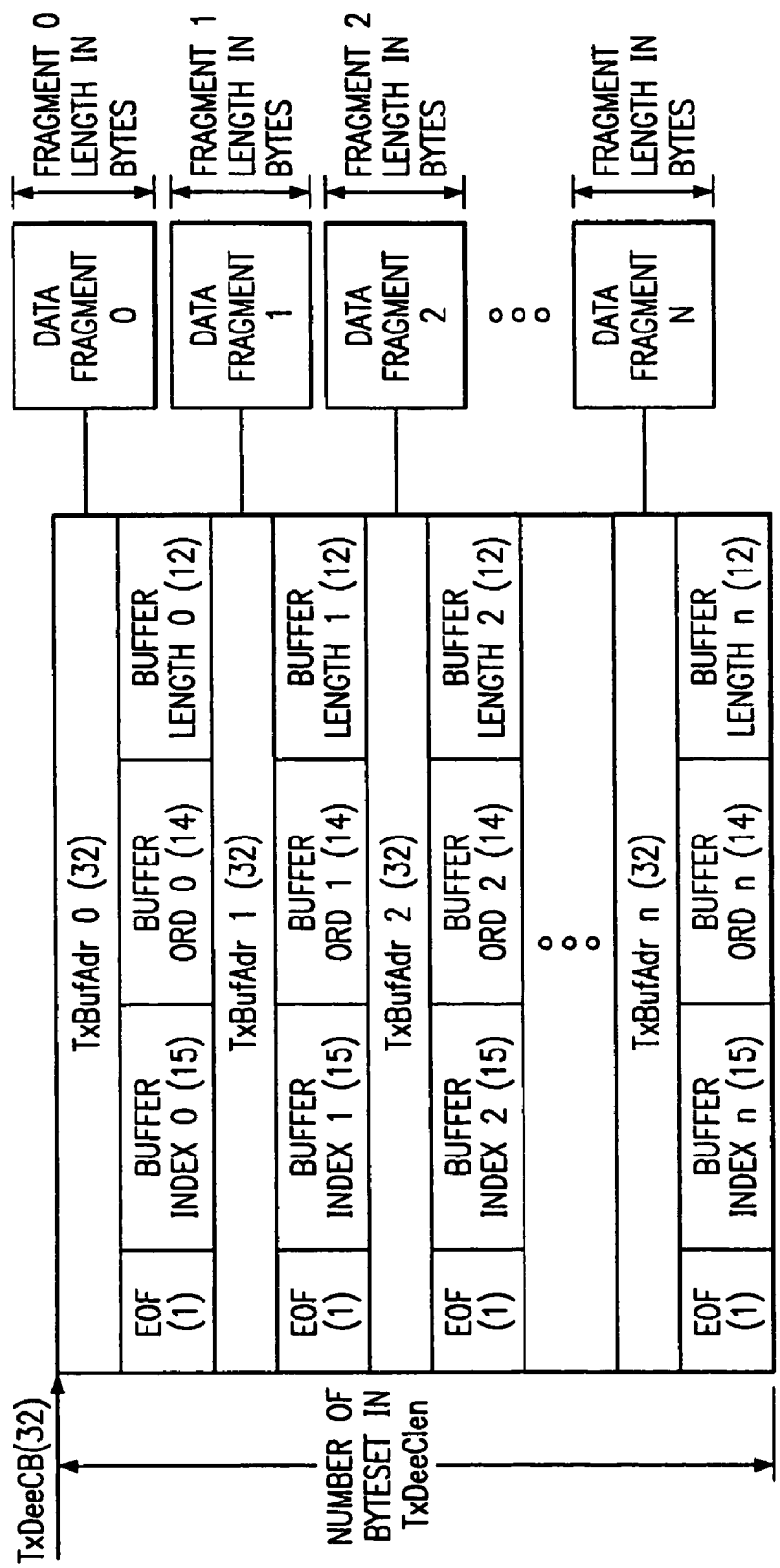
FIG. 5K depicts preferred transmit descriptor format and exemplary data fragments.

A preferred transmit descriptor format and exemplary data fragments are shown in FIG. 5K. Transmit descriptors preferably consist of two double words. The first double word contains the transmit buffer address pointer. The second double word includes the end of frame bit and the transmit buffer index for tracking the transmit buffer with the host. The second word also includes an abort frame bit for terminating a frame with a bad CRC, and a buffer length field representing the byte count in the transmit buffer.

Figure 5L:
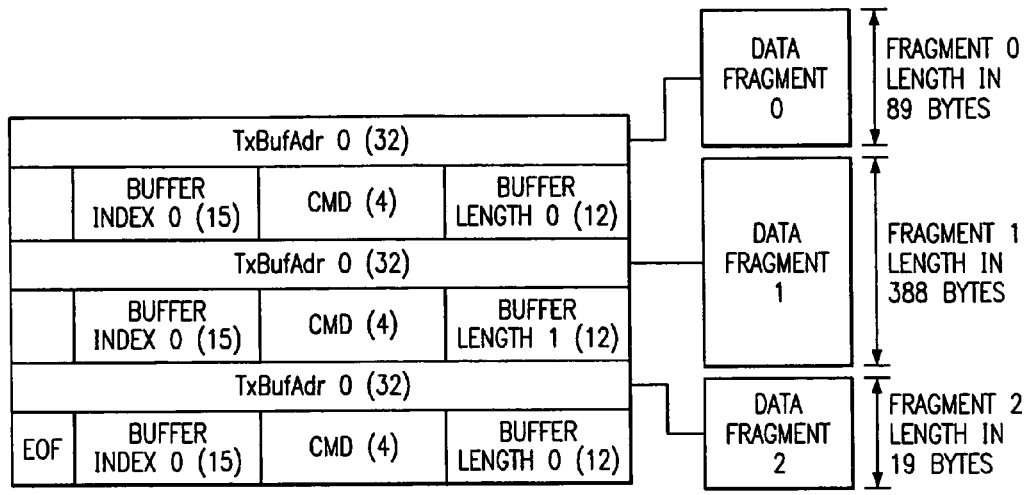
FIG. 5L illustrates an exemplary specific case of an EtherNet transmission where one frame is transmitted from three fragments.

FIG. 5L illustrates a specific case where one frame is transmitted from three fragments. After hardware has acquired the medium and transmitted the preamble, fragments 0, 1, 2 are transmitted in order for a total of 446 bytes (39+388+19). Since the CRC bit in the first frame fragment is clear, the hardware appends the 4 byte CRC making the total frame length 430 bytes. Finally, the end-of-frame indicator is sent according to normal EtherNet procedures.

Figure 5M:
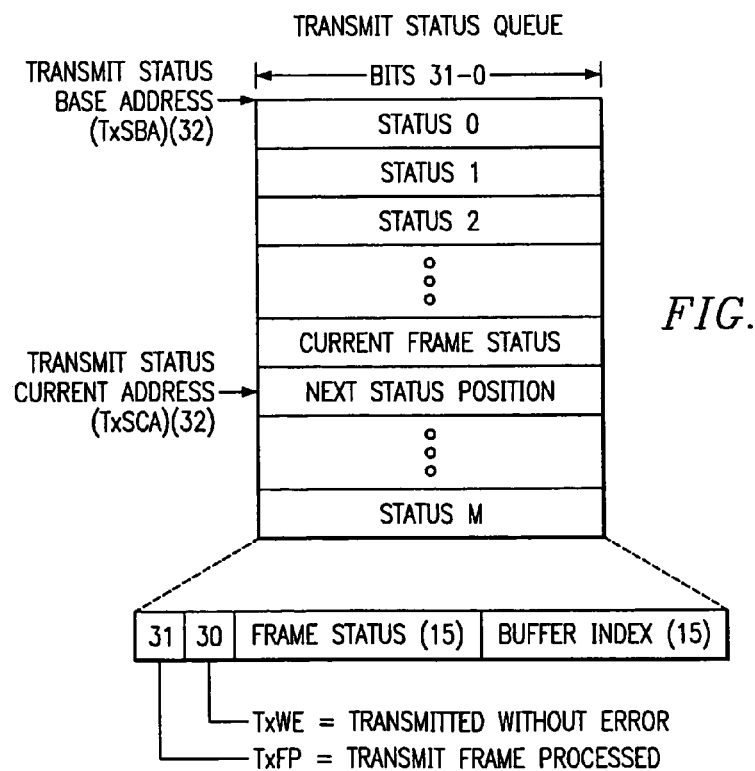
FIG. 5M illustrates the EtherNet transmit status queue format.

A Transmit status queue is used to pass transmit status messages from EtherNet MAC 107 to the host. Preferably, the status queue is also a circular queue in contiguous memory space. The location and size of the queue are set at initialization by the host by writing location and size data in register. The transmit status queue format is shown in FIG. 5M. Generally, one transmit status entry is posted per transmit frame, regardless of the number of transmit descriptors used for that frame. A preferred entry includes a transmit frame processed bit, transmit without error bit, 20 frame abort and loss of CRS bit, out-of-window bit, under-run and excessive collision bits, a field representing the number of collisions, and the transmit buffer index.

Figure 5N:
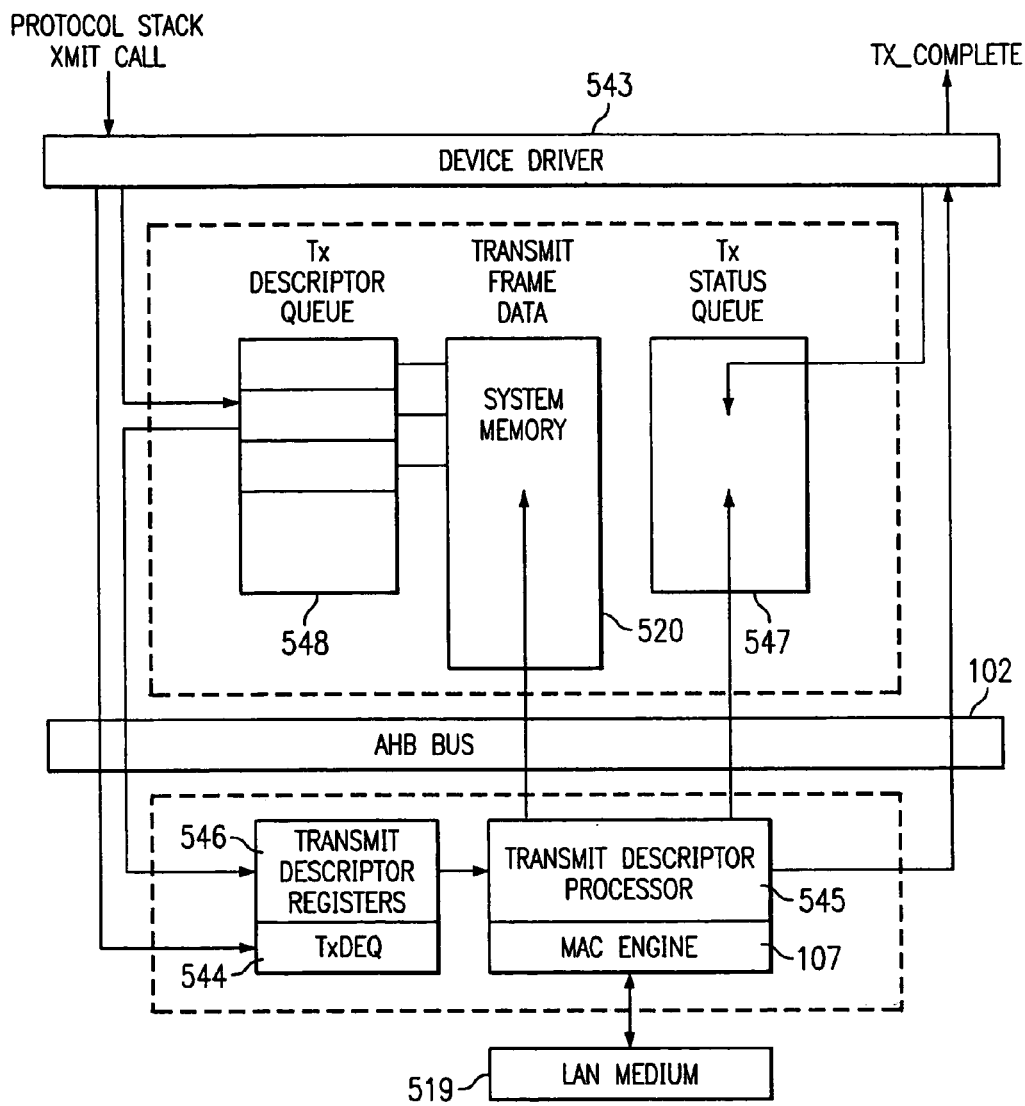
FIG. 5N illustrates the general EtherNet transmit flow.
Figure 50:
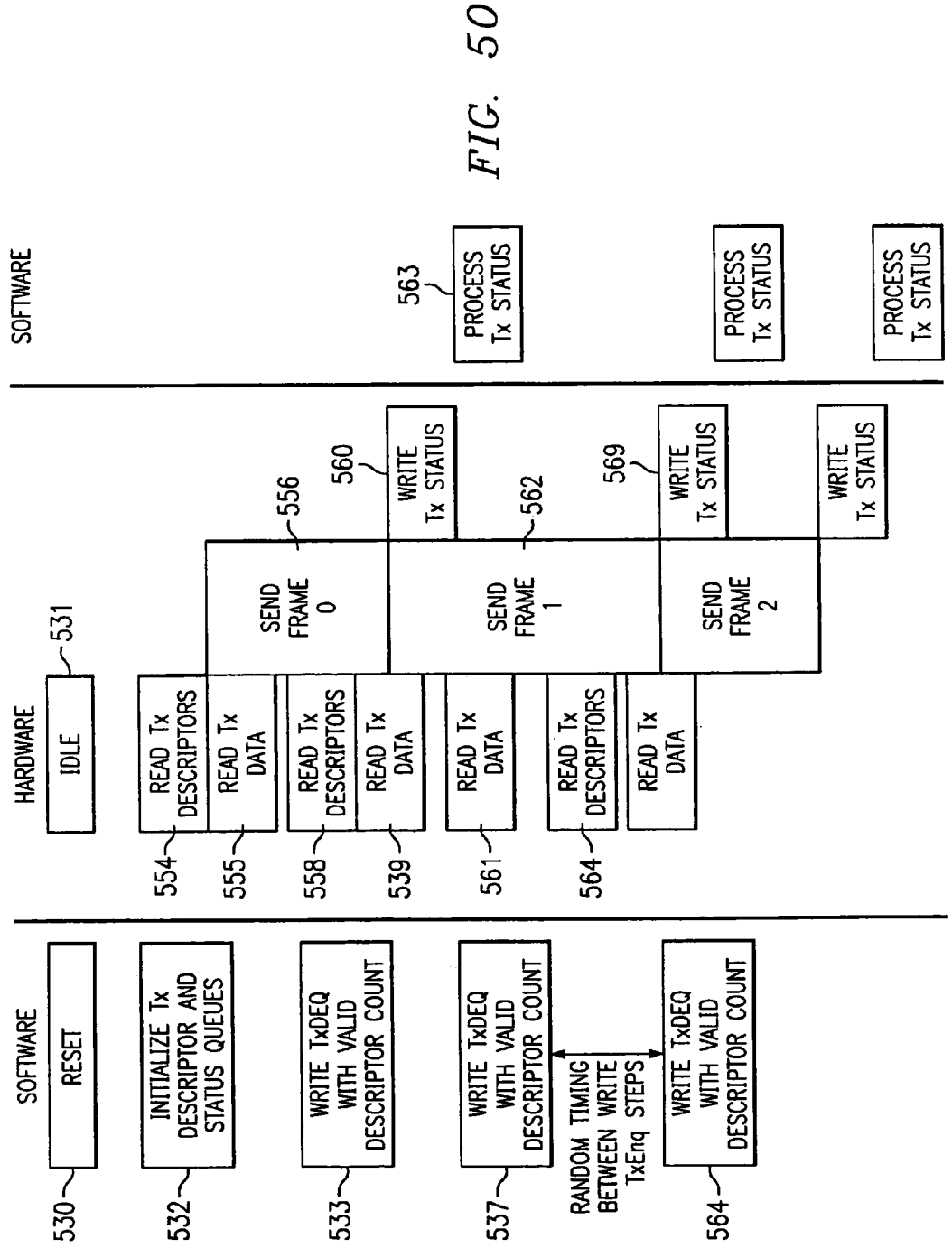

The general transit flow is shown in FIG. 5N and the following table:

TABLE 2

| | |
|---|---|
| 1. | The Host Protocol stack initiates a transmit frame. |
| 2. | The Host Driver 543 parses protocol stack buffer into Transmit Description Queue |
| 3. | Driver 543 writes number of additional entries to the Transmit Descriptor Enqueue (TxDEQ) register 544. |
| 4. | On-chip Transmit Descriptor Processor 545 fetches descriptor information from registers 546. |
| 5. | On-chip Descriptor Processor 545 initiates data move. |
| 6. | A frame of data fetched from system memory 520 into the transmit FIFO within processor 545. |
| 7. | Frame transmitted onto LAN medium.519 (Steps 6 and 7 can overlap). |
| 8. | End of frame status written to status queue 547 |
| 9. | Driver 543 interrupted if interrupt conditions met. |
| 10. | Driver 543 processes the transmit status. |
| 11. | Driver 543 informs the protocol stack that transmit is complete. |

Transmit error conditions are categorized as hard and soft errors. A soft error indicates that the frame was not successfully transmitted and requires a graceful recovery by the host driver. Soft errors include: excessive collisions, SQE error (if connected to a MAU). Hard errors are typically related to reliability problems, such as AHB errors, parity errors (if enabled), system errors, master and target aborts.

Hard errors cause the descriptor processor to halt operation, allowing the host a chance to determine the cause of error and reinitialize and restart the bus master operations. Most soft errors do not cause the frame processing operations to halt and the descriptor processor simply flags the error and continues on to the next frame. The exception is on a transmit underrun, where bit Underrun Halt, gives the option of continuing on to the next frame or halting transmit frame processing. By halting the transmit frame processing the CPU has the ability to reset the transmit descriptor processor registers to point to the start of the failed frame and reinitialize. This will cause EtherNet MAC 107 to reattempt transmitting the failed frame next thereby allowing the order of frame transmission to be maintained.

FIG. 5O illustrates the hardware-software interaction during the transmit process. Initially the software resets at Step 550 and the hardware is in an idle mode at Step 551. The transmit descriptor and status queues are initialized by software at Step 552 and the transmit descriptor count is written to register at Step 553. At Step 554, the descriptors are read by hardware followed by a read out of data from the system at Step 555. The first frame is then sent at Step 556.

The transmit descriptor count is updated in register at Step 557. During the transmission of the first frame, additional transmit descriptors are read from the queue at Step 558, followed by a read of data from system memory at Step 559. At the end of the first frame, a corresponding entry in the transmit status is written to the transmit status queue (Step 560). At Step 561, additional data are read by the hardware while another frame of data is transmitted at Step 562. At Step 563, the next status entry in the transmit status queue is processed and additionally entries made available by the host.

This process generally continues in a similar manner, with the hardware reading descriptors from queue at Step 564 and new data Step 565. The software adds additional descriptors to the descriptor queue at Step 566, processes status entries from the status queue, and then frees entries at Step 567. Status entries are written out at Step 568 into the status queues.

With regards to EtherNet MAC 107, interrupts can be associated with on-chip status or with off-chip status, off-chip status being status that has been transferred to either the transmit or receive status queues. The status for any outstanding interrupt events is available via two different register addresses (Interrupt Status Preserve and Interrupt Status Clear).

Reading the Interrupt Status Preserve field has no affect on the bits set in the register; they may be explicitly cleared by writing a one back to any of the bit positions. This allows the CPU to process interrupt events across multiple routines, only clearing the bits for which it has processed the corresponding events.

The Interrupt Status Clear will remove the status for all outstanding events, when it is read. This provides a quick mechanism for the CPU to accept all the outstanding events in one read, and not incur the additional 10 cycles typically required in specifically clearing the events.

SDRAM interface 108, operating off AHB 102, is preferably based on an ARM PL090 SDRAM controller and a set of associated configuration registers. In the illustrated embodiment, SDRAM interface 108 shares address bus, data bus and DQMn signals with the SRAM controller and PCMCIA interface, arbitrated by external bus interface circuitry under a fixed priority scheme (SDRAM, SRM, PCMCIA and TIC in order from highest to lowest). Preferably, all SDRAM accesses are performed using quad bursts.

The SRAM interface (block 109) is preferably based on an ARM PL090 Static Memory Controller. Additionally, the SRAM interface supports programmable base addresses and 8 external chip selects and associated mask registers. A mix of 32-bit, 16-bit and 8-bit devices are supported.

Block 109 additionally includes a slave-only V2.1 compliant PCMCIA PCCard Interface operating off high speed bus 102. The PCCard Interface shares external data and address buses with the Static Memory Interface, Dynamic Memory Interface and the Test Interface Controller. Arbitration between these blocks and the external resources is accomplished through an External Bus Interface (EBI) unit. Once granted access to the external buses, the PCCard Interface controls the buses until the current data transfer is complete.

In the preferred embodiment, the PCCard Interface includes a controller based on an ARM Static Memory Controller which controls PCCard accesses to the system memory, I/O and attribute address spaces. Dynamic bus sizing is used wherein the transfer data width matches the target data I/O width. Moreover, in this embodiment, multiple card accesses are performed to complete the requested bus transfer for either read or write card operations. For example, during a word write to an 8-bit PCCard, the PCCard Interface performs 4 card writes. Alternatively, half-word writes to an 8-bit card are performed using double card writes, word writes to a 16-bit card using double card writes, and so on.

The PCCard Interface is configured by the system initialization code through a corresponding set of registers. Three of these registers are used to control access to the memory, I/O and attribute address spaces. Another register is used to control card detection and interrupts and a fifth controls general interface operation. In the default state, these registers are set to the timing requirements compatible with the slowest PCCard and the fastest bus speed. Additionally, the wait states for both read and write operations are programmable from between 1 and 31 AHB 102 clock (HCLK) cycles (the duration of the read and write pulses is the number of wait states plus 3 AHB clock cycles).

In the preferred embodiment, external address buffers and data bus transceivers are used to make the PCMCIA PcCard specification. Additionally, in the preferred embodiment, an external switch module is used to control the PCCard power supplies. Generally, the PCCard Interface, under firmware control, determines whether or not a PCCard is present. If a card is inserted, an interrupt is issued to the processor and firmware interrogates the PCCard interface to determine the appropriate switching of the PCCard power supplies.

An interrupt is also generated when a change of state occurs at the PCCard detect pins and at chip reset. Specifically, if a card is not present at chip reset, an interrupt is generated while if a card is present, no interrupt is generated.

The PCCard interface preferably communicates to an associated PCCard slot using tri-state buffers.

JTAG/TIC interface 110 supports testing in compliance with IEEE Std. 1149.1-1990, Standard Test Port and Boundary Scan Architecture. The Test Interface Controller supports on-chip testing of the various blocks on high speed bus 102. In the preferred embodiment, testing through interface 110 is in accordance with the specification of ARM920T processor 101. In particular, the JTAG part of the interface takes advantage of the ARM Multi_ICE in-circuit emulator while the TIC portion of the interface utilizes an ARM Test Interface Controller, which is a bus master on AMBA bus 102 and allows an off-chip testing device access to the AMBA peripherals.

USB Controller 111 is preferably configured for three root hub ports and includes an integrated transceiver. This embodiment complies with the Open Host Controller Interface Specification for USB, Revision 1.0.

LCD DAC interface 112 provides an analog DC voltage for driving LCD contrast controls, preferably generated from a resistor ladder. The DAC preferably is a 64-step digital to analog converter.

Bridge 113 interfaces high speed bus 102 with the relatively slower AMBA Peripheral Bus (APB) 103. Bridge 113 is a slave on high speed bus 102 and the only master on peripheral bus 103, driving addresses, data and control signals during peripheral accesses. While bridge 113 itself contains no registers, it does decode register selects for all peripherals on peripheral bus 103. The preferred system memory map is as follows.

TABLE 3

| Start | End | Size | Usage |
|---|---|---|---|
| 0000_0000 | 0000_3FFF: | 16 K | Internal ROM Memory (Remap Low) |
| 0000_4000 | 1FFF_FFFF: | 255.984 Meg | External DRAM Memory (Remap Low) |
| 0000_0000 | 1FFF_FFFF: | 256 Meg | External DRAM Memory (Remap High) |
| 2000_0000 | 7FFF_FFFF: | 1.5 G | External SRAM/Flash/ROM Memory |
| 8000_0000 | 87FF_FFFF: | 128 Meg | Memory mapped AHB control registers |
| 8800_0000 | 8FFF_FFFF: | 128 Meg | Memory mapped APB control registers |
| 9000_0000 | 9FFF_FFFF: | 256 Meg | Reserved |
| A000_0000 | A3FF_FFFF: | 64 Meg | PCMCIA Memory Space |
| A400_0000 | A7FF_FFFF: | 64 Meg | PCMCIA I/O Space |
| A800_0000 | ABFF_FFFF: | 64 Meg | PCMCIA Attribute space |
| AC00_0000 | AFFF_FFFF: | 64 Meg | Reserved |
| B000_0000 | FFFF_FFFF: | 1.25 G | External SRAM/Flash/ROM memory |

Analog touch screen interface 114 performs hardware scanning for 4-, 5-, 7-, and 8-wire analog resistive touch screens. Exemplary schematic diagrams of 4-, 5-, 7- and 8-wire touchscreens are shown in FIGS. 6A-6D respectively. In each case, when a point on the touch screen is depressed, front and backside conductive layers touch and a resistive contact is made. In the 4- and 8-wire versions, the contact point is identified by first driving a voltage on the X layer through busbars 601b and 601d from the X+ and X-terminals and measuring the voltage at the Y+ and/or Y-terminals, and then by measuring a voltage driven on the Y-plane Y+ and Y-terminals at the X+ and/or X-terminals. The results of the two measurements are compared to predetermined calibration voltages, to determine position. The 8-wire version includes SX and SY lines provide feedback to the associated analog to digital to analog converter for use as a measurement reference.

In the 5- and 7-wire embodiments, a constant voltage is applied at terminals V+ and V- and the Z+/- terminals are used for switching the X and Y axes. The signal at the Wiper terminal is sampled to read the position data. The 7-wire touchscreen includes reference feedback lines to the associated analog to digital converter.

Figure 6A:
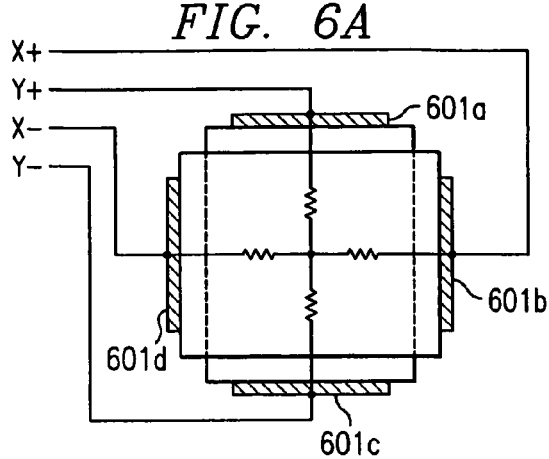
FIGS. 6A-6D depict exemplary schematic diagrams of 4-, 5-, 7- and 8-wire touchscreen input/output devices.
Figure 6B:
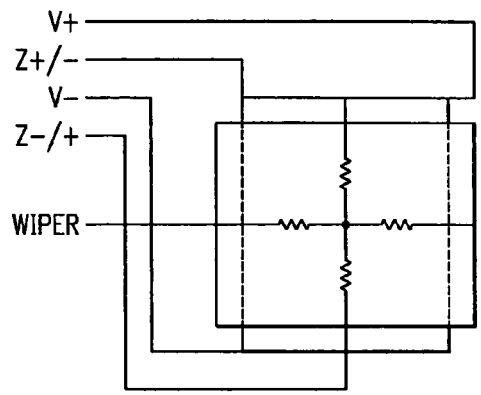
Figure 6C:
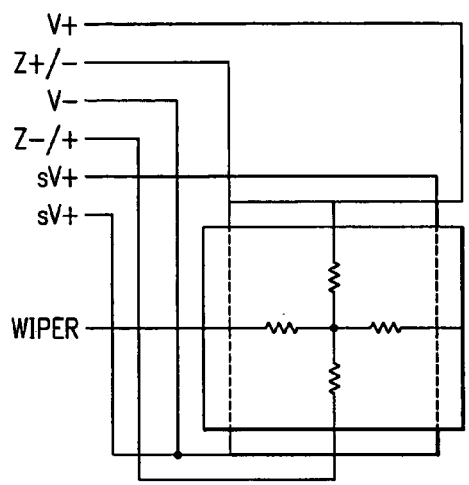
Figure 6D:
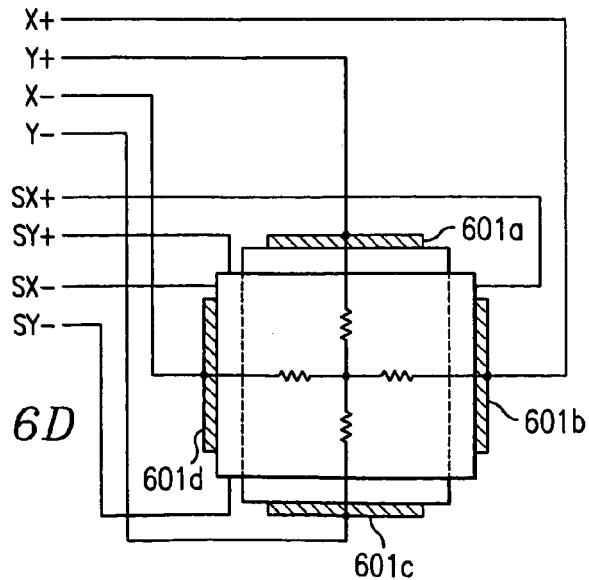
Figure 6E:
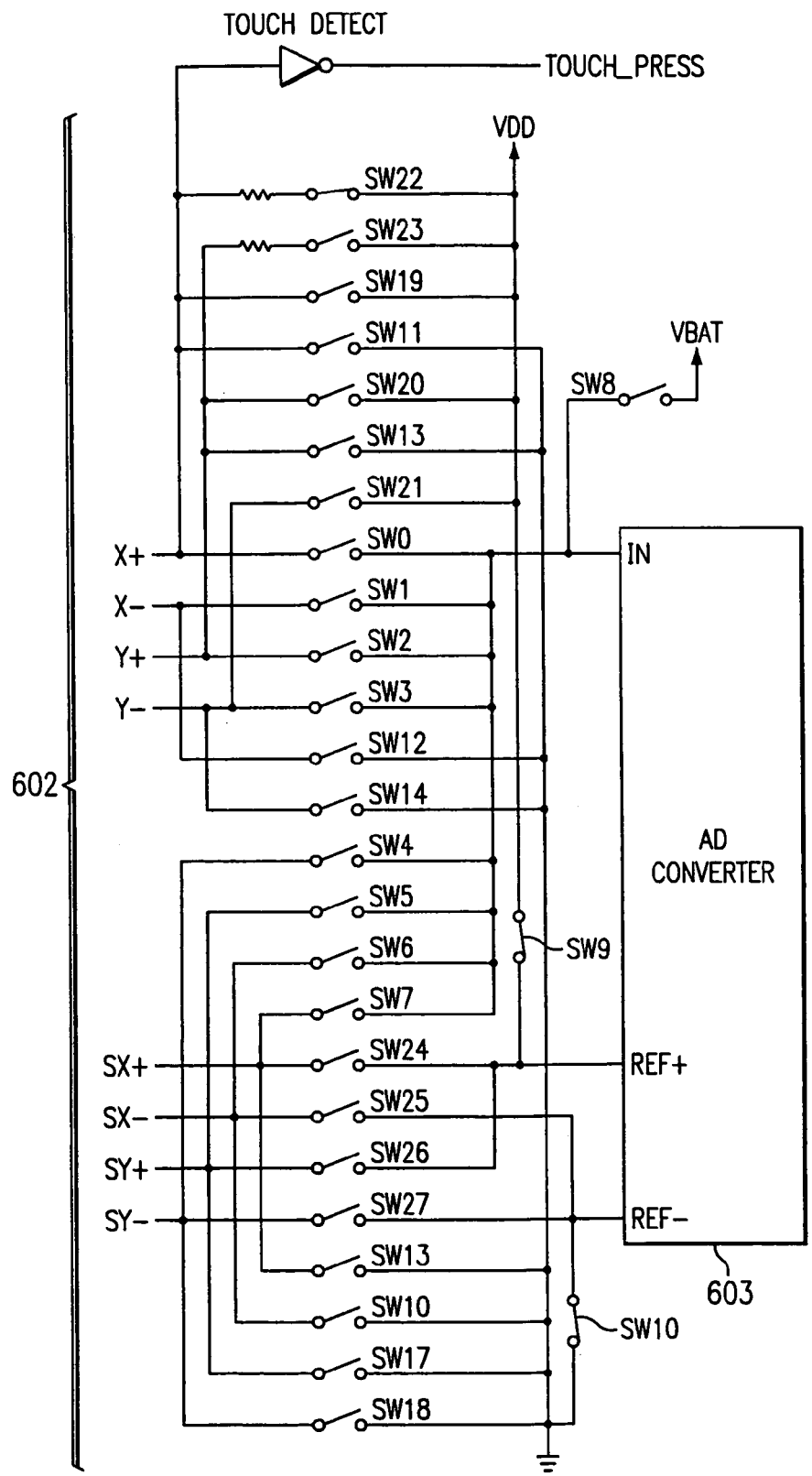
FIGS. 6E-6F are electrical schematic diagrams showing the typical circuit connections to the system touchscreen interface for an 8-wire touchscreen embodiment.
Figure 6F:
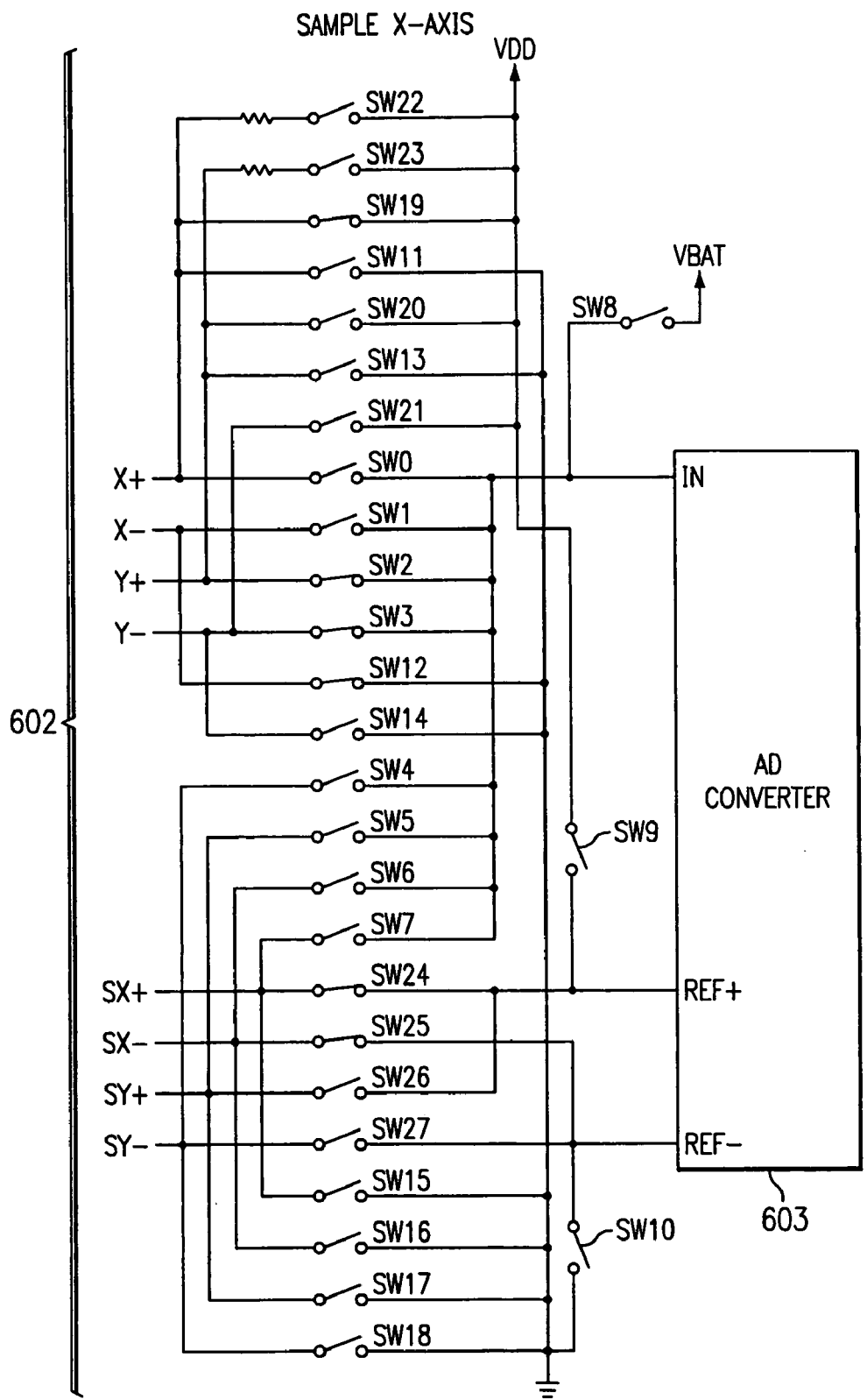
Figure 6G:
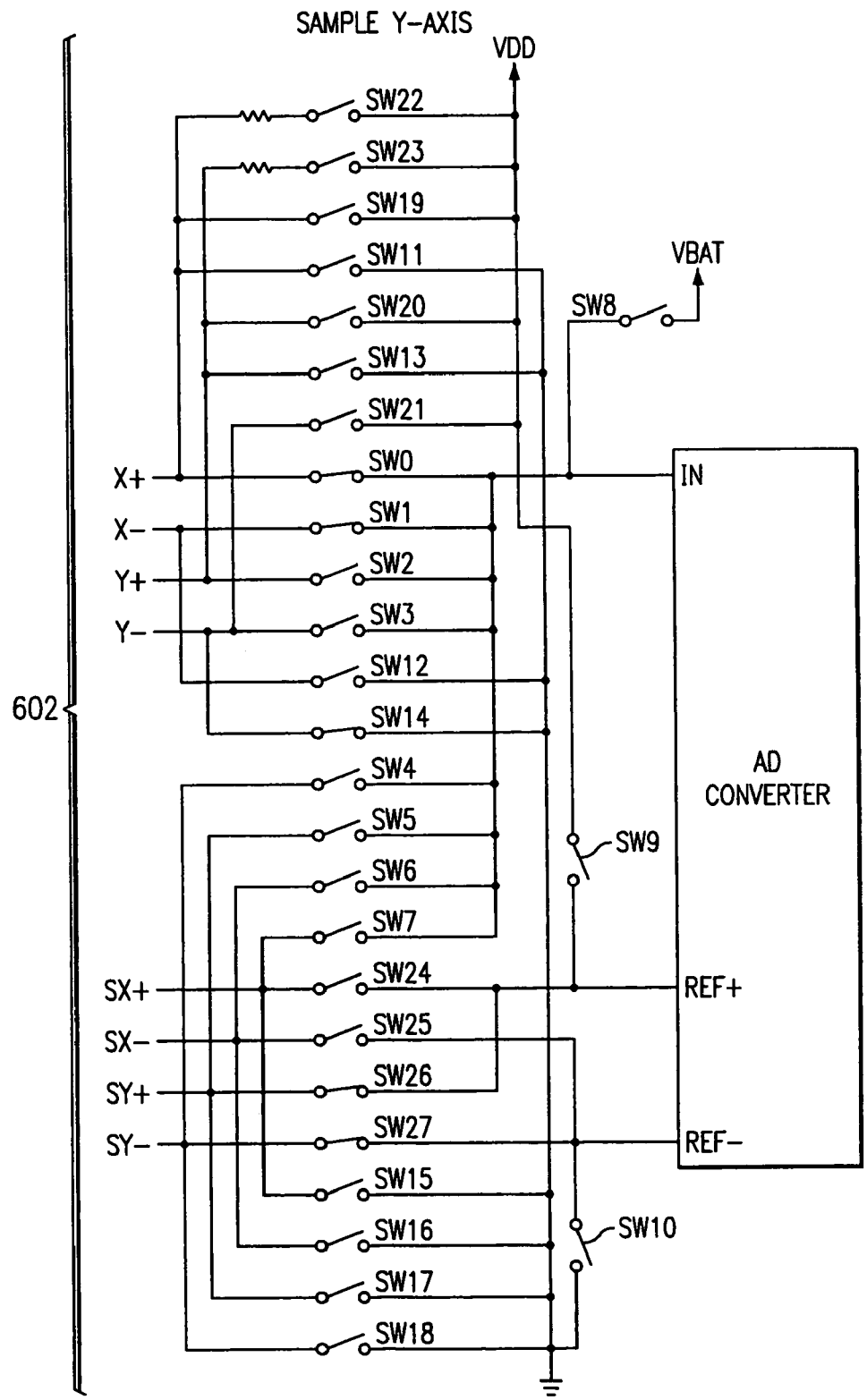
FIG. 6G illustrates the configuration in which a voltage is being driven across the Y-axis and the X-terminals and sampled against a feedback signal.
Figure 6H:
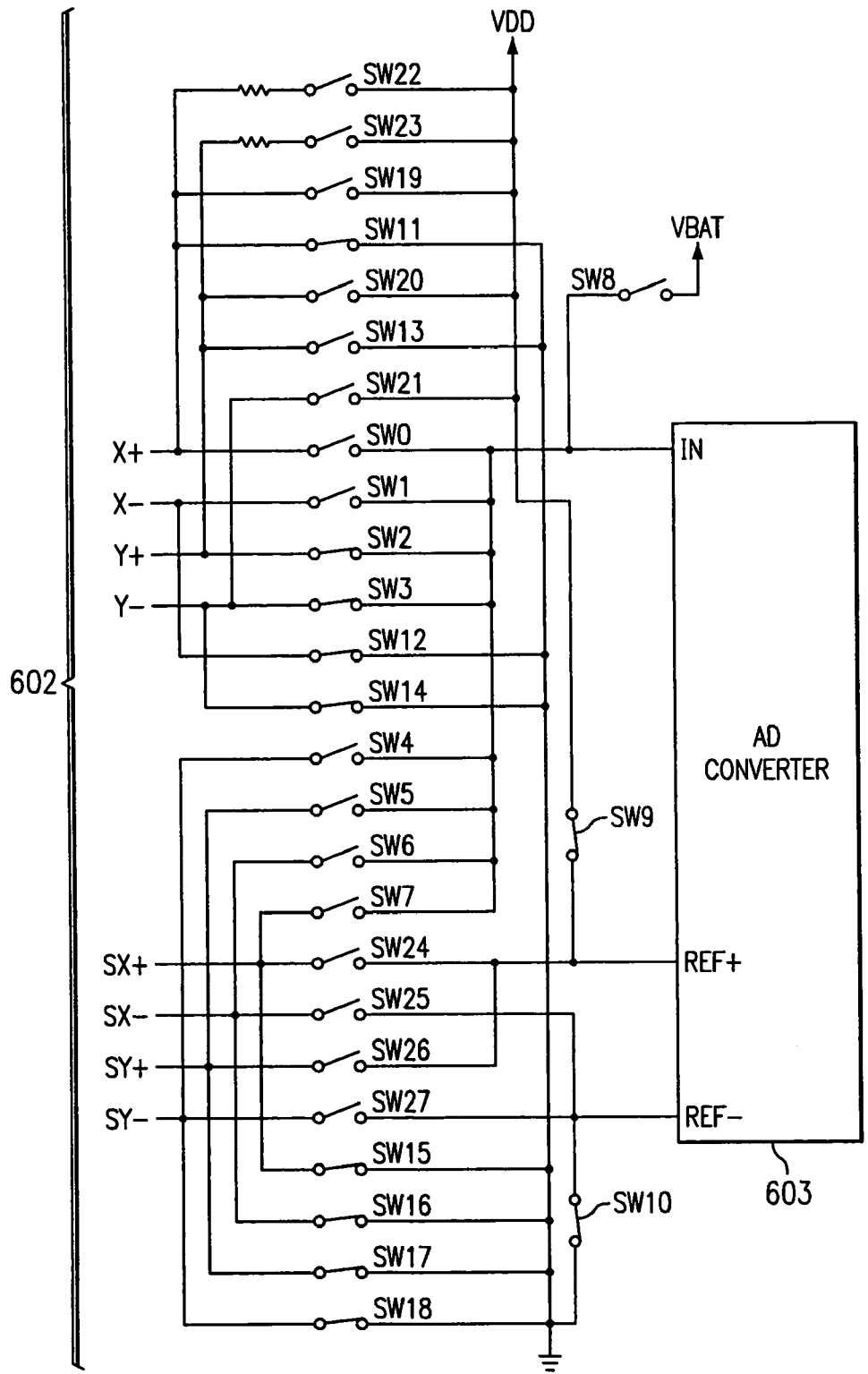
FIG. 6H illustrates the system configuration in which all input lines to A/D converter are being discharged to ground.

FIGS. 6E-6F are electrical schematic diagrams showing the typical circuit connections for an 8-wire touchscreen. A set of 28 switches (SW0-SW27) sample the voltages at the touchscreen terminals to the inputs of analog to digital converter 603. (The switch positions in actuality set bits in register, but for simplicity of discussion, circuit operation will be described in terms of the state of the switches). In FIG. 6E, the circuitry is in the process of detecting a touch on the screen. In FIG. 6F, a voltage is being driven across the screen X-axis and the Y-terminals are being sampled referenced against the voltage on the SX feedback lines. Correspondingly, in FIG. 6G a voltage is being driven across the Y-axis and the X-terminals are being sampled referenced against the voltage on the SY feedback lines. FIG. 6H illustrates the configuration in which all input lines to A/D converter 603 are being discharged to ground. These states will be further described in conjunction with the operational flow chart of FIG. 6I.

The circuitry for the 4-wire touchscreen is similar to that for the 8-wire device described above, except the A/D reference voltage is internal. Additionally, the SX and SY inputs and associated switches are not used in the 4-wire case.

One preferred procedure 600 for scanning the touchscreen and determining touch location is illustrated in reference to the flow chart of FIG. 6I and the resistive scanning block diagram of FIG. 6N. At initialization, the registers are loaded and the controlling state machine 622 starts. At Step 601, the X-axis is scanned to detect a touch (for example, see FIG. 6E). The relative X and Y axis are defined in software. This is followed by the discharge of all A/D input lines at Step 602 (for example, using the configuration of FIG. 6H). At Step 603, a voltage is applied to the X-axis. For the exemplary 8-wire touchscreen, Vdd is asserted at the V+ terminal, ground at V- and the SX+ and SX-terminals set to the A/D reference voltage. A delay is inserted at Step 604 for settling.

At Step 605, 4, 8, 16 or 32 samples are taken, depending on the state of the configuration registers. Each sample is compared with maximum and minimums set in registers 623 and 624 to determine the range of sample values (the stored maximum and minimum are adjusted was values fall between them during the comparison). Then, at Step 606, the difference between maximum and minimum values is taken and compared against a maximum deviation value set in duration register 625. If the maximum deviation is exceeded, the results are discarded and the procedure returns to Step 601 (thereby removing bad sampling points). Otherwise a running value held in an accumulator/shift register 626 is divided by the number of samples taken to calculate and average calculated.

If the X interrupt flag is not sent at Step 607, then at Step 608 then the difference between the average value (new X) and the last valid X new value in register 627 is taken and compared against a stored minimum value in register 629. If it is below this minimum value, then the lines are discharged and the Y-scan starts. Otherwise, a comparison is made against a maximum value in register 630 at Step 609. If the calculated value is above the stored maximum value, then it is assumed that the touch movement was too far and therefore the key press was invalid. In this case the X new interrupt pending flag is set at Step 611, such that Step 608 is skipped in subsequent scans, and the last valid X new value is taken as the X position value. Processing then returns to Step 601 for new samples.

On the other hand, if the difference between the average value (new X) and last X value are below the stored maximum, then the X interrupt flag is set and the average value is taken as the X value at Step 610 and line discharge begins.

The Y position is then identified through the execution of Steps 613-620, which are essentially the same as those discussed above with regards to the X position determination, the only difference being that data are now taken with respects to the Y axis. Additional registers 631-633 in FIG. 6N support the Y-scan operations. For brevity, the details of these steps will not be repeated.

At Step 621 and determination is made as to whether the X interrupt is pending, and when both the X and Y interrupt flags are set, the current stored X and Y values are taken as the position data and an interrupt to the host is generated.

Figure 6J:
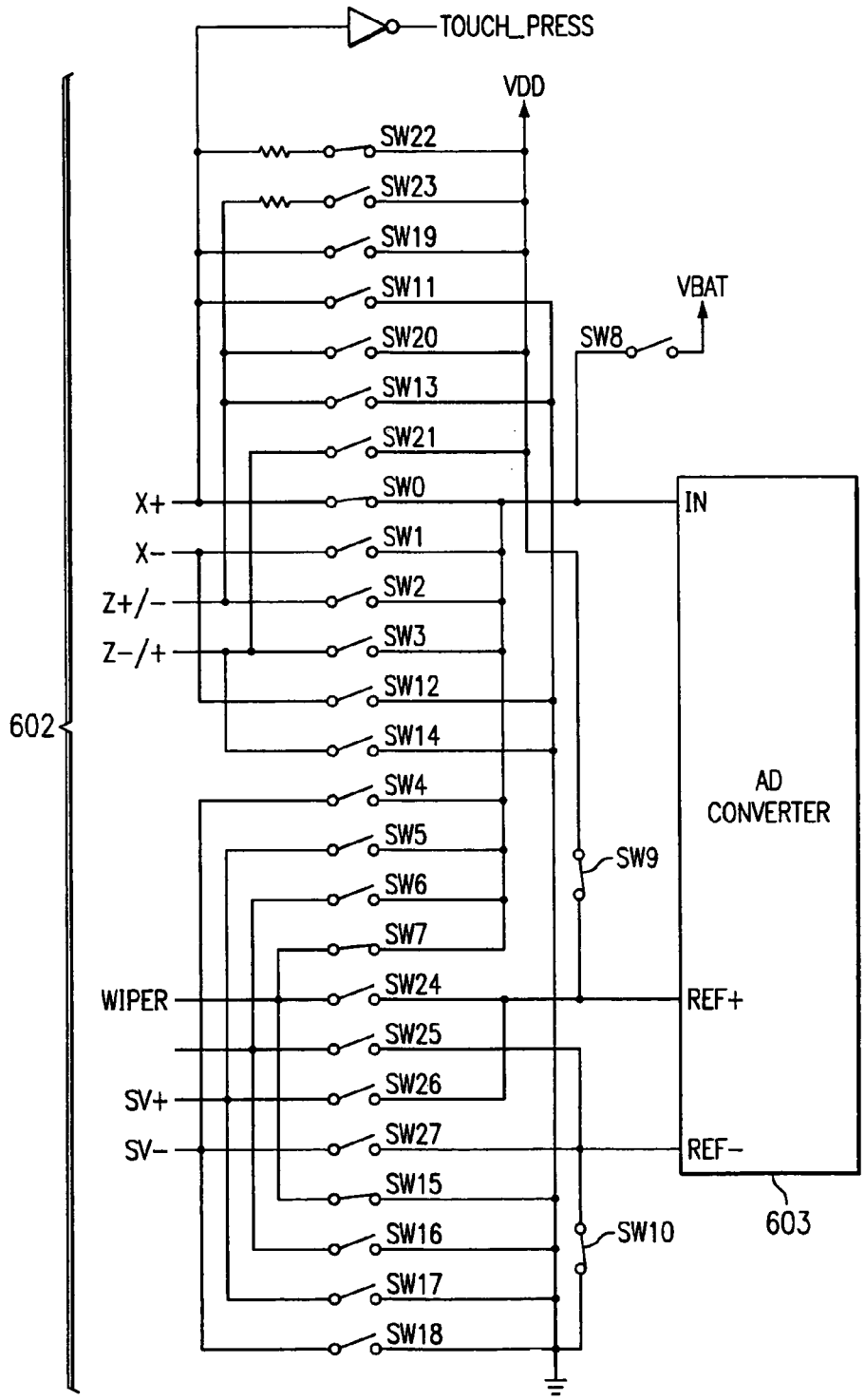
FIG. 6J illustrates the touch detection configuration for a 7-wire touchscreen embodiment.
Figure 6K:
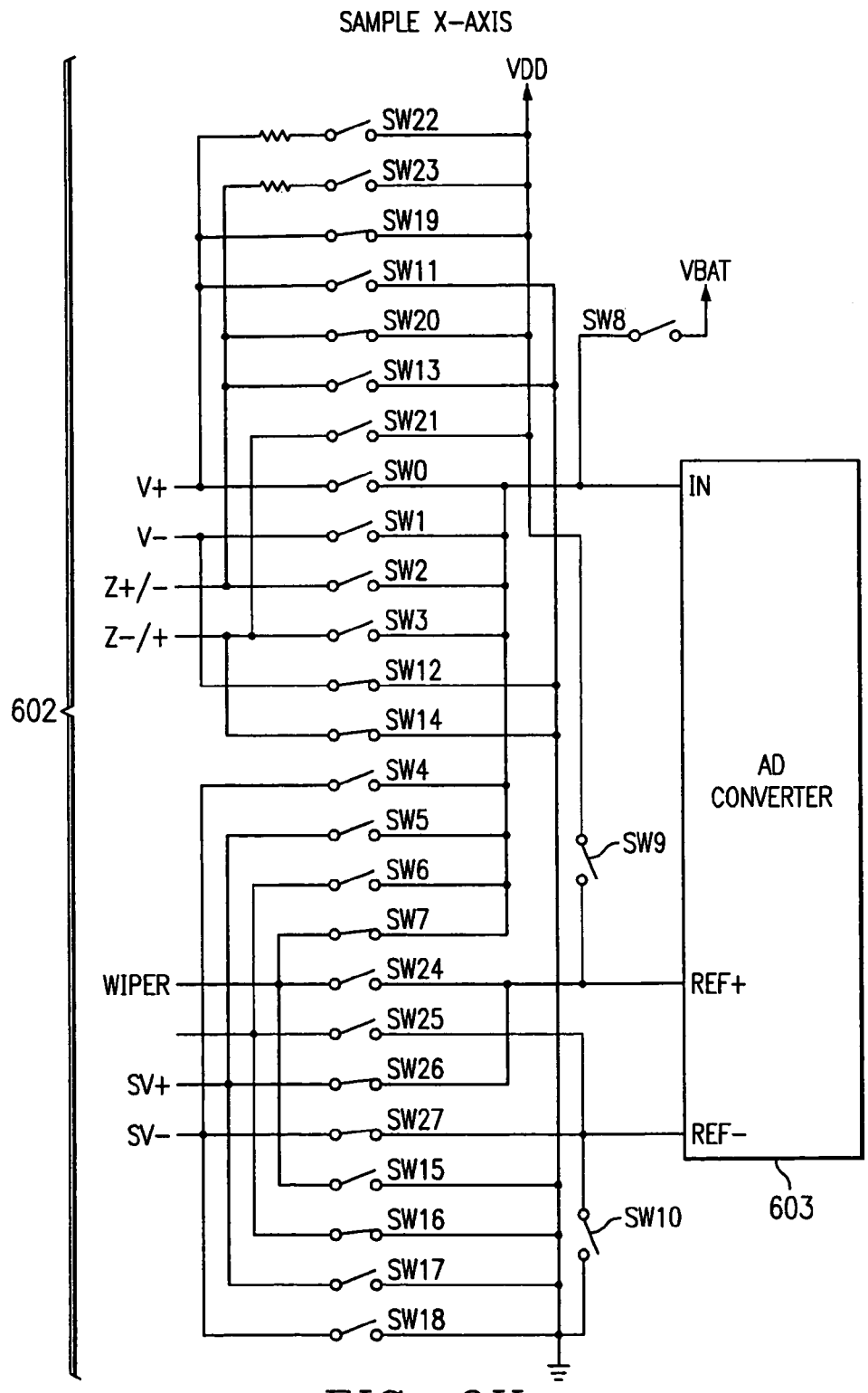
FIGS. 6K-6M respectively show exemplary configurations during Y-axis scan, X-axis scan, and line discharge for the 7-wire touchscreen embodiment.
Figure 6L:
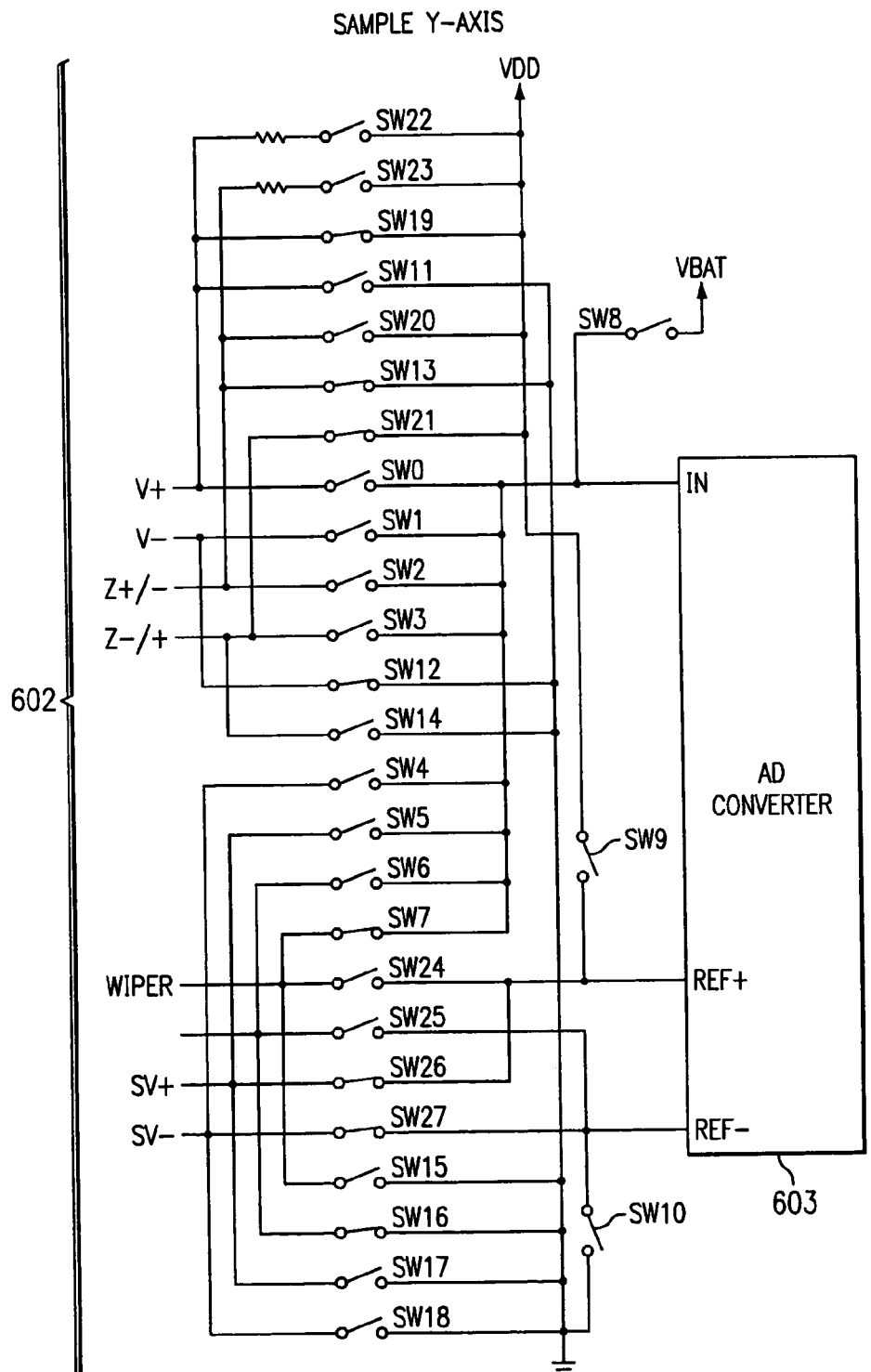
Figure 6M:
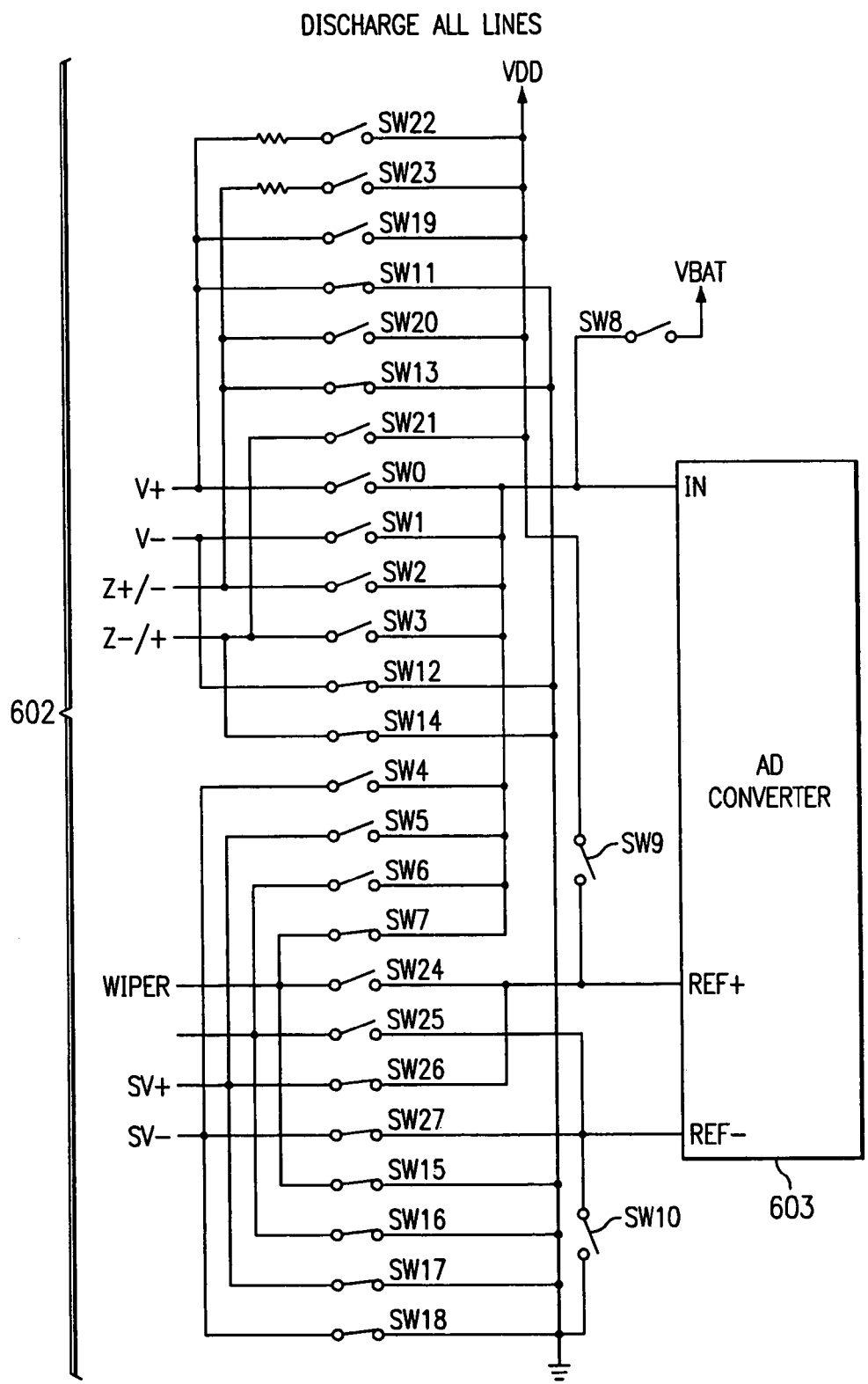
Figure 60:
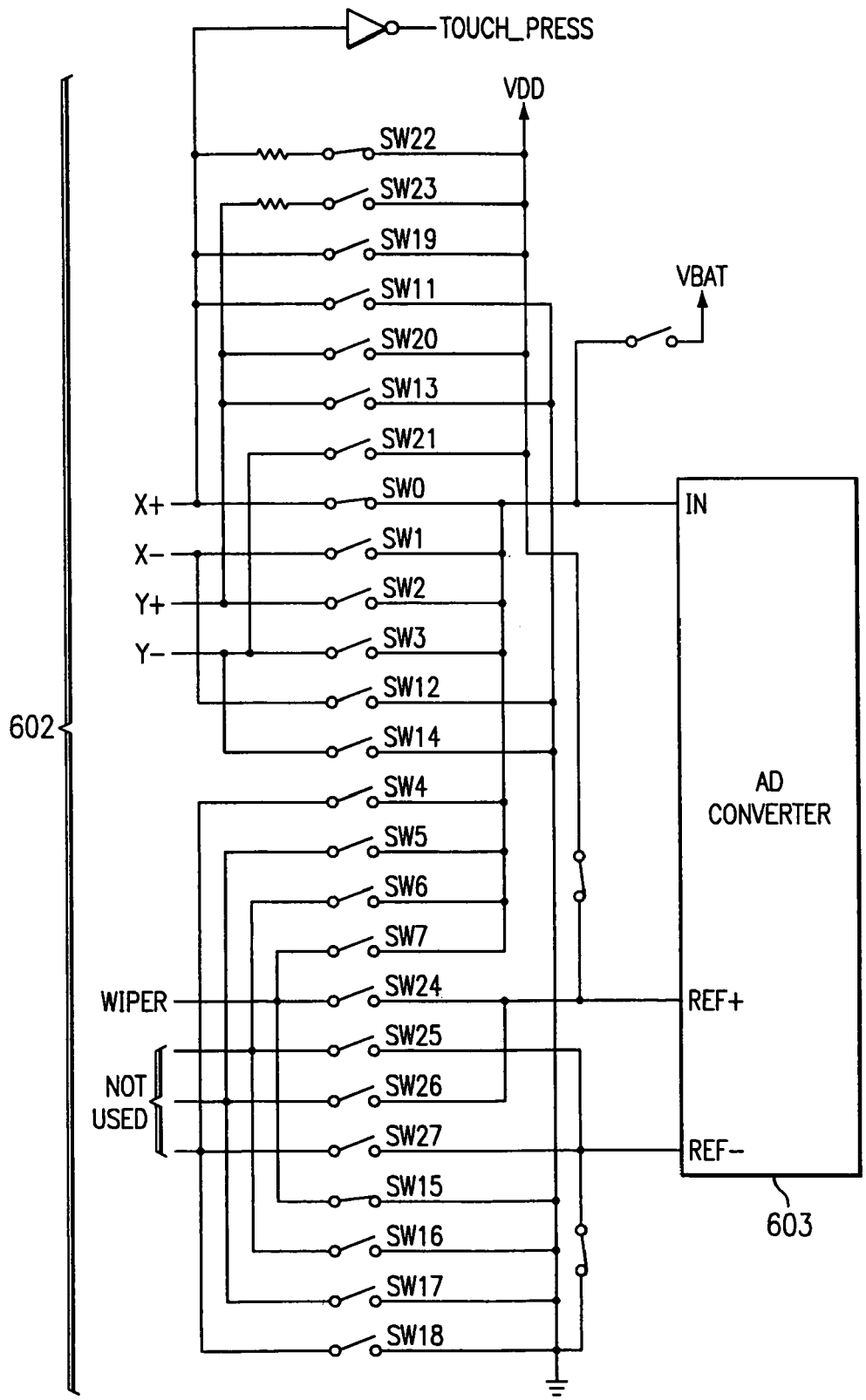

The interface to a 7-wire touchscreen device is shown in FIGS. 6J-6M. The 5-wire version is similar except the A/D reference is generated internal to the A/D converter. In both embodiments, the V+ and V- are the static lines and the Z+/- and Z-/+ lines are used to switch between the X and Y axes. The A/D reference voltages are applied at sV+ and sV-. The touch detection configuration is shown in FIG. 6J, while FIGS. 6K-6M respectively show exemplary configurations during Y axis scan, X axis scan, and line discharge.

The touchscreen scanning circuitry advantageously can be disabled during lower power operation. In this case, the Touch Press signal is gated to the interrupt logic when the touch screen controller is disabled. A typical configuration for this is shown in FIG. 6O, using the 5-wire device as an example.

Figure 6P:
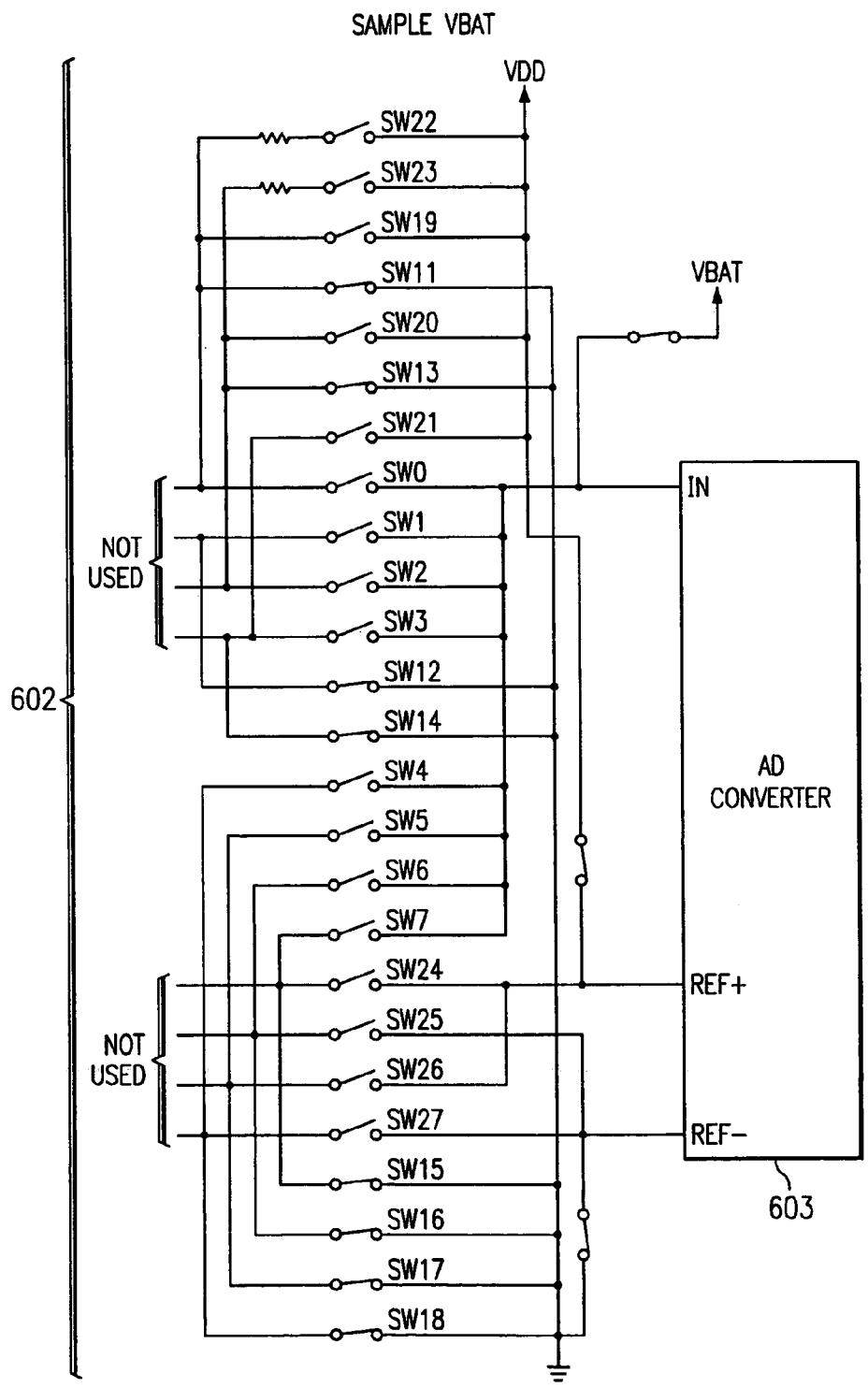
FIG. 6P illustrates an exemplary system configuration for determining battery voltage.

Analog switches 602 can additionally be used to measure the chip battery voltage and similar inputs. An exemplary configuration for determining battery voltage is shown in FIG. 6P.

The touch controller TIC harness 635 for the preferred embodiment is shown in FIG. 6Q. The test harness interfaces with high speed bus 102 through APB register interface 636. In the test mode, test input stimulus registers 637 control the input of sideband signal's for analog to digital sample data, as well as powered-down touch detection and the inactive state. Interrupts, the analog switch control signals and the outputs of the A/D converter are read through the output capture register 638.

A compatible interrupt controller 115 also operates off of peripheral bus 103 and can handle up to 64 interrupts. Interrupts are defined in software to generate either interrupt requests (IRQs) or fast interrupt requests (FIQs) to processor core 101. Additionally, a thirty-two level hardware priority scheme is provided for assisting IRQ vectoring along with two levels for FIQ vectoring. Additional features include the ability to change the polarity of the active state of input interrupts, as well as the ability to selectively trigger interrupts off either rising or falling edges or voltage levels.

A brief identification of the interrupt registers follow for reference. Initially, it should be noted that all interrupt share the same input and are then independently masked and mapped as IRQs or FIQs. Preferably, these registers are accessed using fixed offsets from a selected base address, determined by a decoder in bus bridge 113.

The Interrupt Raw Status Registers identify active interrupts, prior to masking, and the Interrupt Status Registers identify the active interrupts after masking. The Interrupt Enable/Enable Set Registers are used to selectively enable interrupts and when read, return the mask values for the various interrupt sources. The Interrupt Enable Clear Registers are used to clear bits in the Interrupt Enable Registers. The Programmed IRQ Interrupt register sets or clears programmed interrupts.

The following Table summarizes the available interrupts in the preferred embodiment:

TABLE 4

| Interrupt | Name | Type | Source | Description |
|---|---|---|---|---|
| Bit 0 | Unused | Level Only | GND | User defined |
| Bit 1 | PROGINT | Level Only | Internal | Software Programmed Interrupt |
| Bit 2 | COMMRX | Level Only | ARM core | Processor debug Serial Port RX Interupt |
| Bit 3 | COMMTX | Level Only | ARM core | Processor debug Serial Port TX Interrupt |
| Bit 4 | INT_CT[0] | Level Only | TIMERS | Timer 1 Interrupt |
| Bit 5 | INT_CT[1] | Level Only | TIMERS | Timer 2 Interrupt |
| Bits 6-8 | INT_CT[4:2] | Level Only | TIMERS | Timers 5-3 Interrupts |
| Bit 9 | INT_RTC | Level Only | RTC | Real Time Clock Interrupt |
| Bit 10 | UARTRXINT1 | Level Only | UART1 | UART1 Receive Buffer Interrupt |
| Bit 11 | UARTTXINT1 | Level Only | UART1 | UART1 Transmit Buffer Interrupt |
| Bit 12 | UARTRXINT2 | Level Only | UART2 | UART2 Receive Buffer Interrupt |
| Bit 13 | UARTTXINT2 | Level Only | UART2 | UART2 Transmit Buffer Interrupt |
| Bit 14 | UARTRXINT3 | Level Only | UART3 | UART3 Receive Buffer Interupt |
| Bit 15 | UARTTXINT | Level Only | UART3 | UART3 Transmit Buffer Interrupt |
| Bit 16 | INT_KEY | Level Only | KEY | Key Scan Controller Interupt |
| Bit 17 | INT_TOUCH | Level Only | TOUCH | Touch Scan Controller Interupt |
| Bit 18 | INT_GRA | Level Only | GRAPHICS | Graphics Controller Interrupt |
| Bit 19 | INT_CIA | Level Only | PCCARD | PCCard Interrupt Signal |
| Bit 20 | INT_VERT | Level Only | RASTER | Vertical Start of Frame Counters |
| Bits 28-21 | INT_DMA[7:0] | Level Only | DMA | DMA channel Interrupts |
| Bit 29 | INT_IRDA | Level Only | UART2 | IrDA combined Interrupt |
| Bit 30 | INT_USB | Level Only | USB | USB Host Controller Interrupt |
| Bit 31 | INT_MAC | Level Only | MAC | 10/100 EtherNet MAC Interrupt |
| Bit 35-32 | INT_1[3:0] | Edge or Level | External | External Interrupts 3-0 |
| Bit 36 | INT_PROG | Edge Or Level | RASTER | Programmable Interrupt within a Raster Frame |
| Bit 37 | CLK1HZ | Edge or Level | RTC | Real Time Clock Interrupt |
| Bit 38 | V_CSYNC | Edge or Level | RASTER | Vertical Sync Signal |
| Bit 39 | V_CSYNC | Edge or Level | RASTER | Vertical SYNC |
| Bit 40 | INT_AC97 | Level Only | AC97 | AC97 Port Interrupt |
| Bit 41 | INT_SSPORX | Level Only. | SP10 | SP1 Port 0 Receive Interrupt |
| Bit 42 | INT_SSPOTX | Level Only | SP10 | SPI Port 0 Transmit Interrupt |
| Bit 43 | INT_SSP1RX | Level Only | SP11 | SPI Port 1 Receive Interrupt |
| Bit 44 | INT_SSP1TX | Level Only | SP11 | SPI Port 1 Transmit Interrupt |
| Bit 45 | INT_GPIO | Level Only | GPIO | Combined GPIO Interrupt |
| Bit 46 | INT_CU | Level Only | CU | Customer Unit Exception Interrupt |
| Bit 47 | INT_MMC | Level Only | MMC | MMC Combined Interrupt |
| Bit 48 | INT_UART1 | Level Only | UART1 | UART1 Combined Interrupt |
| Bit 49 | INT_UART2 | Level Only | UART2 | UART2 Combined Interrupt |
| Bit 50 | INT_UART3 | Level Only | UART3 | UART3 Combined Interrupt |
| Bit 51 | INT_SP10 | Level Only | SP10 | SP1 Port 0 Combined Interrupt |
| Bit 52 | INT_SP11 | Level Only | SP11 | SPI Port 1 Combined Interrupt |

TABLE 4-continued

| Interrupt | Name | Type | Source | Description |
|---|---|---|---|---|
| Bit 53 | INT_12C | Level Only | 12C | 12C Clock Input Interrupt |
| Bit 54-63 | Unused | Level Only | GND | Not assigned |

Figure 7:
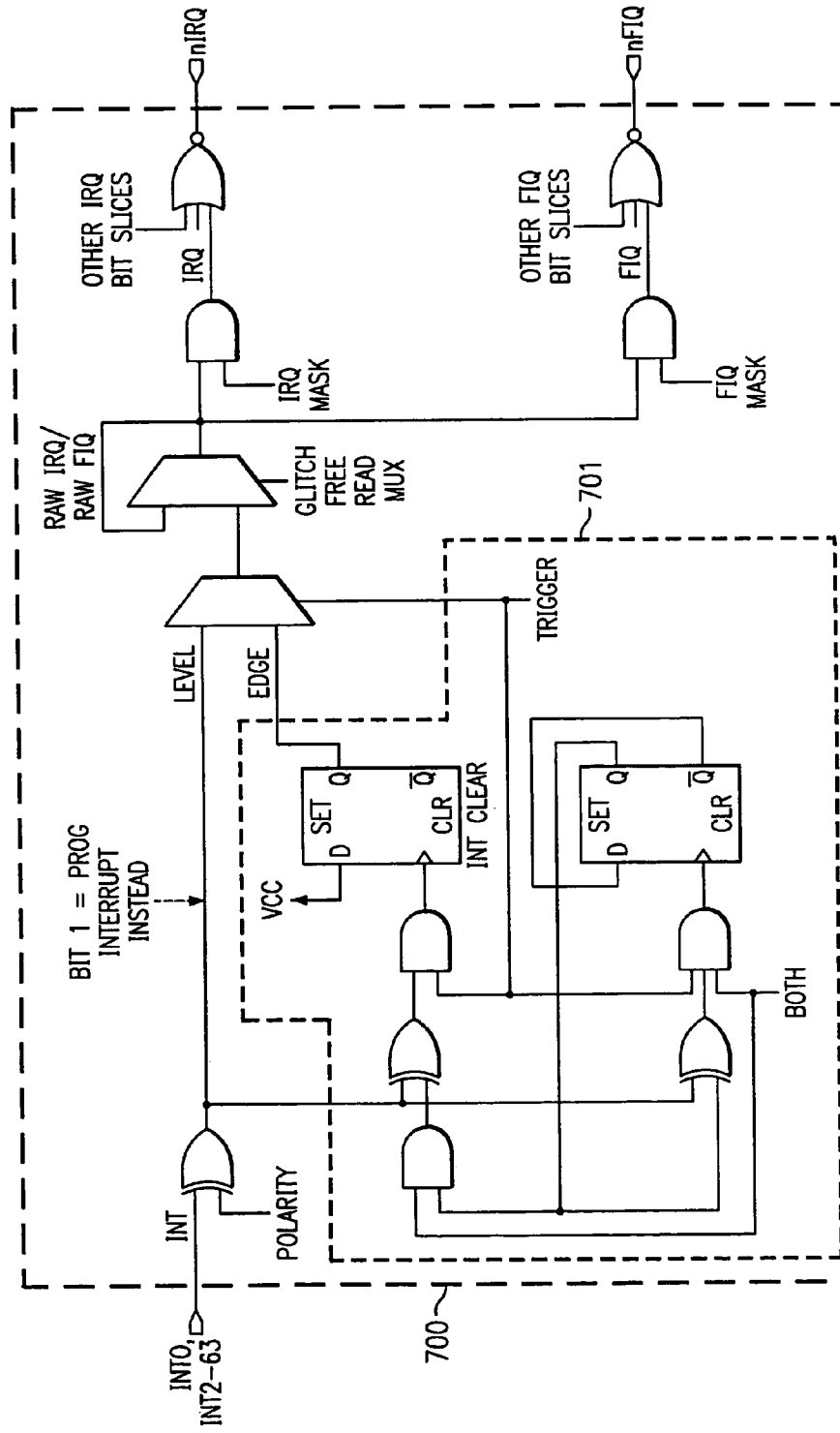
FIG. 7 illustrates one preferred bit slice circuit suitable for use in the Interrupt Controller.

Each Interrupt is associated with a bit slice circuit, such circuit 700 shown in FIG. 7. In this circuit, the POLARITY signal allows for the polarity of the active state of the received interrupt to be reversed. Edge detection circuitry 701 is included for the bit slice circuits corresponding the external interrupts as well as the interrupt issued at the vertical start of display frame. The FIQ and IRQ masking bits from the corresponding masking registers control the combination of bit slice outputs to generate the FIQs and IRQs to the microprocessor.

Figure 8A:
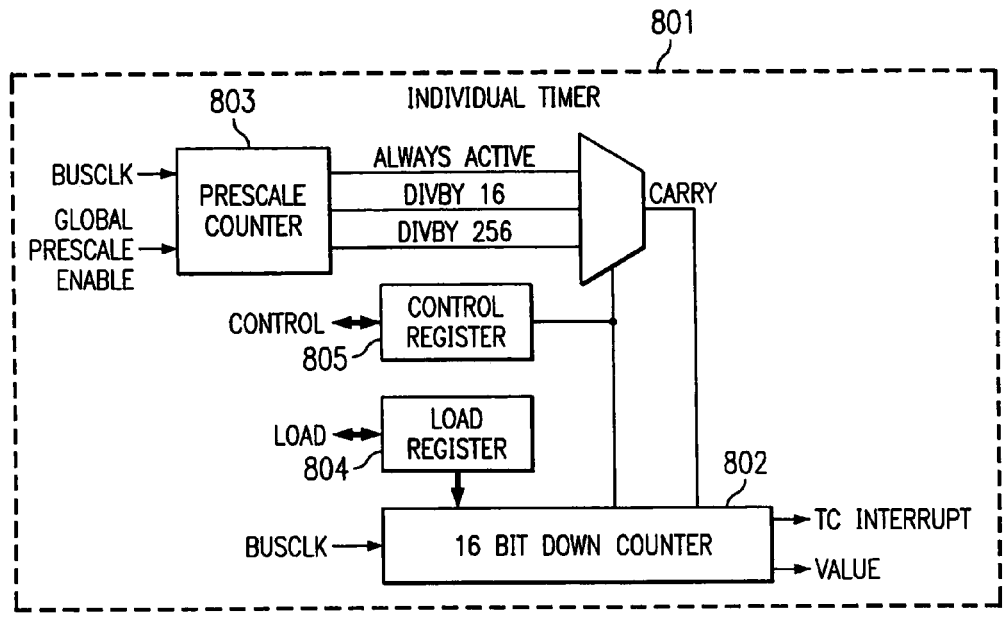
FIG. 8A depicts an exemplary 16-bit timer and found in the General Timer Block.

Block 117 includes four 16-bit and two 32-bit interval timers, and a 40-bit time stamp debug timer. An exemplary 16-bit timer 801 is shown in FIG. 8A and includes a 16-bit down counter 802 and a 8-bit prescaler 803. Additionally, a 5-bit global prescaler is provided for the entire circuit block. Load register 804 is set to the initial timer value and maintains the reload value during periodic operation. Fields in control register 805 are used for enablement, mode selection and prescale configuration.

Figure 8B:
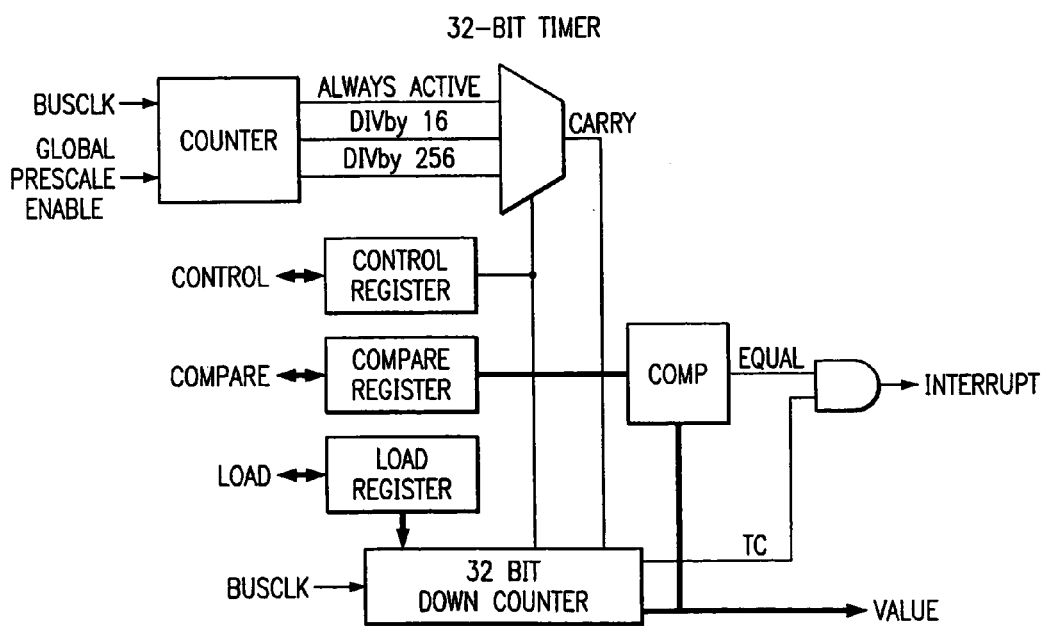
FIG. 8B depicts an exemplary 32-bit timer found in the General Timer Block.

FIG. 8B depicts one of the 32-bit timers 806. This timer is based on a 32-bit down counter 807 and an 8-bit prescaler 808. The 32-bit timers also share the 5-bit global prescaler. Load and control registers 809-810, similar to those described above, are also included. In addition, the 32-bit timers include a compare register 811 and a comparator 812. This comparator circuitry is available for triggering interrupts at preselected timer values.

The operation of interval timers of block 117 can be described in reference to the following table:

TABLE 5

| Address | Name | SW locked | Type | Size | Description |
|---|---|---|---|---|---|
| Required register locations ||||||
| Timer Base +0x00 | Timer/Load | No | Read/Write | 16 bits | Timer 1 Load Value Register |
| Timer Base +0x04 | TIMER/VALUE | No | Read Only | 16 bits | Timer 1 Counter Value |
| Timer Base +0x08 | TIMER/CONTROL | No | Read/Write | 8 bits | Timer 1 Control Register |
| Timer Base +0x0C | TIMER/CLEAR | No | Write Only | NA | Timer 1 Clear Command |
| Timer Base +0x10 | Reserved | | | | Reserved per |
| Timer Base +0x20 | TIMER2LOAD | No | Read/Write | 16 bits | Timer 2 Load Value Register |
| Timer Base +0x24 | TIMER2VALIJE | No | Read Only | 16 bits | Timer 2 Counter Value |
| Timer Base +0x28 | TIMER2CONTROL | No | Read/write | 8 bits Register | Timer 2 Control |
| Timer Base +0x2C | TIMER2CLEAR | No | Write Only | NA | Timer 2 Clear Command |
| Timer Base +0X30 | Reserved | | | | Reserved per |
| Extended register locations ||||||
| Timer Base +0x14 | GLOBAL PRESCALE | No | Read/Write | 5 bits | Global Pre-scale |
| Timer Base +0x18 | TIMER3LOAD | No | Read/Write | 16 bits | Timer 3 Load Value register |
| Timer Base +0x1C | TIMER3VALUE | No | Read Only | 16 bits | Timer 3 Counter Value |
| Timer Base +0x34 | TIMER3CONTROL | No | Read/write | 8 bits | Timer 3 control register |
| Timer Base +0x38 | TIMER3CLEAR | No | Write Only | NA | Timer 3 Clear Command |
| Timer Base +0x3C | TIMER5COMPARE | No | Read/Write | 32 bits | Timer 5 Interrupt on Compare Value Register |
| Timer Base +0x40 | TIMER4LOAD | No | Read/Write | 16 bits | Timer 4 Load Value Register |
| Timer Base +0x44 | TIMER4VALUE | No | Read Only | 16 bits | Timer 4 Counter Value |
| Timer Base +0x48 | TIMER4CONTROL | No | Read/Write | 8 bits | Timer 4 Control Register |
| Timer Base +0x4C | TIMER 4CLEAR | No | Write Only | NA | Timer 4 Clear Command |
| Timer Base +0x50 | TIMER5LOAD | No | Read/Write | 16 bits | Timer 5 Load Value Register |
| Timer Base +0x54 | TIMER5VALUE | No | Read only | 16 bits | Timer 5 Counter Value |
| Timer Base +0x58 | TIMER5CONTROL | No | Read/Write | 8 bits | Timer 5 Control Register |
| Timer base +0x5C | TIMER5 CLEAR | No | Write Only | NA | Timer 5 Clear Command |

TABLE 5-continued

| Address | Name | SW locked | Type | Size | Description |
|---|---|---|---|---|---|
| Timer Base +0x60 | TIMESTAMP LO | No | Read Only | 32 bits | Time Stamp Low Read Register |
| Timer Base +0x64 | TIMESTAMP HI | No | Read 8 Write 1 | 32 bits | Time Stamp High Read Register |
| Timer Base +0x70 | TMR TCR | No | Read/Write | 5 bits | Timer Test Control Register |
| Timer Base +0x74 | TMR TISR | No | Read/Write | 7 bits | Timer Test Input Stimulus Register |
| Timer Base +0x78 | TMR TOCR | No | Read Only | 6 bits | Timer Test Output Capture Register |
| Timer Base +0x80-0xBC | TMR TCER | No | Read/Write | NA | Timer Test Clock Enable Register |

Eight-bit prescaling supports division by 1, 16, or 256, depending whether 0, 4, or 8 prescale stages are used. Moreover, the interval timers can each operate in either a free-running or periodic mode. In the free-running mode, the counters wrap around to their maximum value and continue counting down, after reaching zero. In the periodic mode, the counter reloads from the load register upon reaching zero and continues to decrement following reload, unless appropriate control bits are set, in which case the interrupt is continuously asserted until cleared.

The time stamp debug timer is 40-bit up counter clocked with a 1 MHz clock and is used only for long-term debugging.

Figure 8C:
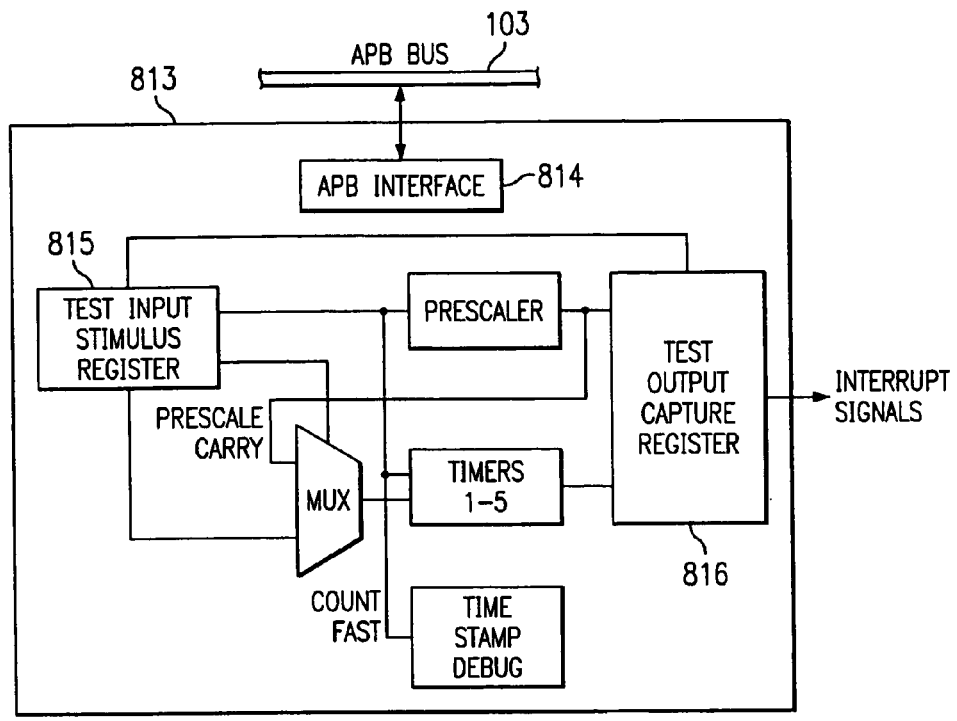
FIG. 8C is a functional block diagram of the timer block TIC harness connections.

FIG. 8C is a functional block diagram of the timer block TIC harness 813 which operates from APB bus 103 through register interface 814. The clock mode, reset status, input multiplexer configuration and clock enablement are effectuated through register interface 814. The test input stimulus register 815 is used to control counting and pre-scaler carry. The pre-scaler carry signal and interrupt values are observed in the test output capture register 816.

System 100 includes keyboard matrix scan circuitry 118 operating from peripheral bus 103. In the preferred embodiment, a key array of up to 64 keys in 8 rows and 0.8 columns is supported, with any one or two keys debounced and decoded at one time. FIG. 9A is a functional block diagram of this embodiment. An exemplary 8 row and 8 column keyboard is shown in FIG. 9B for discussion purposes.

Precounter 901, row and column counter 902 and row decoder 903 sequentially pull down the row the keyboard row lines in order from Row 7 to Row 0. At the same time, the column lines Col. 0 to Col. 7 are passively pulled-up. The output of the column lines, are passed through pipeline 904 and then decoded by column multiplexer 905 under the control of scan controls 906. Hence, when a key is depressed, the column line of the corresponding column is pulled low to the low voltage on the corresponding row line.

Mechanical switch bounce is accounted for using programmable debounce counter 907. This counter is set to a predetermined scan count corresponding to a preselected number of scans during which the same key or pair of keys must be detected. The count is determined as a function of the expected switch bounce and the typical length of each scan. For example, if the potential which bounce is 20 milliseconds and each complete scan of the keyboard takes 8 milliseconds, then the count is set to three which allows approximately 24 milliseconds for the switch to settle. If the same key or pair of keys are not detected on successive scans during the count down period, then the scan count is reset.

The contents of the row and column counter (i.e. the coordinates of the key or keys depressed) are passed through a pipeline 608, a set of temporary storage registers 609 and then set in the key register 610, where it can be read. When a key depression is detected, interrupt controller 611 generates the corresponding interrupt to processor 101. In the preferred embodiment, interrupts are also generated when keys are released. The interrupt bit is latched until key register 610 is read.

Three key reset detector 612 detects depression of keys 2, 4, and 7 in Row 0, the results of which is used by the watchdog subsystem to reset system 100.

Figure 9C:
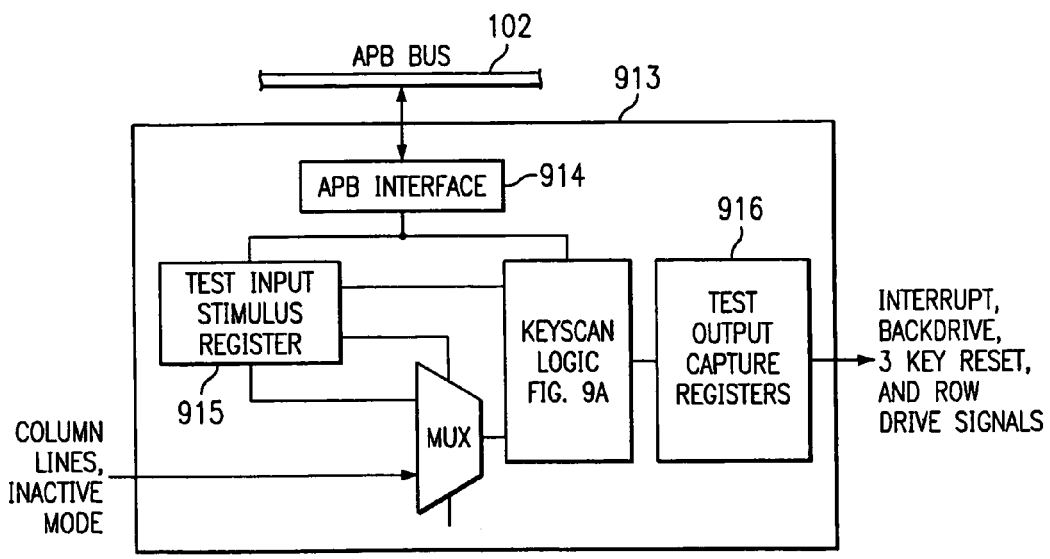
FIG. 9C is a functional block diagram of the keyboard scan block connections to the TIC harness.
Figure 9A:
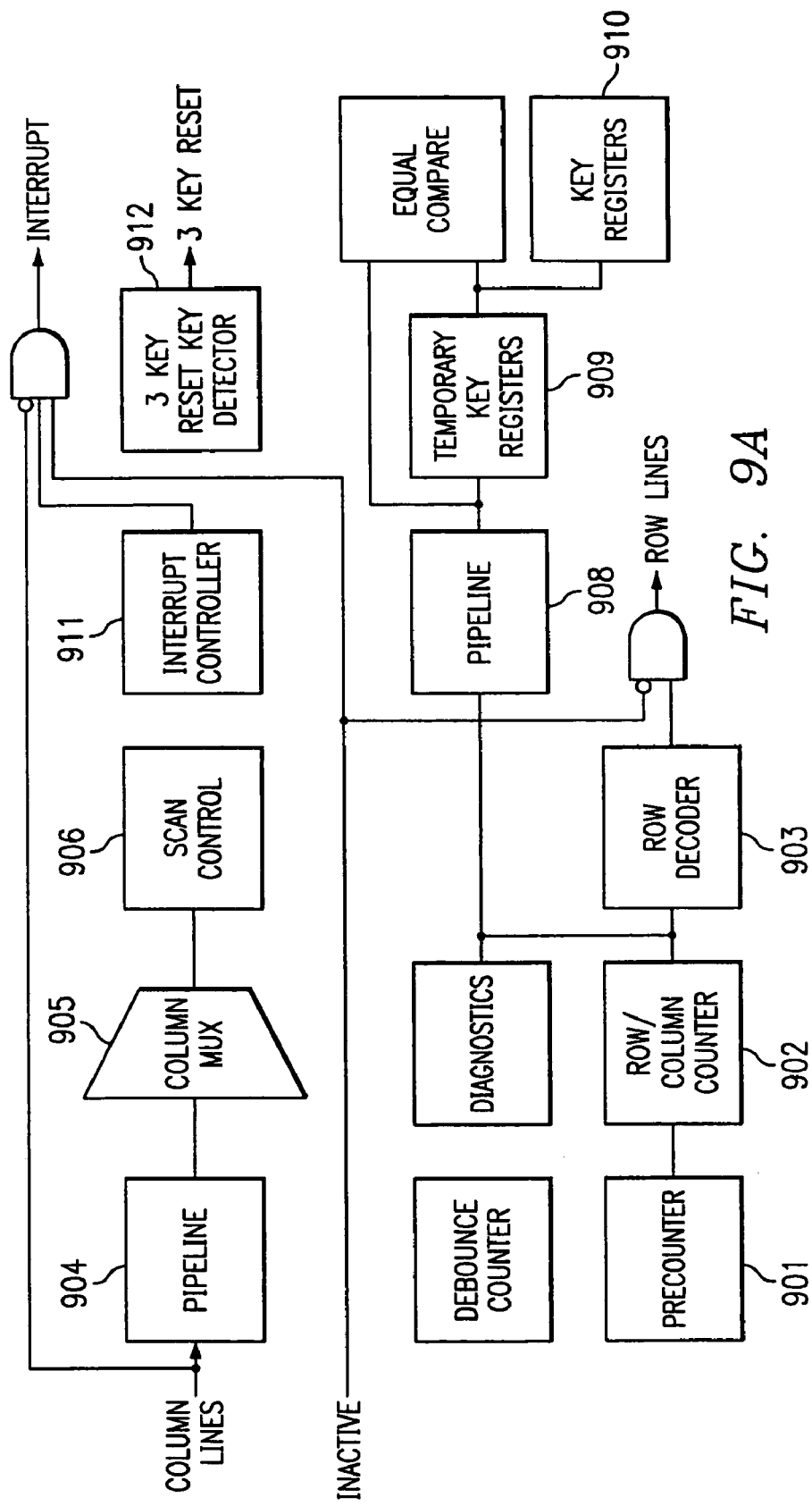
FIG. 9A is a functional block diagram of the keyboard scan circuitry.

FIG. 9C is a functional block diagram of the keyboard scan block TIC harness 913. Testing is conducted through registers 914 in the APB register interface. These registers are set to control the input multiplexers, reset status, clock mode and clock enables. Column line inputs, as well as the inactive mode, are controlled by test input stimulus registers 915. Row outputs, three key detect, back drive and the interrupt output are observed at the test output capture register 916.

Figure 10A:
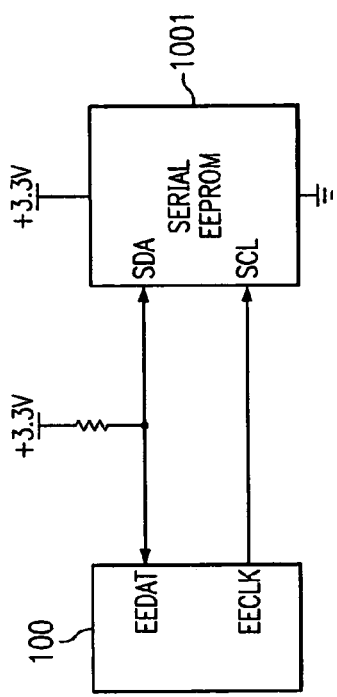
FIG. 10A depicts an exemplary connection of the system with an external EEPROM through the EEPROM/I$^2$C interface.

EEPROM/I2C 119 interface is shown in FIG. 10A. According to one embodiment of system 100, interface 119 supports a connection to an external EEPROM 1001 for inputting configuration information on system power-up. (An external serial EEPROM is not required for operation of system 100, although it may be required to meet specific operating system compatibility requirements).

Alternatively, this interface can also be used as a generic I²C Port.

After a hardware reset, an on-chip state machine attempts to load the configuration data. If an EEPROM is present, the first 40 bytes returned are transferred to 10 configuration registers. The EEPROM device is then accessible to the host processor for reading/writing via a control register. If an EEPROM device is not present, or if the header portion of the first 40 bytes is invalid, the configuration registers remain in their existing state.

As shown in FIG. 10A, the EECLK port is used to provide the serial clock and the EEDAT port for serial data I/O. Initialization may be accomplished by a hardware reset. On a hardware reset, a hardware-based EEPROM controller: (1) enables the EEPROM interface (switches the mode of the EECLK pin); (2) send a dummy write to set the byte address to 0; (3) start a sequential read of bytes from EEPROM; (4) checks the signature header as loaded and aborts if an invalid signature is detected; and, (5) loads a fixed number of bytes, transferring data into destination configuration registers as loaded.

Figure 10B:
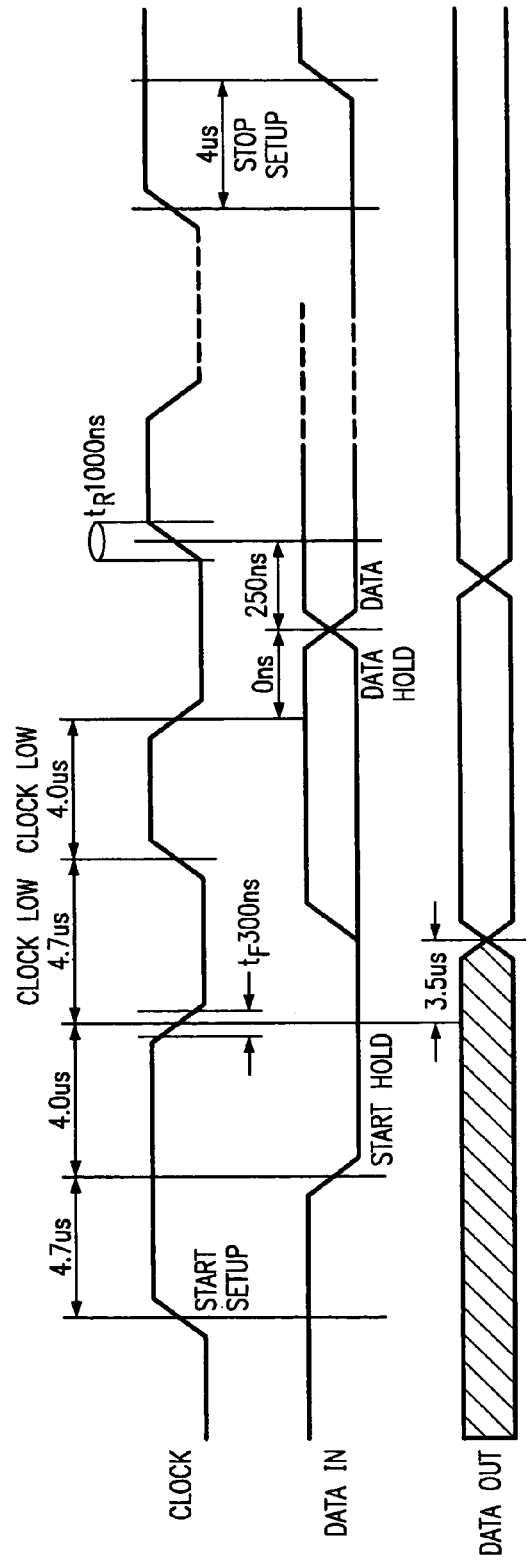
FIG. 10B illustrates the minimum timing relationship between the clock and data in the preferred EEPROM/I$^2$C interface.

The timing of the data and clock signals for the initialization load are generated by a hardware state machine. The minimum timing relationship between the clock and data in the preferred embodiment is shown in FIG. 10B. Preferably, the state of the data line can change only when the clock line is low. A state change of the data line during the time that the clock line is high is used to indicate start and stop conditions.

Writing to an external EEPROM requires support from processor 101 and is accomplished through a corresponding processor-accessible configuration interface register.

During a typical EEPROM read access sequence, a dummy write operation is first performed which generates a start condition. This is followed by the generation of slave device address (including a device identifier and banks select bits) and a byte address of zero. The system 100 begins the access at byte address zero and continues accessing one byte at a time, until a stop condition is detected.

EEPROM/12C block 119 also includes two dedicated ports for Flash ROM programming voltage (FVPP) control, or alternatively, for use as general purpose input/output. Logically, the FVPP block circuitry and the LED block 128 are identical, but reside at different base addresses. LED interface 128 provides a dedicated control for driving 2 LED indicators. The LED pins can also be used as general purpose input/output pins if LEDs are not used.

An AC97/Inter—IC Sound ($I^2S$) interface 120 is provided on peripheral bus 102 in the preferred embodiment of system 100. A on-chip multiplexer allows the user to select between a connection to an external AC97 codec or an external $I^2S$ bus.

In accordance with the AC97 specification, interface 120 includes a port for receiving the AC97 bit clock (ABITLCK) and serial data (ASD1, ASD12) from one or two external AC97 codecs, as well as port for transmitting a sync signal (ASYNC), serial data (ASDO) and a reset signal (ARSTn). Generally, the external codec generates the bit clock ABITCLK which is then divided down by interface 120 to generate the sync signal ASYNC. ASYNC signals the start of each audio frame, with data transmitted onto the AC97 link on the rising edges of the bit clock and sampled on the receiving end on the falling edges of the bit clock.

Figure 11A:
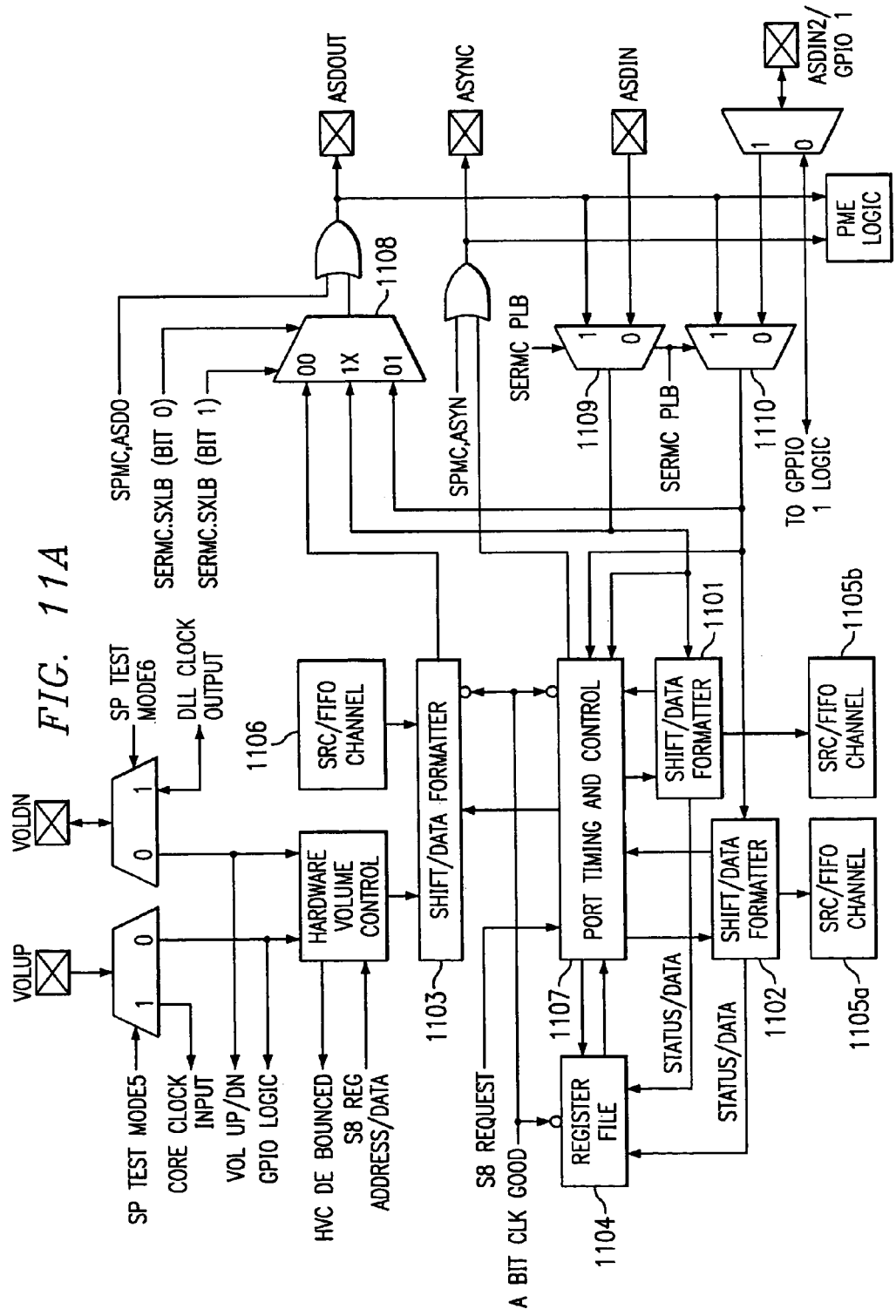
FIG. 11A depicts a preferred dual codec serial interface.

In the preferred embodiment, interface 120 supports a dual codec architecture in accordance with the AC97 specification, Revision 2.1. A preferred dual codec serial interface is shown in FIG. 11A. Serial data is input from the corresponding pair of codecs through input pins ASDI and ASDI2 and a corresponding set of shift/data formatters 1101 and 1102. (If only one codec is being used, the second pin may be used for extended GPIO functionality.) The two external codecs receive data through a single data output Port ASDO supported by shift/data formatter 1103.

The serial interface is controlled by a set of registers in register files 1104. Register file 1104 includes a set of common registers for generally setting up the AC-link as well as AC-link registers for setting up the configuration of each specific link to each of the two external codecs.

Interface 120 employs a double buffer mechanism for transferring data between AC97 link and system memory. This arrangement includes four 32-bit wide receive buffers 1105 and four 32-bit wide transmit buffers 1106, with the transmit buffers providing paths from system memory to the AC-link and the receive buffers providing paths from the AC-link to system memory. Each transmit and receive buffer is associated with a slot map register for controlling the exchange of data through the specified AC-link slots, as well as for defining the data format conversion to be used with the corresponding payload data. These exchanges are controlled either by host polling or through the DMA controller. In the case of polling, the host polls associated buffer status registers to determine whether the given buffers need to be filled or to be emptied through writes and reads. In the case of DMA operations, buffer status bits in register file 1104 are routed to DMA controller 105, which then handles any AC-link data requests, following initialization by system 100.

Shift/data formatters 1101-1103, under the control of port timing and control logic 1107 and registers 1104 allow interface 120 to support multiple data formats. For example, monaural data can be handled as either 16-bit or 20-bit samples, which are right justified in memory. For 16-bit samples, a four bit left shift is performed while routing to the AC-link slot, and for 20-bit samples, the 20 LSBs of each 32-bit word are passed to the AC-link slot. (In the preferred embodiment, data are stored in system memory as 32-bit words.) For stereo data, 16-bit left and right samples can be packed into a 32-bit word and processed as a single unit. These left and right samples are unpacked and then left-shifted to fill 20-bit AC-link slot data fields. Since 20-bit data can not be packed into 32-bit words, stereo 20-bit data is essentially processed as two separate data streams.

AC97 interface 120 in the preferred embodiment, operates across an AC-link running at a fixed frame rate of 48 KHz. When data is being received by interface 120, slot valid tag bits received in slot 0 indicate which of the following slots contain valid samples. Thereafter, only samples from slots with valid slot bits are accepted into the receive buffers. Therefore by dynamically changing the valid slot bits the sample frequency of the data input from the AC-link can be dynamically controlled. During data transfers to the external codecs, an on-demand scheme is typically employed. Generally, software running on processor core 101 sets output slot valid bits which indicate active slots and then, using a fixed sample rate, the serial port of interface 120 transfers samples from the transmit buffer to the valid slot on the link at the 48 KHz rate.

Figure 11B:
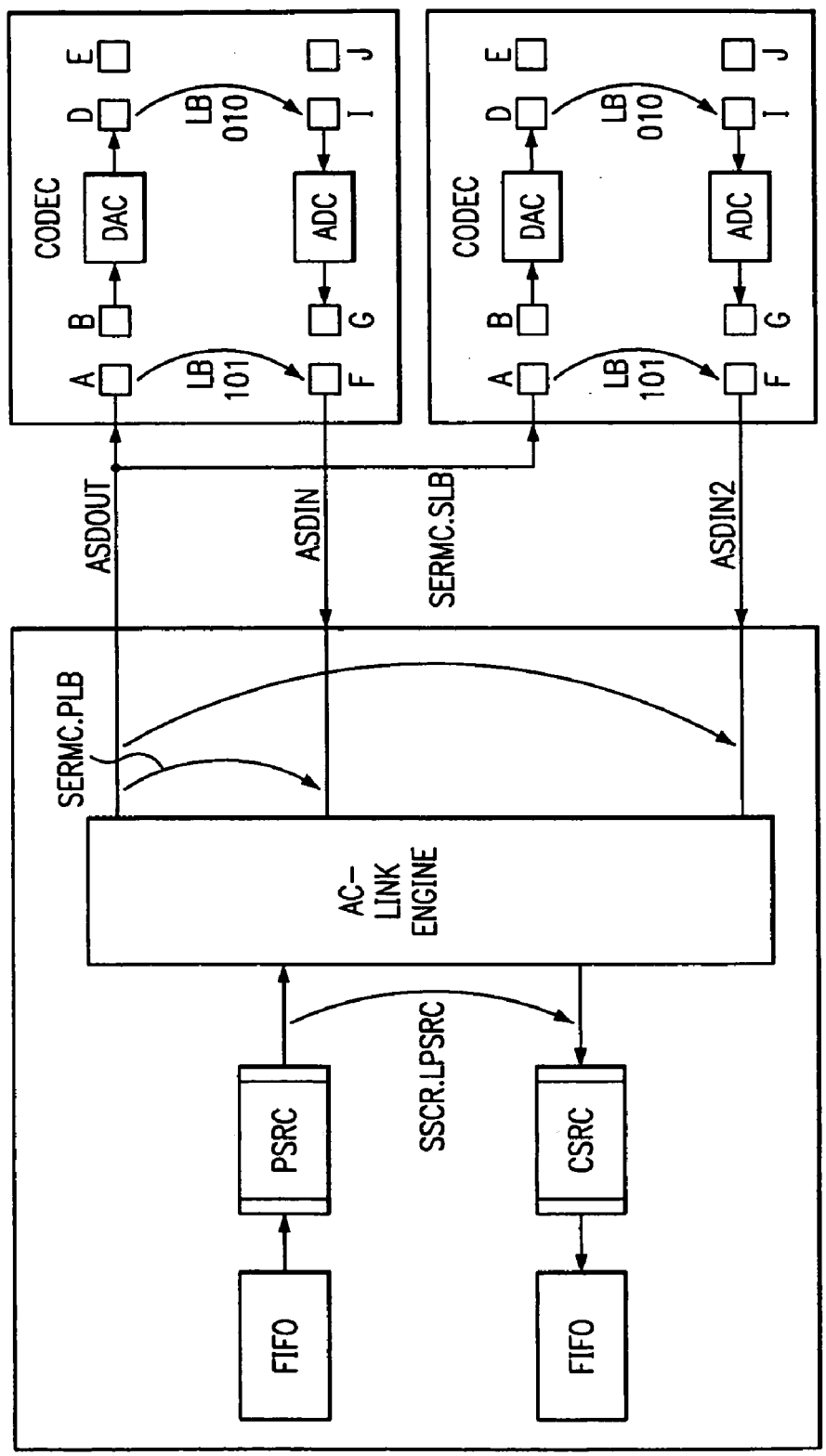
FIG. 11B illustrates the centric loop backs where the loop back begins at the transmit buffers and ends at the received buffers.
Figure 11C:
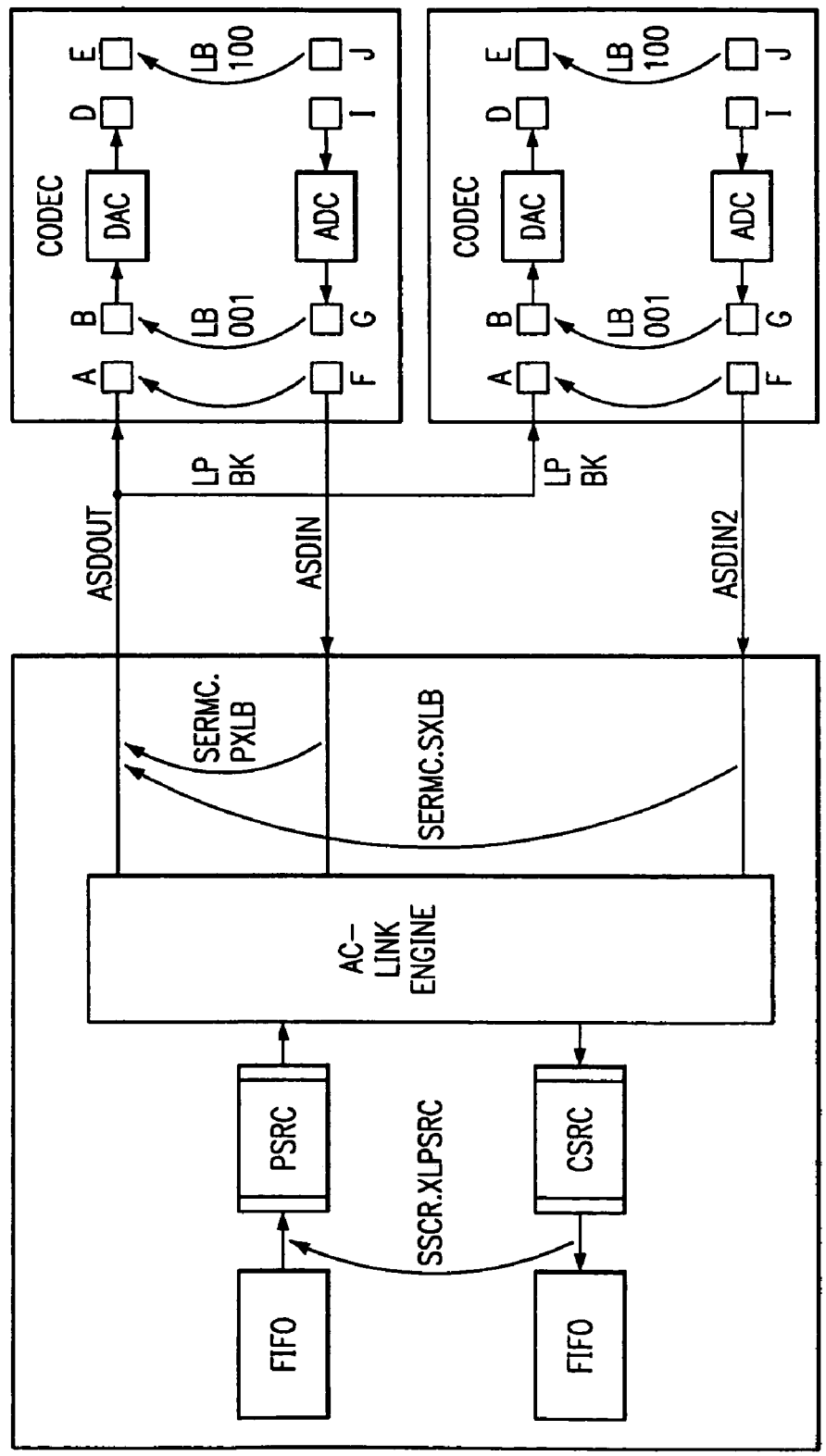
FIG. 11C illustrates an exemplary analogs-centric loops back where the loop back starts and ends in the analog domain.

Multiplexers 1108-1110 support and enhance the loop back modes available on AC97 compliant codecs. Bus-centric loop backs are illustrated in FIG. 11B where the loop back begins at the transmit buffers 1106 and ends at the received buffers 1105. Exemplary analog-centric loop backs are shown in FIG. 11C where the loop back starts and ends in the analog domain. Consequently, these loop backs generally require external analog test equipment such as an Audio Precision System 2.

In accordance with the $I^2S$ specification (Philips Semiconductors), the $I^2S$ interface of block 120 supports a digital audio link. This protocol operates on a 3-wire interface which includes a serial clock line, serial data line, and word select line. The system 100 $I^2S$ interface includes both a specification compliant transmitter and receiver. This interface can be configured as either the master or slave in the context of the I2S bus specification. When configures as the I1S master, the interface generates the serial clock and word select signal and outputs them on the ABITCLK and SYNC pins respectively. Additionally, when configured as the master, the ARSTn pin is driven with a master clock signal, typically 256 times the word select rate. When configured as the I2S slave, the serial clock and word select signal are received as inputs on the ABITCLK and SYNC pins respectively. The master clock is not used in a slave configuration. For either master or slave configurations the serial data is treated the same. Output data is driven onto the ASDO pin and input data is received on the ASD1 pint.

For 12S operation, the ABITCLK pin is used to output the serial clock SCLK, the ASYNC pin for the LRCLK, and the ARSTn pin for the master clock MCLK when interface 120 is operating as the 12S master (the MCLK is not used when interface 120 is operating as the 12S slave).

In embodiments employing an ARM920T processor core, a set of general purpose input/output ports 121 are provided.

GPIO block 121 includes 16 individually programmable I/O pins arranged as two 8-bit bidirectional ports. For each of the two ports, a data direction register and a data register are provided. The data direction registers allow each individual pin to be configured as either an input or output. GPIO block further includes an interface to peripheral bus which generates read and write control signals necessary to access the data.

In addition to the standard GPIO functions, GPIO block 121 in system 100 includes enhanced capability. In particular, interrupts have been added to each of the GPIO pins, along with registers for enabling and masking the interrupts, status and test control registers.

SPI interface (Synchronous Serial Interface) 122 can be used to communicate with an external analog to digital converter and/or digitizer. In the illustrated embodiment two SPI controllers (SPI0 and SPI1) are provided which support the Motorola SPI format, the Texas Instruments SPI format, and National Semiconductor serial formats. The SPI0 Port can be multiplexed with the AC97 pins or with the key matrix row pins.

System 100 includes three of universal asynchronous receive-transmit (UART) interfaces 123-125. These asynchronous ports can be used, for example, to communicate with external RS-232 transceivers. Generally, UARTs 123-125 operate similar to that of industry standard 16C550 UART devices. UARTs 123-125 are preferably slaves off of peripheral bus 103 and operate at baud rates up to 115.2 Kbits/sec. In the preferred embodiment, UARTs 123-125 are based on ARM PrimeCall UART designs available from ARM Ltd., Cambridge, England.

In addition to conventional receive and transmit ports, UART 123 (UART1) can also receive the three modem control signals CTS (Clear to Send), DSR (Data Set Ready), and DCD (Data Carrier Detect) (external modem hardware generates the associated modem control signal RTSn, DTRn, and RI). Additionally, UART1 includes an HDLC transmitter which performs framing and bit stuffing in accordance with the HDLC protocol. An HDLC receiver in UART1 performs framing, address matching, code substitution, CRC checking, and optionally, transmission of a CRC sum at end of packet.

UART2 (124) additionally includes an IrDA (Infrared Data Association) SIR protocol processing stage for driving an infrared light emitting diode (LED) and receiving data from a photodiode.

UART3 (123) is similar to UART1 except the modem control port is hardwired to a passive state.

Real time clock (RTC) with Trim 126 allows software controlled digital compensation of a 32.768 KHz crystal oscillator. Advantageously, software controlled digital compensation allows the oscillator to be electronically calibrated by automatic test equipment during manufacture and then adjusted in the field. Specifically, an oscillator compensation value, including a counter preload value to act as an integer divider, and a value representing the number of 32.768 KHz clock periods to be deleted on a periodic interval, is determined in manufacturing by adjusting the frequency of the 1 Hz clock. The compensation value is then stored in flash memory When system 100 is first enabled in the field, the compensation value is retrieved from memory and used to control the oscillator frequency.

Watchdog timer circuitry 129 is based on a 7-bit counter, the most significant bit of which is used to trigger the generation of a Watchdog Reset signal. In the preferred embodiment, this signal is generated as follows: Time-out/Duration=64/Watchdog Clk frequency. For a 400 Hz CLK, time-out and reset pulse duration are 64/200=160 milliseconds.

To keep the reset pulse from occurring, software must "kick the dog" on a periodic basis by resetting the counter and preventing the MSB from activating. The counter is reset in the preferred embodiment by writing an Opcode into a corresponding watchdog control register. In the preferred embodiment, the watchdog must be "kicked" at least 2 clock periods faster than the time-out calculation would indicate to allow for clock synchronization and to account for handshaking delays.

Watchdog time 129 can be selectively enabled and disabled in software by writing the appropriate Opcode into the watchdog control register. Additionally, this block can be hardware disabled using an external pull down resistor at the CSn[1]. Moreover, the watchdog timer register can be read to determine the cause of a reset. In particular, the bits in this register indicate whether the reset condition was the result of a user reset, a three key reset, a power on reset, or a watchdog time-out.

Figure 12:
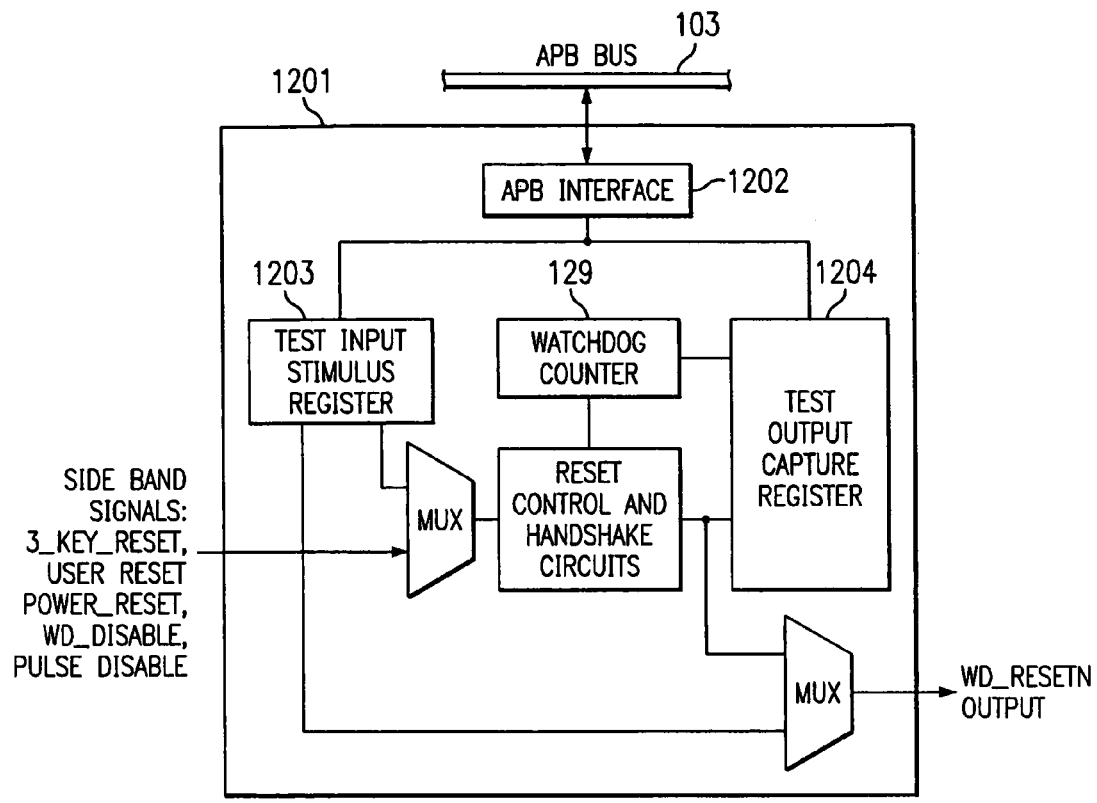
FIG. 12 illustrates the Test Interface Controller (TIC) harness emphasizing the connections to the watchdog timer.

Testing of the watchdog timer 129 is coordinated via the Test Interface Controller (TIC) harness 1201 shown in FIG. 12. Registers 1201 in the APB register interface communicate with the TIC via peripheral bus 103. Specifically, the watchdog control register is used to control the input multiplexer, reset status, and clock mode and the watchdog test clock enable register is used for generating clock enables in the register clocked test mode. Side band input signal values are controlled by the watchdog test input stimulus register 1203. The Watchdog Reset output signal and the watchdog counter value can be observed at the watchdog test output capture register 1204.

System control block 130 generally control such central functions as hardware test mode, clock control, power management and system configuration management.

In addition to the JTAG testing described above, hardware test modes are available to provide entry into an alternate system boot routine and support specialized testing by automatic test equipment. Among these specialized tests, are tests of the oscillator and PLLs, tests by test interface controller (TIC) of system internal functions through high speed bus 102, scan testing using Automatic Test Pattern Generation, observation testing which allows internal signals to be monitored through the Row and Column pins to keyboard interface 118, drive all float, drive all high and drive all low tests which cause all output capable pins to enter either a floating, logic high or logic low state, and a XOR tree test allowing all input capable pins to be connected to an XOR tree.

System 100 includes two phase-locked loops (PLLs) 131 which generate the clocks and similar timing signals necessary during device operation. PLLs 131 are configured with registers within system control clock 130. Among other things the multiply rate, the value which determines the number by which the reference clock is multiplied to produce the PLL output clock, is independently set for each PLL. Additionally, the output clock can be sent to an output pin for observation or a given PLL can be bypassed completely such that the output clock becomes the reference clock.

For a more complete description of the preferred clock generation circuitry used in system 100, reference is now made to copending, coassigned patent application Ser. No. 09/590,596.

IDE interface 132 operates from high speed bus 102 and supports ATAPI compliant connections to both external master and slave IDE devices, up to PIO Mode 4, Multiword DMA Mode 2 (MDMA), and the Ultra DMA (UDMA) mode 3. In the preferred embodiment, IDE interface 132 uses 16-bit transfers, even during non-data transfers in the PIO mode when only 8 bits are valid.

System 100 connects with an external ATAPI device through a 28-pin port, one or more of these pins shared with the General Purpose I/O port (GPIO). A brief description of the ATAPI port is provided in TABLE 6. Preferably, IDE Interface 132 operates asynchronously to the IDE, with all signals synchronized to the high speed bus clock (HCLK).

TABLE 6

| IDE Pin | No. Pins | Description |
|---|---|---|
| CSO_n | 1 | chip select for registers with base address 1f0th |
| CS1_n | 1 | chip select for registers with base address 3f0h |
| DA[2:0] | 3 | 3-bit binary encoded address |
| DIOR_n/ HDMARDY_n/ HSTROBE | 1 | strobe signal to read device regs or data port/ flow control signal for Ultra DMA data-in burst/ flow control signal for Ultra DMA data-out burst |
| DIOW_n/ STOP | 1 | strobe signal to write device regs or data port/ terminates an Ultra DMA burst |
| DMAKC_n | 1 | DMA acknowledge to DMARQ to initiate DMA transfers |
| DASP_n | 1 | signal to indicate that a device is active, or that Device 1 is present |
| DMARQ | 1 | DMA request for DMA to and from the controller |
| INTRQ | 1 | device interrupt |
| IORDY/ DDMARDY_n/ DSTROBE | 1 | negate to extend the host transfer cycle of any host read or write access/ flow control signal for Ultra DMA data-out burst/ flow control for Ultra DMA data-in burst |
| IOCS16_n | 1 | device indicates it supports 16-bit I/O bus cycles |
| PDIAG_n/ CBLID n | 1 | asserted by device 1 to indicate to device 0 that it has finished diagnostic/ cable assembly type identifier |
| DD[15:0] | 16 | 16-bit interface between controller and device |

In the PIO mode, a Pin Interface Unit handles all operations. An IDE host uses the PIO mode for non-data and data transfers in either direction.

For the DMA modes, data transfers are preferably made through one of the DMACRC controllers discussed above with respects to DMA engine 105. Moreover, both the MDMA and UDMA modes are set-up by the host using PIO operations. Generally, the DMACRC controller performs a DMA data transfer by: (i) requesting the AHB bus; (ii) reading the source data into a local buffer; and (iii) requests a write to the destination via high speed bus 102. For host read operation, the DMA controller attempts to keep the input read buffer empty, while for a host write, it attempts to keep the write buffer half full. Typical data transfers are made to system dynamic memory and therefore are effectuated through the SDRAM controller.

During MDMA operations, a pair of DataIn and DataOut buffers are used for the read and write operations, respectively. An MDMA state machine sets-up the necessary signalling, including sending the appropriate request to the DMA controller. In the preferred embodiment, all data transfers are 32 bits wide and are performed using two 16-bit wide IDE interface data transfers.

During an MDMA write, the DMACRC writes data to DataOut buffer and then the state machine toggles the write (DIOW) strobe and drives the data on to the data (DD) bus. During an MDMA read, the host fills the DATAIn buffer by latching data off the data bus with the read strobe (DIOR), and then state machine sends a request to the DMACRC controller. The read completes when the DMACRC controller reads data out of the DataIn buffer.

UDMA transfers are executed through a pair of 32-bit wide, 12-entry deep buffers, namely, an input read buffer and an output write buffer. In the preferred embodiment, these are circular buffers set-up in memory using head and tail pointers. A UDMA state machine controls the signalling, including the generation of requests to the DMA controller.

During a UDMA write, a DMA request is sent to fill 4 32-bit entries in the write buffer, when the number of write buffer entries falls below 4. The UDMA state machine controls the handshaking with the external host device. For flow control, IDE interface 132 temporarily de-asserts the control signal DDMARDY and the host controls the toggling of the strobe HSTROBE.

For a read, when the read buffer has 4 or more entries filled, a DMA request is made to the DMACRC. Flow control in this case is controlled by the host by temporarily deasserting DDMARDY and by Interface by controlling the toggling of the signal DSTROBE. The handshaking is again controlled by the UDMA state machine.

In the preferred embodiment, data transfers are performed using a "ping-pong" scheme, and a "grace" buffer area is provided to account for instances where the handshakes for pausing come at a rate lower than that at which data are transferred.

The UDMA state machine also handles transfer terminations, which can be initiated by either system 100 or the associated ATAPI device coupled to system 100. Whichever device terminates the transaction, the other device honors the termination request and stops the transfer. Additionally, for both reads and writes, a 16-bit CRC result is sent to the host for checking. The CRC registers are preloaded, as described above, with a value of 0x4ABA at the beginning of the transfer.

In the preferred embodiment, all blocks or subsystems 101-132 of system 100 are fabricated on a single integrated circuit chip. This can be accomplished for example using a 0.25 μm, four layer metal process, although other processes known in the art can also be used. In the illustrated embodiment, processor core 101 operates from a 2.5V nominal supply, although this may be reduced in alternate embodiments. The peripherals in the illustrated embodiment operate from a 3.3V supply. In this embodiment, the nominal clock speed for processor core 101 is 200 MHz.

Figure 13:
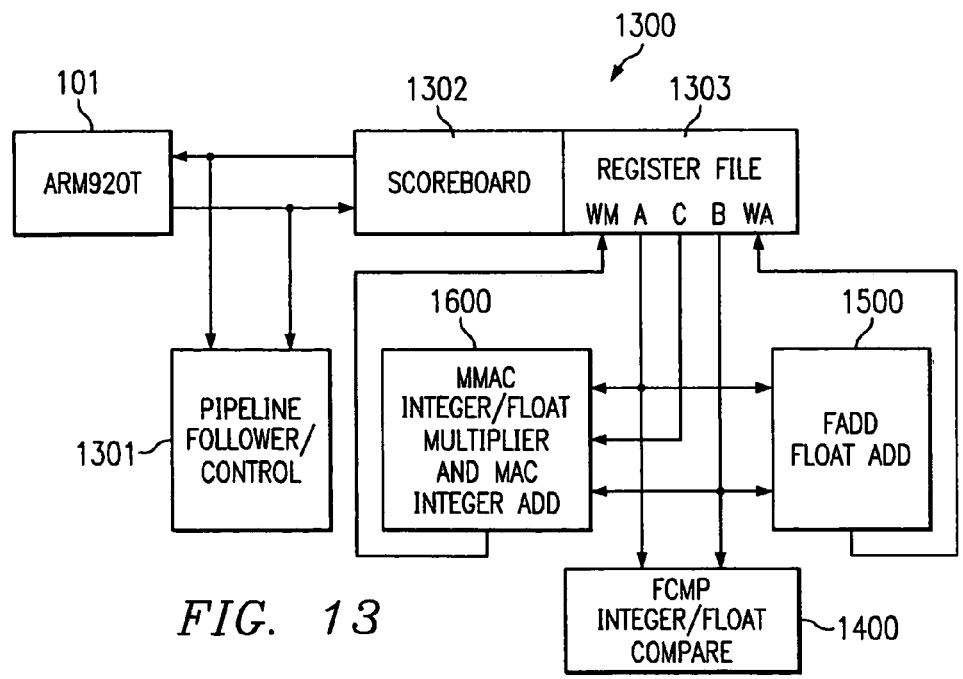
FIG. 13 is a high level functional block diagram of a math coprocessor included in the preferred embodiment of system.

FIG. 13 is a high level functional block diagram of a math coprocessor 1300 included in the preferred embodiment of system 100. Math coprocessor 1300 is a digital signal processor (DSP) which operates in conjunction with microprocessor core 101 and includes pipeline follower/control circuitry 1301, scoreboard 1302 and register file 1303. The primary data processing blocks include an integer/floating point comparator (FCMP) block 1400, shown in further detail in FIG. 14, a floating point adder (FADD) 1500, shown in detail in FIG. 15, and an integer/floating point multiplier and multiply accumulator with an integral adder (MMAC) 1600, shown in further detail in FIG. 16.

Comparator 1400, FADD 1500, and MMAC 1600 are pipelined devices which operate in five stages (namely Decode and Operand Fetch, Execute Stages 1-3, and writeback). Register file 1303 and pipeline follower 1301 are clocked directly by the processor 101 FCLK ("fast clock"), while adder 1500, comparator 1400, and multiplier 1600 operate synchronously with processor 101 but at one-half the FCLK frequency. Consequently, loads and stores between the microprocessor registers, the memory interfaces and the math coprocessor registers run at the full FCLK rate, but math coprocessor computations run at half the FCLK rate (OPCLK). In the illustrated embodiment, the five stage DSP pipeline is not visible to the programmer since the register file is fully scoreboarded and the pipeline is interlocked; forwarding between pipelines stages is supported to avoid bubbles in the pipeline that would otherwise form when the result of an instruction must be written back to the register file before that result can be used by the next instruction.

In the following discussion of the preferred embodiment, the following data types will considered the minimum set upon which coprocessor 1300 is able to operate:

TABLE 7

| Short Hand Name | Data Type | Number of bits in... | | |
|---|---|---|---|---|
| | | Register File | Signed Significand | Biased Exponent |
| f32 | Single precision float | 32 | 24 | 8 |
| f64 | Double precision float | 64 | 53. | 11 |
| acc | 72-bit extended precision in | 61 | 11 | |
| f32 | Single precision float | 32 | 24 | 8 |
| i32 | 32-bit integer | 32 | 32 | |
| i64 | 64-bit integer | 64 | 64 | |

Additionally, the cycle counts and latencies for each type of data through the multiplier and adder operations illustrated in TABLES 8 and 9 respectively. Note that single precision floating point and 32-bit integer multiplication produce one result every clock cycle, while double precision floating point and 64-bit integer multiplication produce one result every four clock cycles.

TABLE 8

| | Cycle Count/Latency Through Pipeline | | | | |
|---|---|---|---|---|---|
| | f3 | f64 | acc | i32 | i64 |
| f32 | 1/5 | | | | |
| f64 | | 4/8 | | | |
| acc | | | | | |
| i32 | | | | 1/5 | |

TABLE 9

| | Cycle Count/Latency Through Pipeline | | | | |
|---|---|---|---|---|---|
| | f32 | f64 | acc | i32 | i64 |
| f32 | 1/5 | | 1/5 | | |
| f64 | | 1/5 | 1/5 | | |
| acc | 1/5 | 1/5 | 1/5 | 1/5 | 1/5 |
| i32 | | | 1/5 | 1/5 | |
| i64 | | | 1/5 | | 1/4 |

The coprocessor register set preferably consists of 16 64-bit general purpose registers and four 72-bit accumulators. For the purposes of instruction encoding, the names of the 16 physical general purpose registers vary according to the data type stored in them, as illustrated in Table 10.

TABLE 10

| Register Name | Data Type |
|---|---|
| F [15:0] | Single precision floating point |
| D [15:0] | Double precision floating point |
| FX [15:0] | 32-bit integer |
| DX [15:0] | 64-bit integer |
| AX [3:0] | 72-bit Accumulator Contents |

A single precision floating point number is stored in the upper half of a 64-bit physical register; single precision numbers must be explicitly promoted to double precision before being used in double precision calculations. A 32-bit integer is stored in lower half of a 64-bit physical register and sign extended; 32-bit integers can therefore be used directly in 64-bit integer calculations.

The last coprocessor register is the status/control register. The bit description for this register is provided in Appendix A.

In the preferred embodiment based on an ARM V4T processor core architecture, five coprocessor instructions are defined: CDP (Coprocessor Data Processing), LDC (Load Coprocessor), STC (Store Coprocessor), MCR (Move to Coprocessor from ARM Register), and MRC (Move to ARM Register from Coprocessor). The formats for these five instructions are given in Tables 11 to 15.

TABLE 11

| 31:28 | 27:24 | 23:22 | 21:20 | 19:16 | 15:12 | 11:8 | 7:5 | 4 | 3:0 |
|---|---|---|---|---|---|---|---|---|---|
| cond | 1110 | rsvd | opcode1 | CRn | CRd | cp_num | opcode2 | 0 | CRM |

TABLE 12

| 31:28 | 27:25 | 24 | 23 | 22 | 21 | 20 | 19:16 | 15:12 | 11:8 | 7:0 |
|---|---|---|---|---|---|---|---|---|---|---|
| cond | 110 | P | U | N | W | 1 | Rn | CRd | cp_num | 8-bit_word_offset |

TABLE 13

| 31:28 | 27:25 | 24 | 23 | 22 | 21 | 20 | 19:16 | 15:12 | 11:8 | 7:0 |
|---|---|---|---|---|---|---|---|---|---|---|
| cond | 110 | P | U | N | W | 0 | Rn | CRd | cp_num | 8-bit_word offset |

TABLE 14

| 31:28 | 27:24 | 23:22 | 21 | 20 | 19:16 | 15:12 | 11:8 | 7:5 | 4 | 3:0 |
|---|---|---|---|---|---|---|---|---|---|---|
| cond | 1110 | rsvd | opcode1 | 0 | CRn | CRd | cp_num | opcode2 | 1 | CRM |

TABLE 15

| 31:28 | 27:24 | 23:22 | 21 | 20 | 19:16 | 15:12 | 11:8 | 7:5 | 4 | 3:0 |
|---|---|---|---|---|---|---|---|---|---|---|
| cond | 1110 | rsvd | opcode1 | 1 | CRn | CRd | cp_num | opcode2 | 1 | CRM |

Bits 31:28 of each instruction are the standard ARM condition codes; their interpretation is provided in Table 16. Note that the status flags referenced by the condition codes are condition code flags (the upper four bits of a program status register) of microprocessor 101.

TABLE 16

| Opcode[31:28] | Mnemonic Extension | Meaning | Status Flag State |
|---|---|---|---|
| 0000 | EQ | Equal | Z set |
| 0001 | NE | Not Equal | Z clear |
| 0010 | CS/HS | Carry Set/Unsigned Higher or Same | C set |
| 0011 | CC/LO | Carry Clear/Unsigned Lower | C clear |
| 0100 | MI | Minus/Negative | N set |
| 0101 | PL | Plus/Positive or Zero | N clear |
| 0110 | VS | Overflow | V set |
| 0111 | VC | No Overflow | V clear |
| 1000 | HI | Unsigned Higher | C set and Z clear |
| 1001 | LS | Unsigned Lower or Same | C clear or Z set |
| 1010 | GE | Signed Greater Than or Equal | N set and V set, or N clear and V clear (N = V) |
| 1011 | LT | Signed Less Than | N set and V clear, or N clear and V set (N ! = V) |
| 1100 | GT | Signed Greater Than | Z clear, and either N set and V set, or N clear and V clear (Z = 0, N =V) |
| 1101 | LE | Signed Less Than or Equal | Z set, or N set and V clear, and V set (Z = 1, N ! = V) |
| 1110 | AL | Always (unconditional) | |
| 1111 | NV | Never | |

The other bits in the instruction formats shown above are interpreted as follows:
(1) opcode1: DSP coprocessor-defined opcode;
(2) opcode2: DSP coprocessor-defined opcode;
(3) CRn: DSP coprocessor-defined register ID;
(4) CRd: DSP coprocessor-defined register ID;
(5) CRm: DSP coprocessor-defined register ID;
(6) Rn: Specifies an ARM base address register. These bits are ignored by the DSP coprocessor;
(7) Rd: Specifies a source or destination ARM register. Some DSP coprocessor instructions interpret these bits as a coprocessor-defined register ID; most instructions ignore these bits;
(8) cp_num: Coprocessor number;
(9) P: Pre-indexing (P=1) or post-indexing (P=0) addressing. This bit is ignored by the DSP coprocessor;
(10) U: Specifies whether the supplied 8-bit offset is added to a base register (U=1) or subtracted from a base register (U=0). This bit is ignored by the DSP coprocessor;
(11) N: Specifies the width of a data type involved in a move operation. [The DSP coprocessor uses this bit to distinguish between single precision floating point/32-bit integer numbers (N=0) and double precision floating point/64-bit integer numbers (N=1)];
(12) W: Specifies whether or not a calculated address will be written back to a base register (W=1) or not (W=0). This bit is ignored by the DSP coprocessor; and
(13) 8-bit word offset: An offset used in address calculations. These bits are ignored by the DSP coprocessor.

A preferred instruction set for math coprocessor 1300 is provided in Appendix B.

Figure 14:
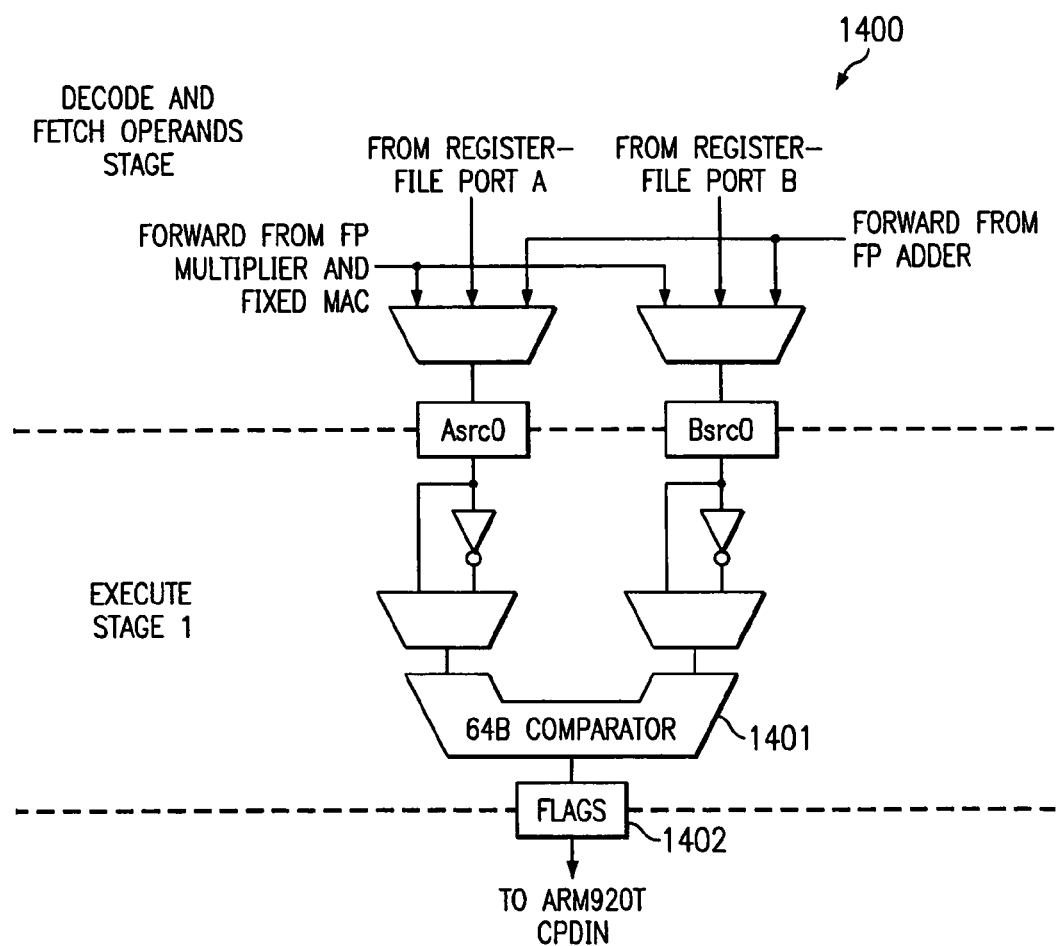
FIG. 14 is a schematics showing in further detail, the primary data processing blocks including an integer/floating point comparator (FCMP) block.
Figure 15A:
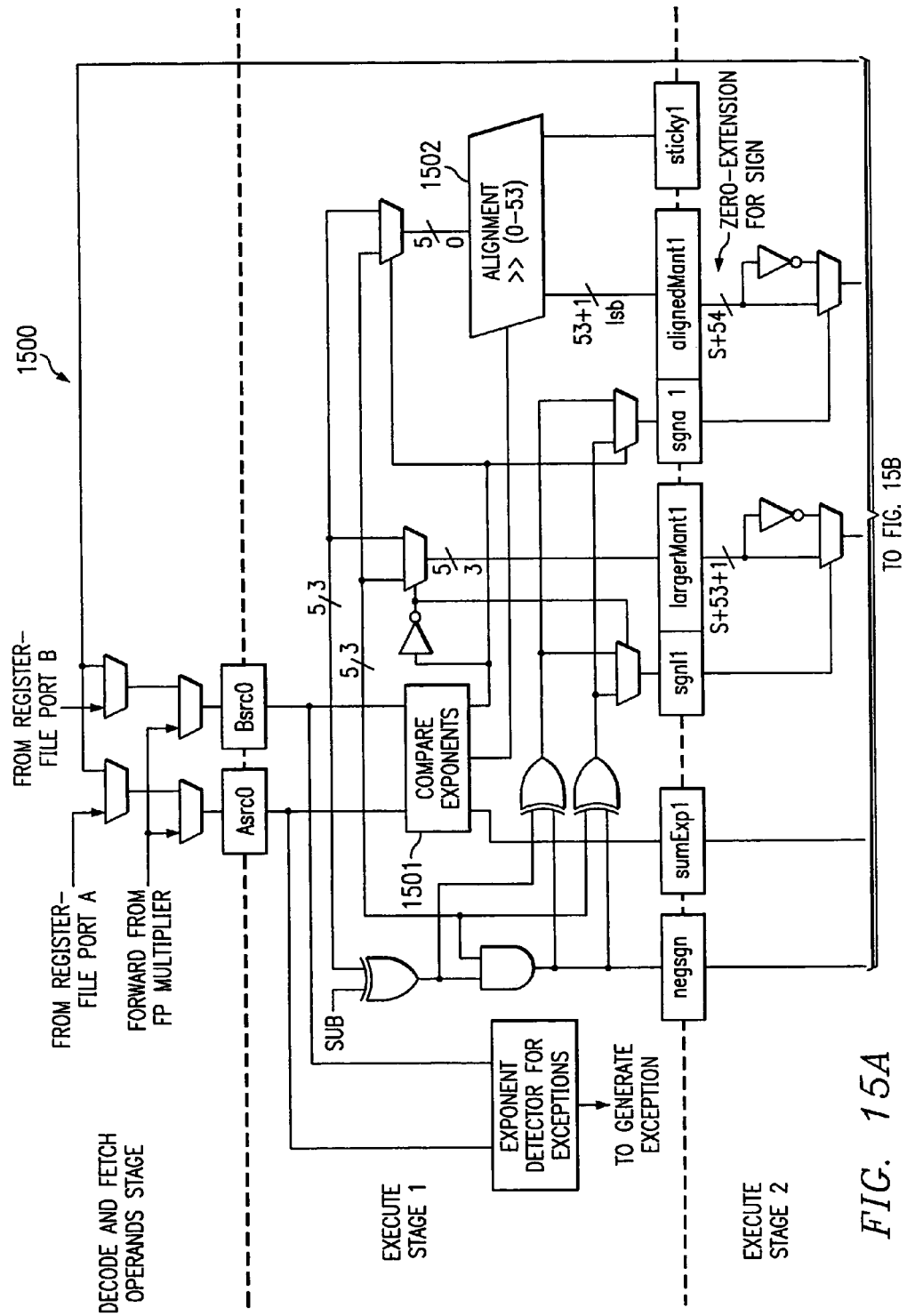
FIG. 15 is a schematic showing in detail a floating point adder (FADD)
Figure 15B:
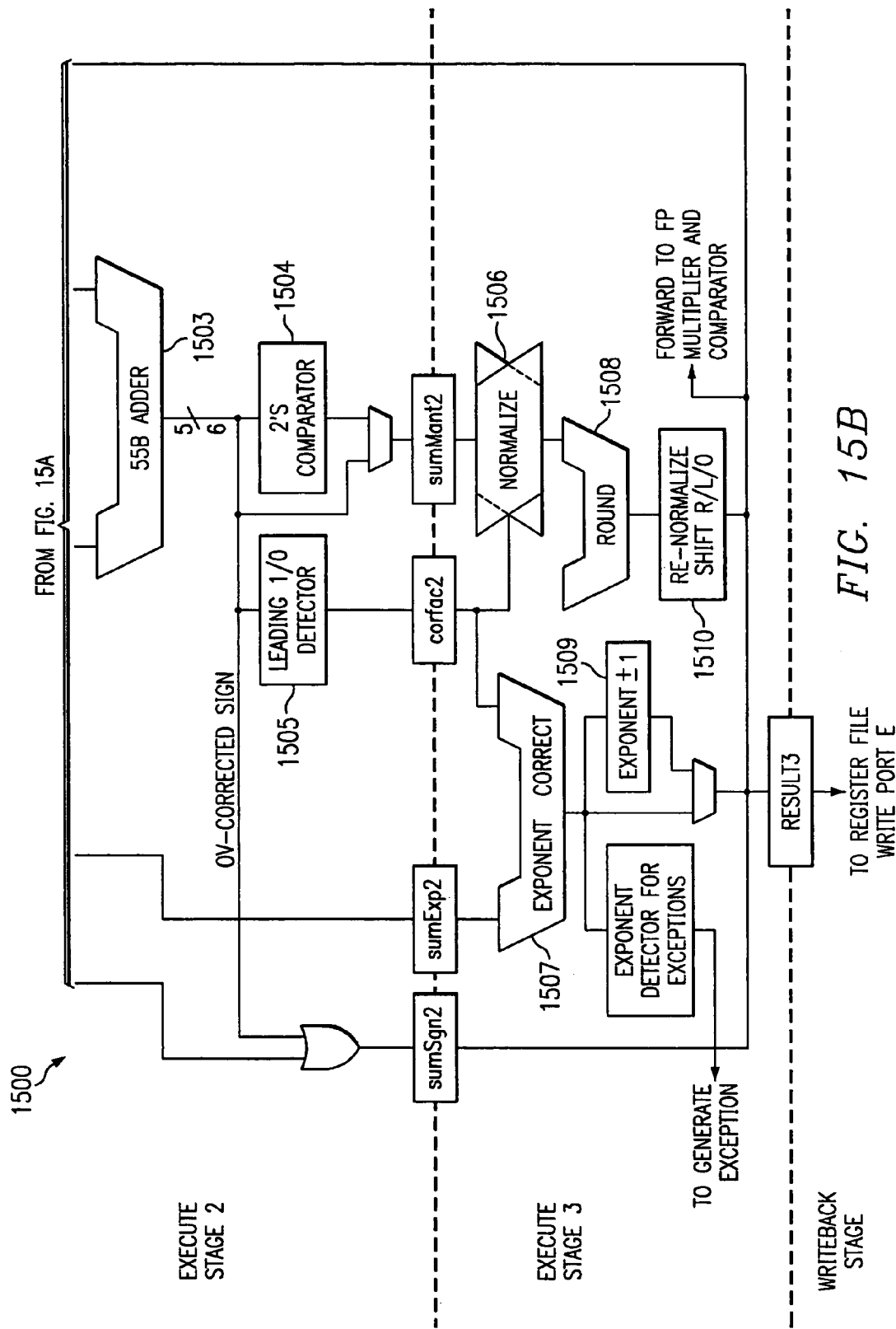
Figure 16A:
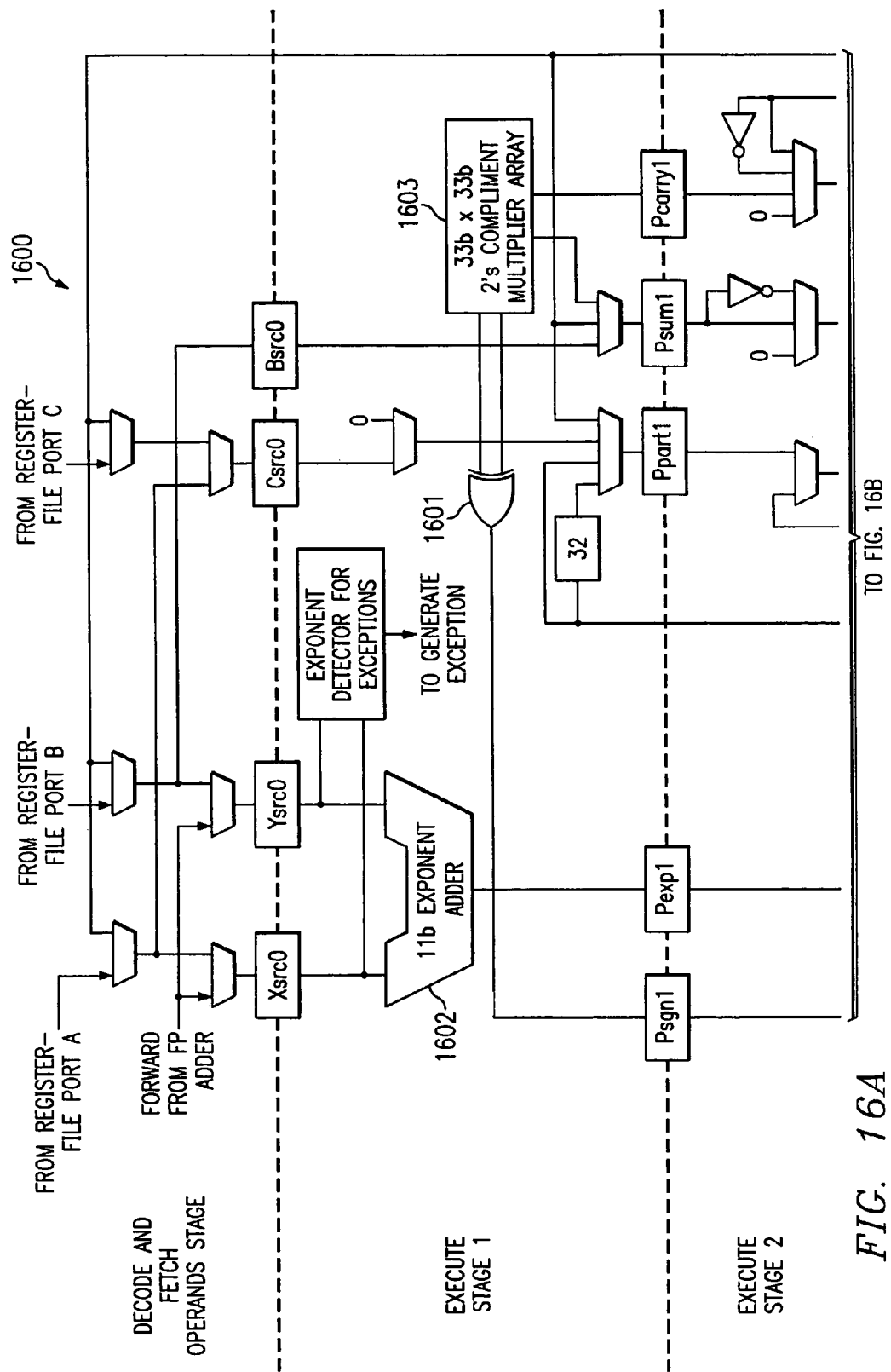
FIG. 16 is a schematic showing in further detail an integer/floating point multiplier and multiply accumulator with an integral adder (MMAC)
Figure 16B:
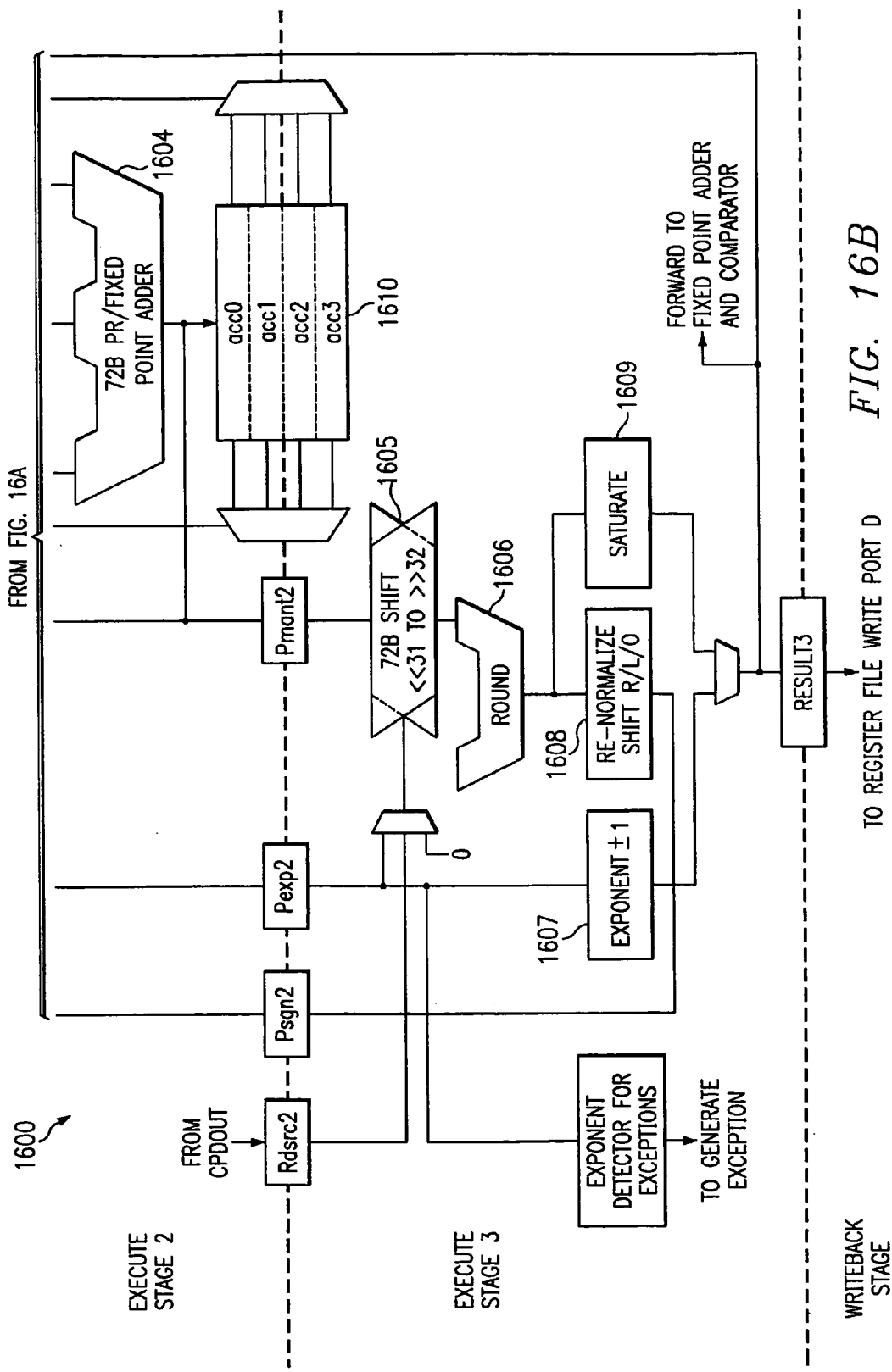
Figure 17A:
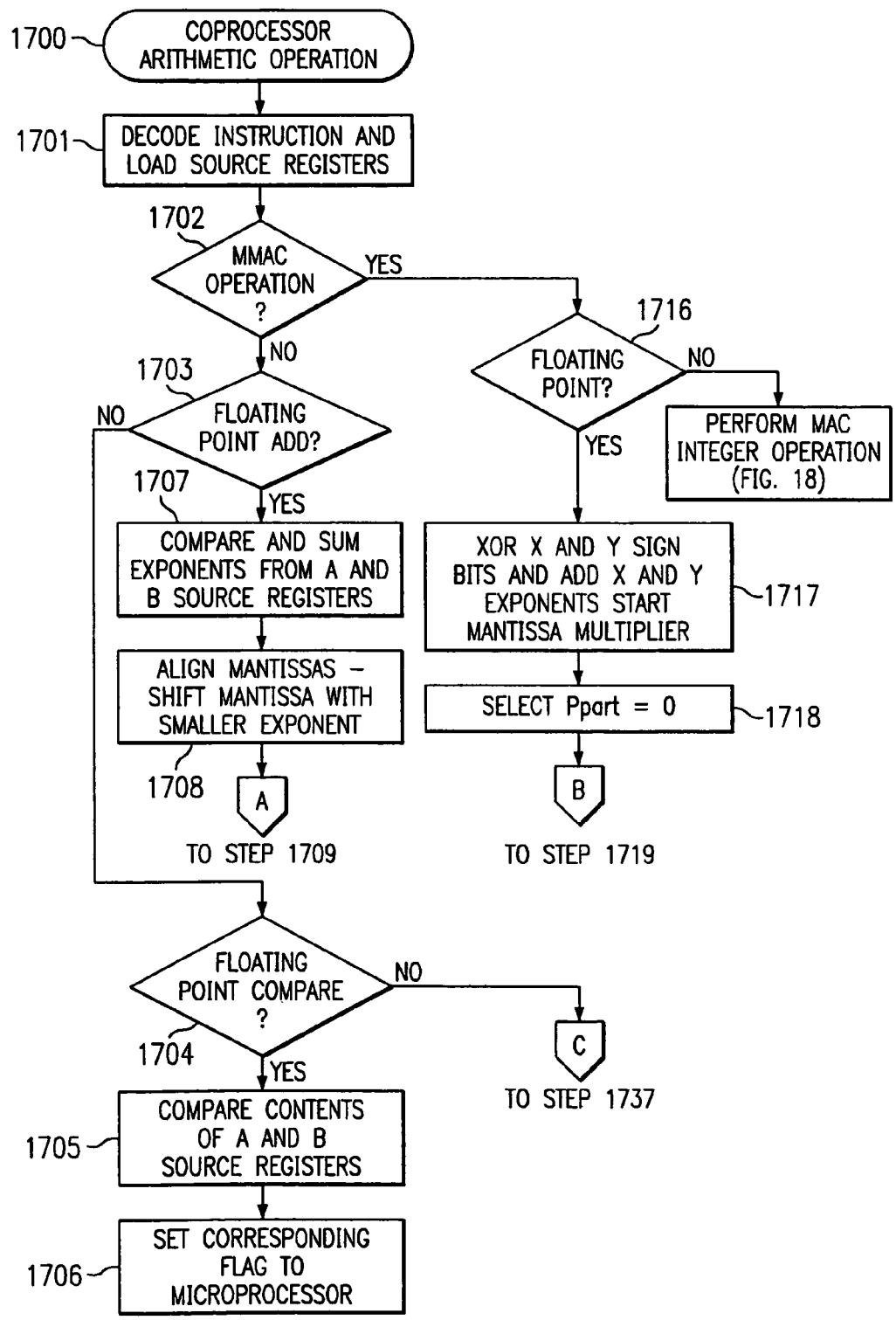
FIG. 17 is now made to the flow chart showing the Instruction Decode and Operands fetch stage where the current instruction is decoded and operands are loaded into the source registers.
Figure 17G:
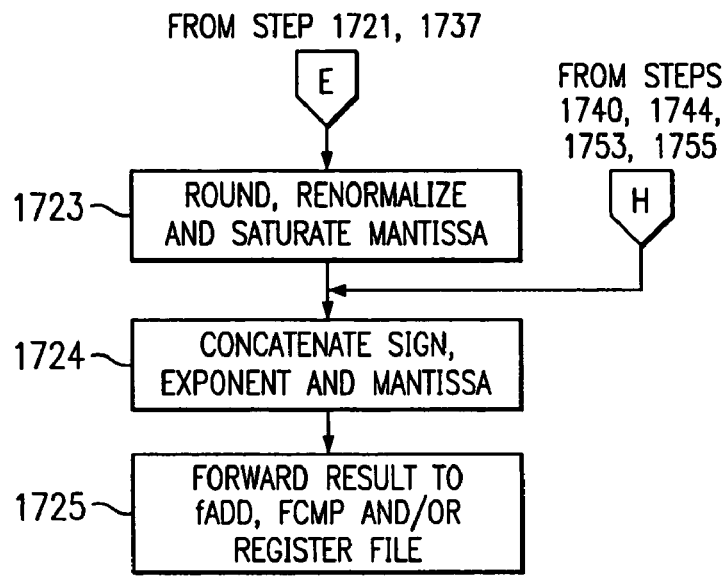
Figure 17H:
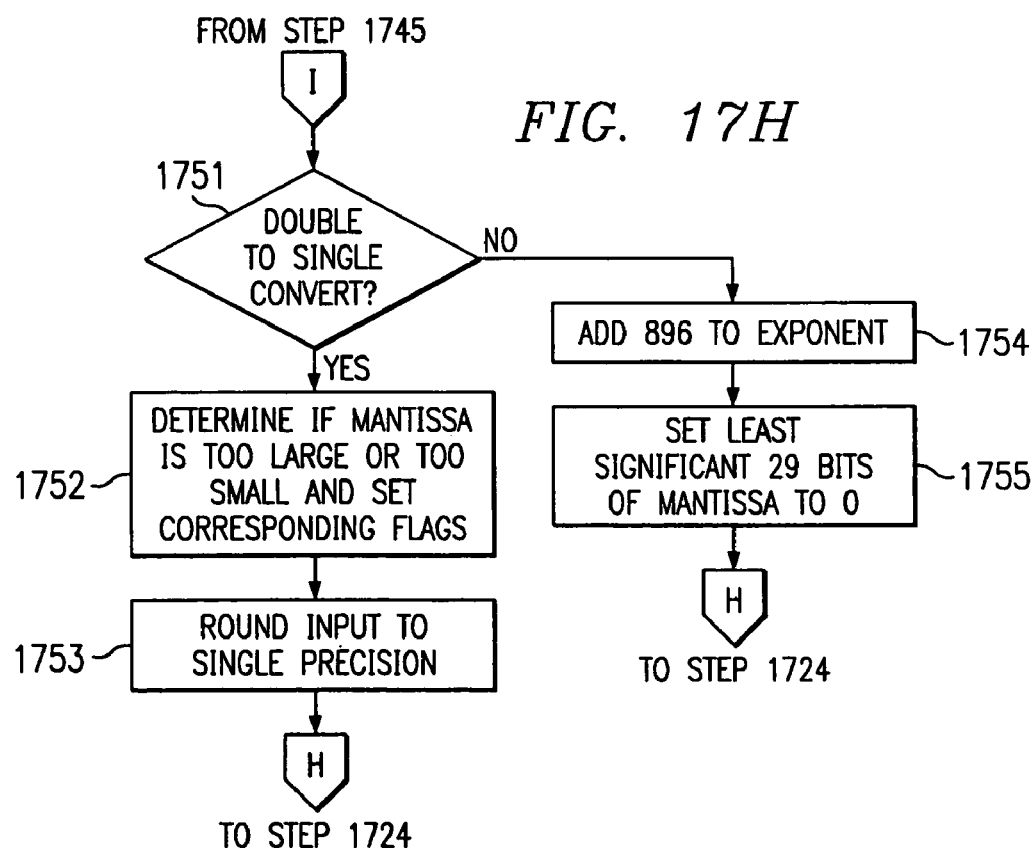
Figure 17I:
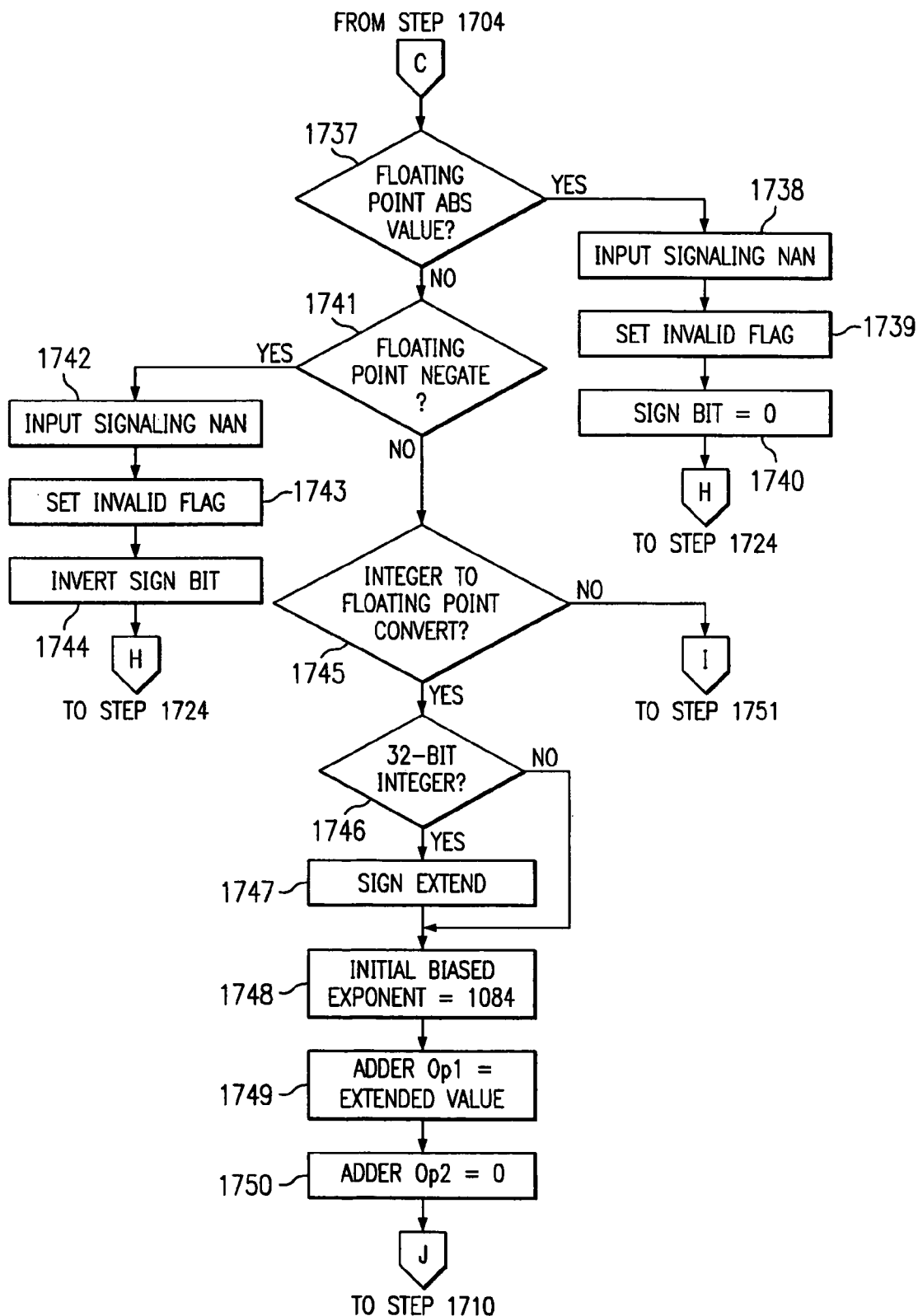
Figure 18A:
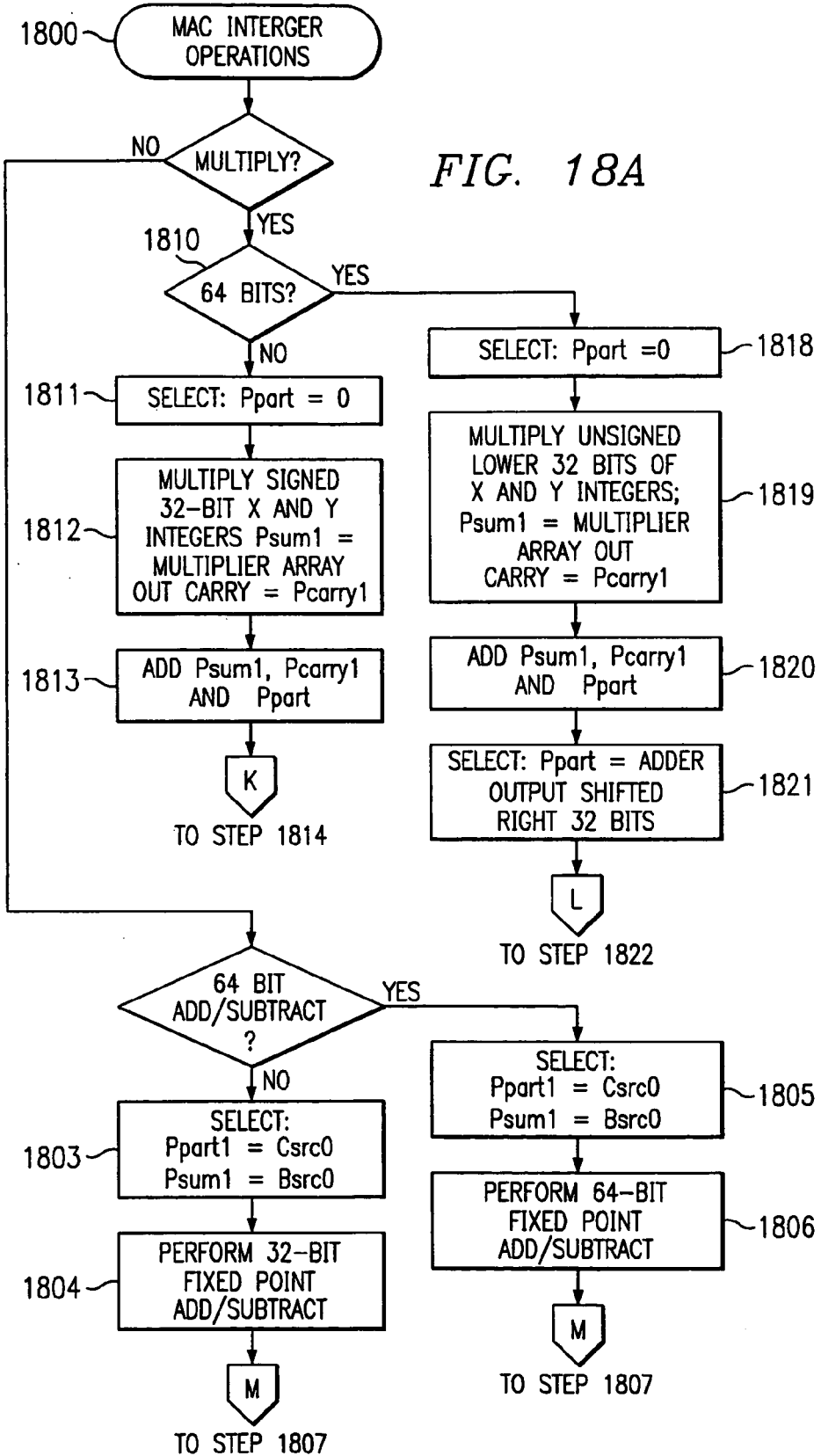
FIG. 18 is a flow chart describing exemplary integer operations in MMAC.
Figure 18B:
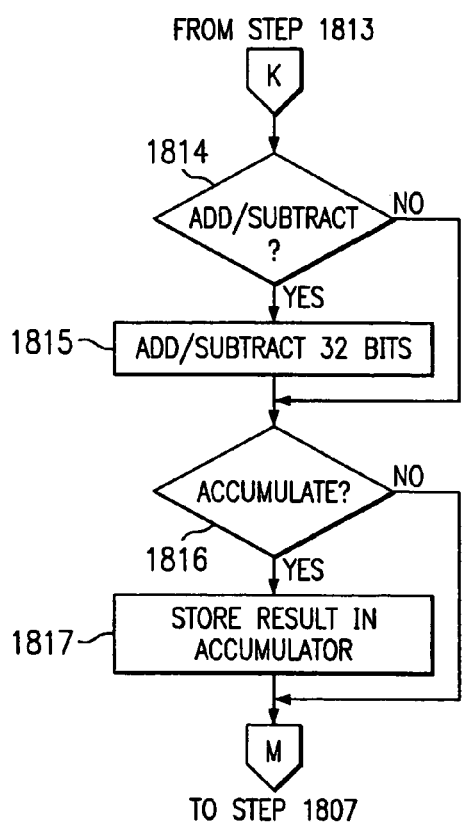
Figure 18C:
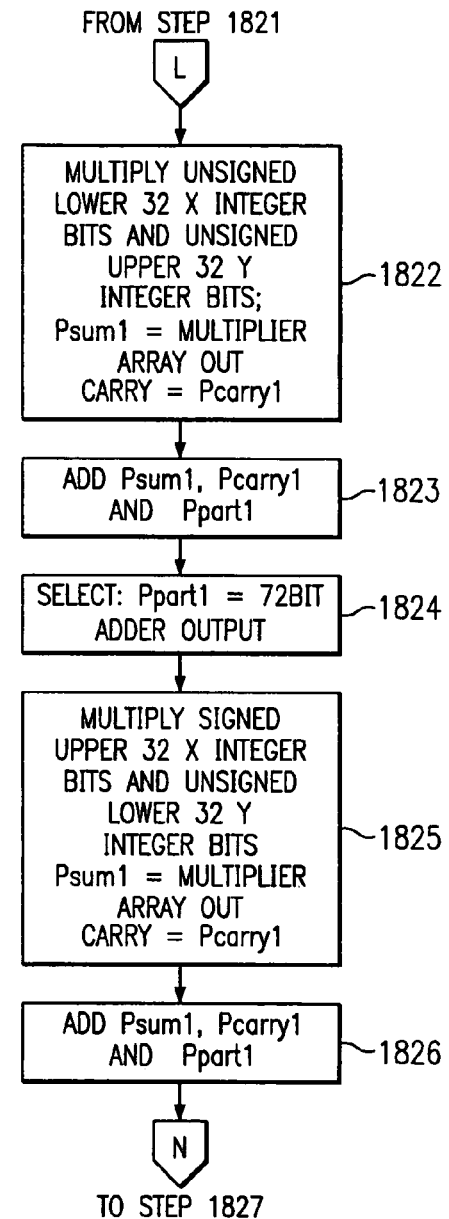
Figure 18D:
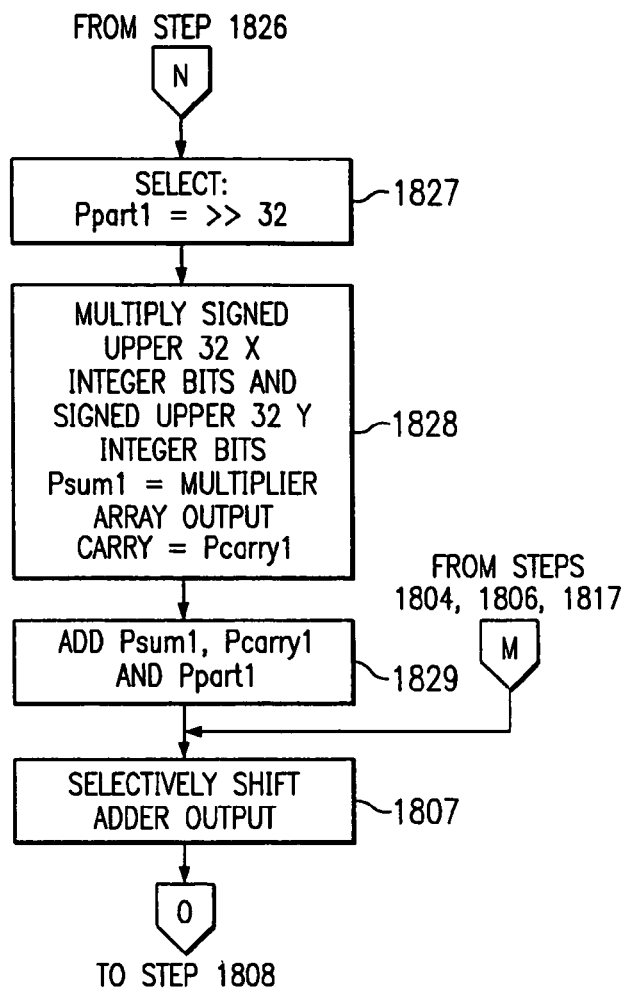
Figure 18E:
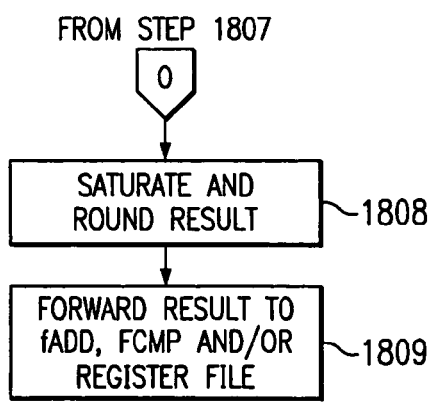

To illustrate the floating point operation of math processor 1300, reference is now made to the flow chart of FIG. 17 and the schematics of FIGS. 14-16. Integer operations will be discussed further in conjunction with FIG. 18. Generally, operations proceed through the five stages as follows:

(1) During the Decode and Fetch Operands stage the current coprocessor instruction is decoded and the source operands are fetched;

(2) During Execute Stage 1 a compare instruction executes in FCMP 1400, multiplication begins in MMAC 1600 for a multiplication instruction, and exponent comparison and alignment begins in FADD 1500 for an addition (subtraction) instruction;

(3) During Execute Stage 2, mantissa multiplication and integer addition completes in MMAC 1600 for a 5 multiplication instruction, and addition and leading 0/1 detection completes in FADD 1500 for an addition (subtraction) instruction;

(4) During Execute Stage 3, normalization and rounding completes for floating point numbers in MMAC or FADD. Saturation completes for integers in MMAC; and (5) During the Writeback stage, results are written back to register file 1303.

In the example shown in FIG. 17, the Instruction Decode and Operands fetch stage occurs at Step 1701 where the current instruction is decoded and operands are loaded into the source registers.

The MMAC, FCMP, and FADD datapaths have common source operands but distinct source registers: FCMP 1400 and FADD 1500 (source registers) are associated with the Asrc0 and Bsrc0 source registers (the "A and B" source registers) while MMAC is associated with the Xsrc0, Ysrc0, Bsrc0, and Csrc0 source registers (the "X, Y, B and C" source registers). All of the source registers except for registers Bsrc0 and Csrc0 are 78 bits wide and contain the following fields:

TABLE 17

| Nemonic | Description |
|---------|-------------|
| dblMant | double precision multiply flag (1 bit) |
| dblExp | double precision exponent flag (1 bit) |
| sign | floating point sign (1 bit) |
| exp | floating point exponent (11 bits) |
| mant | floating point mantissa or integer (64 bits) |

MMAC's Bsrc0 and Csrc0 source registers are used only for integer calculations and are 64 bits wide.

The following pseudo-code describes how the 78-bit source registers are loaded from register file data at Step 1701. Note that operands forwarded between data paths will already be in 78-bit format.

dblMant←double
dblExp←double
sign←~integer AND bit [63]
exp←~integer AND (bit [62] & (double ?
bit [61:59]:~bit [62]*3) & (double ? bit [58:52]:bit [61:55])) OR integer AND ( )
mant←~integer AND ("01" & (double ? bit [51:0]:(bit [54:32] & zeros (29))) & zeros (10)) OR
integer AND (bit [63:32] & (double ? bit [31:0]:zeros (32)))

Where: "~" is the bitwise complement operator, "&" is a bit string pasting operator, "?:" is the C language ternary operator (used to specify a mux), "n" specifies a bit string created by repeating the previous bit n times, and "zeros(n)" specifies a bit string consisting of n zeros.

Assume that the instruction calls for a compare operation at Step 1704. In other words, neither a MMAC operation is required at Step 1702 nor a floating point addition (subtraction) operation at Step 1703.

In the case of a compare instruction, the source registers Asrc0 and Bsrc0 are loaded either from operands from register file 1303 or operands forwarded from either floating point adder 1500 or MMAC 1600. Comparison operations take place during Execute Stage 1. In this example, at Step 1705 64-bit comparator 1401 (FIG. 14) compares the contents of the A and B source registers in a single clock-cycle. The complementary value of either or both of the operands can also be taken prior to the comparison. At Step 1706, corresponding flag to microprocessor core 101 is set in register 1402.

Now consider the case where the decoded instruction calls for a floating point addition operation at Step 1703. In this case, the source A and source B registers are loaded with operands from either register file 1303 or forwarded from MMAC 1600. During Execution Stage 1, the exponents from the source A and source B entries are compared by comparison circuitry 1501 (FIG. 15) and common exponent for the addition taken, which is preferably the larger of the two and is associated with the "larger" mantissa (Step 1707). At Step 1708, the mantissa of the floating point operand having the smaller exponent is realigned by a right shift in alignment circuitry 1502 resulting in the "aligned mantissa". Additionally, the negative sign from the sign bits from the A and B source registers is calculated.

The exponent detectors in MMAC and FADD contain the logic represented by the following pseudo-code:

expEQden 4←~(exp[10] OR (dblExp AND (exp[9] or exp [8] or exp [7])) OR exp[6] OR exp[5] OR exp[4] OR exp[3] or exp[2] or exp[1] OR exp[0])

expEQinf 4←(exp [10] AND (~dblExp OR (exp[9] AND exp [8] AND exp [7])) AND exp[6] AND exp[5] AND exp[4] AND exp[3] AND exp[2] AND exp[1] AND exp [0])

This logic signals a floating point zero as a denormal; the only way to account for this is to add a 52-bit detector to MMAC and FADD.

The transaction now enters Execution Stage 2. At Step 1709, the "larger" mantissa plus one least significant bit and the sign extended aligned mantissa, along with the appropriate sign bit, are added by 55-bit adder 1503. At Step 1710, the two's compliment is taken by circuitry 1504 and a leading edge I/O detection is made by detector 1505. The sign for the transaction is also corrected for overflow.

During Execute Stage 3, the mantissa is normalized in circuitry 1506 and the exponent corrected by circuitry 1507, based on the result of the leading edge detection, at Step 1711. At Step 1712, the mantissa is rounded in circuitry 1508 and the exponent modified by ±1. At Step 1713, the rounded mantissa is re-normalized by shifter 1510. The corrected exponent, mantissa and transaction sign are then concatenated at Step 1714. The result is forwarded to MMAC 1600, floating point comparator 1400 and/or onto register file 1303 (during the write-back stage) at Step 1715.

Next, assume that the decoded instruction results in a MMAC operation at Step 1702 and that that operation is a floating point multiplication at Step 1716. During the decode and fetch operand stage, the X-source (Xsrc0) and Y-source (Ysrc0) registers are loaded either from the register file 1303 or from floating point adder 1500 in accordance with the logic described above in conjunction with the addition operation.

During Execute Stage 1, an exclusive-OR operation of the X and Y sign bits is performed by gate 1601 and the X and Y exponents summed by adder 1602 at Step 1717. Initially, the multiplexer is set at Step 1718 such that Ppart=0. Additionally, the multiplication of the mantissa's in 32-bit by 32-bit two's compliment multiplier array 1603 begins during Execute Stage 1.

MMAC 1600 can perform either a single precision multiplication of two 32-bit floating point numbers or a double precision multiplication of two 64-bit floating point numbers (Step 1719). Consider first the case of a single precision multiplication. In this case, the signed 32-bit X- and Y-mantissas are multiplied in 32-bit by 32-bit two's compliment multiplier array 1603 at Step 1720. Subsequently, during Execute Stage 2, the partial sum and partial carry from multiplier array 1603 along with the contents of the register Ppart1 (currently set to zero) are added by a 72-bit fixed point adder 1604 (Step 1721). The results of the addition can be shifted to the right by a 72-bit shift register 1605 at Step 1722. At Step 1723, the shifted result is rounded in rounding circuitry 1606, the exponent adjusted by ±1 by circuitry 1607 as a function of the rounding operation and the mantissa re-normalized by shifting in circuitry 1608 and saturated in circuitry 1609. At Step 1724, the exponent sign and mantissa are concatenated and the result is forwarded to FCMP 1400, FADD 1500, and/or register file 1303 at Step 1725.

Now consider the case where a double precision multiplication is required at Step 1719. The double precision multiplication process requires five clock cycles. First, at Step

1726, the unsigned lower 32-bits of the mantissas in the X- and Y-source registers are multiplied in array 1603. This step is preferably performed using multiplexers at the multiplier array inputs. The output of the array, the associated carry bit and the contents of the register Ppart1 (which is zero for the first clock cycle) are added by fixed-point adder 1604 at Step 1727.

At Step 1728, the output of adder 1604, shifted right by 32-bits, sign extended, are selected as the new value for Ppart1. Then, at Step 1729, the unsigned lower 32-mantissa bits from the X-source register are multiplied with the unsigned upper 32-mantissa bits from the Y-source register. The output from the multiplier array, including the carry bit are added to the contents of the Ppart1 register at Step 1730. At Step 1731, the 72-bit output from adder 1604 is selected as the new contents of Ppart1.

The next multiplication, at Step 1732, is performed between the signed upper 32-mantissa bits in the X-source register and the unsigned lower 32-mantissa bits in the Y-source register. The result of the multiplication, including the carry bit, are then added to Ppart1 at Step 1733. The new value for Ppart1 is selected at Step 1734 to be the sum output from adder1604 shifted right by 32-bits. The final multiplication in the multiplication array takes place at Step 1735 where the signed upper 32-mantissa bits from the X-source register and the signed upper 32-mantissa bits from the Y-source register are multiplied. The results of the multiplication, including the carry bit are then summed at 1736.

The double precision application procedure continues as was done with the single precision procedure with Steps 1722-1725 where the adder output is selectively shifted, rounded, saturated and re-normalized and then forwarded for additional operations in the floating point adder or floating point comparator or onto the register file.

The floating point unit also executes instructions for determining the absolute value of a floating point operand, negating a floating point operand, converting an integer into floating point form, and converting a double precision operand to a single precision operand. These operations are performed as follows in the preferred embodiment.

The floating point absolute value operation decision is made at Step 1737. The corresponding signalling NaN (Not a Number) is input at Step 1738. Then, at Steps 1739 and 1740, the invalid flag is set and the sign bit is set to zero. The procedure next jumps to Step 1725 where the mantissa and exponent are concatenated with the new sign.

For a floating point negate operation, at Step 1741, the signalling NaN is input at Step 1742. The invalid flag is set at Step 1743 and the sign bit is inverted at Step 1744. This procedure then also jumps to Step 1725.

To convert an integer to a floating point value at Step 1745, a determination is first made as to whether the operand is a 32-bit or 64-bit integer (Step 1746). In the case of a 32-bit integer, the operand is sign extended at Step 1747 to 64 bits. The initial biased exponent is set at Step 1748 to 1084. At Step 1749 the first operand (Opp presented to the adder is taken as the 64-bit value and the second adder operand (Opt2) is taken as zero. The procedure jumps to Step 1710 and these two operands are added as was described above for the floating point addition operation.

At Step 1751, the execution of the double precision to single precision operation is illustrated. First a determination is made as to whether the mantissa is too large or too small, and if so the corresponding flag is set (Step 1752). The input operand is rounded at Step 1752 to single precision. The process again jumps to Step 1735.

Finally, if at Step 1751 the decoded instruction does not invoke s double to single precision conversion, then at Step 1754 a value of 896 is added to the exponent and at Step 1755 the 29 least significant bits of the mantissa are set to zero and the new value forwarded.

FIG. 18 is a flow chart describing exemplary integer operations in MMAC 1600. Assume first that at Step 1801, the decoded instruction calls for an addition or subtraction operation. In the illustrated embodiment, MMAC 1600 can perform either 64-bit double precision or 32-bit single precision arithmetic operations. For a 32-bit operation at Step 1802, then at Step 1803 the 32-bit sign extended integers from the B and C source registers (Csrc0 and Bsrc0) are multiplexed to the inputs of 72-bit fixed point adder 1604. For a 64-bit addition or subtraction, the 64-bit contents of both the B and C source registers are switched to the inputs of adder 1604. The addition or subtraction operation takes place at Step 1806.

The immediate result from adder 1604 can then be shifted left or right by shifter 1605 at Step 1807. The result of the addition (subtraction) can be saturated and rounded at Step 1808 and the result forwarded at Step 1809 to either of the floating point adder, floating point comparator, and/or the register file.

Next, consider the case where the decoded instruction calls for multiplication at Step 1801. With respect to integer multiplications, MMAC 1600 can operate on either 32-bit or 64-bit data. Assume first that 32-bit operands are being processed at Step 1810.

The multiplexers are set at Step 1810 such that the register Ppart is loaded with zero's. Then, at Step 1812, the signed 32-bit X- and Y-integers are multiplied in two's compliment multiplier array 1603. Fixed point adder 1604 then adds the sum and the carry bits from multiplier array 1603 and the contents of register Ppart at Step 1813.

In the preferred instruction set, provided herein as Appendix B, additional operations can be performed on 32-bit operands during the same instructions cycle. Among the instructions provided are 32-bit integer multiply-add, 32-bit integer multiply-subtract, 32-bit integer multiply-add, result to accumulator, 32-bit integer multiply-subtract, result to accumulator, 32-bit integer multiply-add to accumulator, and 32-bit integer multiply-subtract from accumulator instructions. These operations are represented in FIG. 18 by Steps 1814-1817.

At Steps 1814 and 1815, a 32-bit addition or subtraction takes place. The source for the add in register can be one of the accumulators 1610 (FIG. 16), or one of the C or B source registers. For instructions requiring storage in the accumulator at Step 1816, the accumulation takes place at 1817. Thereafter, the procedure can jump to Steps 1807-1809 where the result can be selectively shifted, and/or saturated and rounded and then forwarded to the register file or to another functional unit within the math coprocessor.

In the case of a 64-bit integer multiplication at Step 1810, the register Ppart is loaded with zero's (Step 1818). At Step 1819, the unsigned lower 32-bits of the X- and Y-integers are multiplied in the multiplier array and then the result of Psum1, Pcarry1 are added with the contents of Ppart at Step 1820. ext, the output of adder 1604 is shifted right by 32-bits and becomes the new value in register Ppart (Step 1821).

At Step 1822, the lower unsigned 32 integer bits from the X-source register and the unsigned upper 32 integer bits from the Y-source register are multiplied in the multiplier array. The result Psum1, along with the carry bit and the contents of the Ppart1 register are then added in the fixed point adder at Step 1823. At Step 1824, the new value loaded into register Ppart1 is the adder output.

Next, the signed upper 32-bits from the X-source register and the unsigned lower 32-bits from the Y-source register are multiplied at Step 1825. The partial sum and carry bit are added along with the contents of Ppart1 at Step 1826. At Step 1827, the output from the adder is shifted right by 32-bits and becomes the new value stored in register Ppart1.

Finally, the signed upper 32-bits from the X-source register and the signed upper 32-bits from the Y-source register are multiplied at Step 1828. The results Psum1 and Pcarry1, are added to the contents of register Ppart1 at Step 1829. The results can then be processed through Execute State 3 (i.e., Steps 1807-1809).

In the preferred embodiment, where processor core, 101 is base on an ARM 920T device, the assembly language programming of the math coprocessor (DSP) is accomplished via macro pseudo-instructions that wrap the underlying ARM coprocessor load/store and execute instructions. These macros are supported by the ARM SDT 2.50 assembler, the GNU tool set's gas assembler, and the Microsoft/BSquare Windows CE assembler. C/C++ compiler support for the DSP is used for the floating point subset of the DSP instruction set and access to the integer MAC unit will be provided via C-callable assembly language. One C/C++ compiler which preferably supports the math coprocessor the GNUPro/EGCS/gcc compiler from Cygnus Solutions.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

APPENDIX A

DSPSC
Default: 0x00000000
Definition: DSP Status/Control
Bit Definitions:

| | |
|---|---|
| DAID [2:0] | DSP Architecture ID. This read-only value will be incremented for each revision of the overall DSP coprocessor architecture (future revisions may support multiple MAC units, dedicated 0 0 0 = First architecture. |
| HVID[2:0] | Hardware Version ID. This read-only value will be incremented each time the hardware implementation of the architecture named by DAID[2:0] is changed, typically done in response to bugs. 0 0 0 = First version. |
| V | Overflow Flag. Indicates that an integer operation overflowed.<br>0 = No overflow (reset default).<br>1 = Overflow. |
| RM[1:0] | Rounding Mode. Selects IEEE 754 rounding mode.<br>0 0 = Round to nearest (reset default).<br>0 1 = Round toward O.<br>1 0 = Round to -00. 1 1 = Round to +Do. |
| IXE | Inexact Trap Enable. Enables/disables software trapping for IEEE 754 inexact exceptions. 0 = Disable software trapping for inexact exceptions (reset default).<br>1 = Enable software trapping for inexact 45 exceptions. |
| UFE | Underflow Trap Enable. Enables/disables software trapping for IEEE 754 underflow exceptions. 0 = Disable software trapping for underflow exceptions (reset default).<br>1 = Enable software trapping for underflow exceptions. |
| OFE | Overflow Trap Enable. Enables/disables software trapping for IEEE 754 overflow exceptions. 0 = Disable software trapping for overflow exceptions (reset default).<br>1 = Enable software trapping for overflow exceptions. |
| DZE | Divide By Zero Trap Enable. Enables/disables software trapping for IEEE 754 divide by zero exceptions.<br>0 = Disable software trapping for divide by zero exceptions (reset default).<br>1 = Enable software trapping for divide by zero exceptions. |
| IOE<br>IEEE | Invalid Operator Trap Enable. Enables/disables software trapping for<br>754 invalid operator exceptions.<br>0 = Disable software trapping for invalid operator exceptions (reset default).<br>70 1 = Enable software trapping for invalid operator exceptions. |
| IX | Inexact. Status bit that's set when an IEEE 754 inexact exception occurs (regardless of whether or not software trapping for inexact exceptions is enabled). Writing a '1' to this position clears the status bit.<br>0 = No inexact exception detected (reset default). Writing a '0' to this bit is ignored.<br>1 = Inexact exception detected. Writing a '1' to this bit clears it. |
| UF | Underflow. Status bit that's set when an IEEE 754 underflow exception occurs (regardless of whether or not software trapping for underflow exceptions is enabled). Writing a '1' to this position 85 clears the status bit.<br>0 = No underflow exception detected (reset default). Writing a '0' to this bit is ignored.<br>1 = Underflow exception detected. Writing a '1' to this bit clears it. |
| OF | Overflow. Status bit that's set when an IEEE 754 overflow exception occurs (regardless of whether or not software trapping for overflow exceptions is enabled). Writing a '1' to this position clears the status bit.<br>0 = No overflow exception detected (reset default). Writing a '0' to this bit is ignored.<br>1 = Overflow exception detected. Writing a '1' to this bit clears it. |
| DZ | Divide By Zero. Status bit that's set when an IEEE 754 divide by zero exception occurs (regardless of whether or not software trapping for divide by zero exceptions is enabled). Writing a '1' to this position clears the status bit.<br>0 = No divide by zero exception detected (reset default). Writing a '0' to this bit is ignored.<br>1 = Divide by zero exception detected. Writing a '1' to this bit clears it. |
| IO | Invalid Operator. Status bit that's set when an IEEE 754 invalid operator exception occurs (regardless of whether or not software trapping for invalid operator exceptions is enabled). Writing a '1' to this position clears the status bit.<br>0 = No invalid operator exception detected (reset default). Writing a '0' to this bit is ignored.<br>1 = Invalid operator exception detected. Writing a '1' to this bit clears it. |

APPENDIX B

Instruction Set

Notes:
1) Shaded fields in instruction encodings indicate bits that are ignored by the DSP coprocessor.
2) The <cond> portion of each instruction mnemonic refers to the standard ARM conditional mnemonic extension (see the second column of Table 15).
3) Coprocessor number 4 is associated with single and double precision floating point numbers.
4) Coprocessor number 5 is associated with 32- and 64-bit integers.
5) Coprocessor number 6 is associated with the
6) accumulators and the DSPSC register.

What is claimed is:

1. A mathematics coprocessor comprising:
    a register set for selectively storing integer and floating point operands;
    multiply—accumulate circuitry operable to perform integer and floating point multiply operations on integer and floating point operands retrieved from the register set and integer addition operations on integer operands retrieved from the register set; and
    a floating point adder circuit for performing floating point addition operations on floating point operands retrieved from the register set.

2. The mathematics coprocessor of claim 1, further comprising a comparator circuit operable to selectively compare first and second floating point operands retrieved from the register set during floating point operations and first and second integer operands retrieved from the register set during integer operations.

3. The mathematics coprocessor of claim 1, wherein the multiple—accumulate circuitry comprises:
    a multiplier array operable to:
        during a floating point multiplication operation, multiply first and second mantissas of first and second floating point operands; and
        during an integer multiplication operation, multiply first and second integer operands; and
    an integral fixed-point adder operable to:
        during an integer addition operation, add first and second integer operands; and
        during integer and floating point multiplication operations, add partial sum and partial carry bits generated by the multiplier array with a fixed constant.

4. The mathematics coprocessor of claim 3, wherein the multiply—accumulate circuitry further comprises:
    circuitry for performing selected post-addition operations on results output from the integral fixed-point adder and selected from the group consisting of shifting, rounding, renormalizing, and saturation operations.

5. The mathematics coprocessor of claim 4, wherein the mathematics coprocessor operates in a plurality of execution stages during a selected operation and wherein the multiply—accumulate unit is operable to:
    during an integer multiplication:
        multiply first and second integer operands in the multiplier array during a first execution stage;
        add partial sum, partial carry bits, and a fixed constant with the integral adder during a second execution stage; and
        perform the selected post-addition operations during a third execution stage; and
    during an integer addition operation:
        multiplex first and second integer operands to the Integral adder during the first execution stage;
        adding the first and second integer operands in the integral adder during the second execution stage; and
        perform the selected post-addition operations during the third execution stage.

6. The mathematics coprocessor of claim 5, wherein the floating point adder is operable during a floating point addition operation to:
    during the first execution stage:
        select as a common exponent an exponent from a first floating point operand being added;
        selectively realign a mantissa of second floating point operand being added;
        selectively determine a sign bit for the first and second floating point operands; and
    during the second execution stage:
        add the mantissa of the first floating point operand and the realigned mantissa of the second floating point operand extended by the sign bit to generate a result mantissa; and
        detecting a leading bit of a result mantissa;
    during the third execution stage:
        normalize the result mantissa; and
        correct the common exponent based on the detected leading bit of the result mantissa.

7. The mathematics coprocessor of claim 5, further comprising a comparator circuit is operable to:
    during a floating point compare operation, compare first and second floating point operands during the first execution stage; and
    during a integer compare operation, compare first and second integer operations during the first execution stage.

8. The mathematics coprocessor of claim 1, wherein the multiply—accumulate circuitry is operable to perform single and double precision floating point multiplication and single and double precision integer multiplications.

9. The mathematics coprocessor of claim 8, wherein the multiply-accumulate is further operable to perform single and double precision integer additions.

10. The mathematics coprocessor of claim 1, wherein the floating point adder circuit is operable to perform single and double precision integer additions.

11. A method of performing mathematical operations in a mathematics coprocessor comprising:
    selectively performing integer and floating point multiply operations and integer addition operations within a multiply accumulate unit having an integral integer adder circuit; and
    selectively performing floating point addition operations on floating point operands within a dedicated floating point addition circuit.

12. The method of performing mathematical operations in a mathematics coprocessor of claim 11, wherein performing floating point addition operations on floating point operands within a dedicated floating point addition circuit comprises:
    selecting as a common exponent an exponent from a first floating point operand being added;
    selectively realigning a mantissa of second floating point operand being added;
    selectively determining a sign bit for the first and second floating point operands;

adding the mantissa of the first floating point operand and the realigned mantissa of the second floating point operand extended by the sign bit to generate a result mantissa;

detecting a leading bit of a result mantissa;

normalizing the result mantissa; and correcting the common exponent based on the detected leading bit of the result mantissa.

13. The method of claim 11, wherein selectively performing integer and floating point multiplication operations further comprises selecting to perform a selected one of single precision and double precision multiplication operations.

14. The method of claim 11, wherein selectively performing floating point addition operations further comprises selecting to perform a selected one of single precision and double precision multiplication operations.

* * * * *